United States Patent
Plotkin

(10) Patent No.: US 12,462,099 B2
(45) Date of Patent: Nov. 4, 2025

(54) LANGUAGE MODEL-BASED MULTI-OBJECTIVE OPTIMIZATION

(71) Applicant: Quabbin Patent Holdings, Inc., Marlborough, MA (US)

(72) Inventor: Robert Plotkin, Englishtown, NJ (US)

(73) Assignee: Quabbin Patent Holdings, Inc., Marlborough, MA (US)

( * ) Notice: Subject to any disclaimer, the term of this patent is extended or adjusted under 35 U.S.C. 154(b) by 134 days.

(21) Appl. No.: 18/391,114

(22) Filed: Dec. 20, 2023

(65) Prior Publication Data

US 2024/0211685 A1    Jun. 27, 2024

Related U.S. Application Data

(60) Provisional application No. 63/458,682, filed on Apr. 12, 2023, provisional application No. 63/451,435, filed on Mar. 10, 2023, provisional application No. 63/440,200, filed on Jan. 20, 2023, provisional application No. 63/435,147, filed on Dec. 23, 2022.

(51) Int. Cl.
*G06F 40/20* (2020.01)

(52) U.S. Cl.
CPC ................... *G06F 40/20* (2020.01)

(58) Field of Classification Search
CPC ...... F06F 40/20; G06F 40/137; G06F 40/237; G06F 40/169; G06F 40/247; G06F 40/131; G06F 40/143; G06F 1/28; G06F 40/197; G06N 3/049; G06N 3/08; G06N 20/00; G06N 7/01; G06N 3/04; G06Q 10/10; G05B 13/025
See application file for complete search history.

(56) References Cited

U.S. PATENT DOCUMENTS 9,501,469 B2    11/2016    Mccaffrey
9,646,266 B2    5/2017    Mccaffrey
(Continued)

OTHER PUBLICATIONS

Introducing ClaimChartGPT: The Cutting-Edge Solution to Your Patent Infringement Needs, email date Apr. 25, 2023, 2 pages.
(Continued)

*Primary Examiner* — Huyen X Vo
(74) *Attorney, Agent, or Firm* — Blueshift IP; Robert Plotkin

(57) ABSTRACT

A computer-implemented method: (A) receives product data identifying a product; (B) (B) receives patent data identifying a patent claim; (C) receives prior art data identifying a set of prior art, (D) executes an optimization process to minimize an objective function, the objective function including: a first sub-objective function and a second sub-objective function, the executing the optimization process comprising: (D)(1) generating a plurality of interpretations of the patent claim, (D)(2) for each particular interpretation in the plurality of interpretations of the patent claim: (D)(2) (a) using a first language model to evaluate the first sub-objective function with the product data and the particular interpretation as inputs to the first sub-objective function, (D)(2)(b) using a second language model to evaluate the second sub-objective function with the prior art data and the particular interpretation as inputs to the second sub-objective function.

20 Claims, 8 Drawing Sheets

(56) References Cited

U.S. PATENT DOCUMENTS

| | | | |
|---|---|---|---|
| 2009/0063560 A1* | 3/2009 | Wallace | G06F 16/3331 |
| 2013/0086094 A1* | 4/2013 | Lundberg | G06F 16/24578 |
| | | | 707/758 |
| 2016/0048936 A1* | 2/2016 | Perkowski | G06Q 10/063 |
| | | | 705/310 |

OTHER PUBLICATIONS

Wei, Jason, et al. "Chain-of-thought prompting elicits reasoning in large language models." Advances in Neural Information Processing Systems 35 (2022): 24824-24837.

Zhou, Yongchao, et al. "Large language models are human-level prompt engineers." arXiv preprint arXiv:2211.01910 (2022).

* cited by examiner

LANGUAGE MODEL-BASED MULTI-OBJECTIVE OPTIMIZATION

CROSS-REFERENCE TO RELATED APPLICATIONS

This application claims the benefit of the following provisional patent applications, each of which is incorporated by reference herein:
U.S. Prov. Pat. App. No. 63/435,147, entitled, "Computer-Automated Patent Analysis," filed on Dec. 23, 2022;
U.S. Prov. Pat. App. No. 63/440,200, entitled, "Computer-Automated Patent Analysis," filed on Jan. 20, 2023;
U.S. Prov. Pat. App. No. 63/451,435, entitled, "Computer-Automated Patent Analysis," filed on Mar. 10, 2023, 2023; and
U.S. Prov. Pat. App. No. 63/458,682, entitled, "Computer-Automated Patent Analysis," filed on Apr. 12, 2023.

BACKGROUND

Patent documents, such as patent applications and patents, typically require human experts to interpret for purposes such as determining whether claims of the patent documents are infringed.

SUMMARY

A computer-implemented method: (A) receives product data identifying a product; (B) (B) receives patent data identifying a patent claim; (C) receives prior art data identifying a set of prior art, (D) executes an optimization process to minimize an objective function, the objective function including: a first sub-objective function and a second sub-objective function, the executing the optimization process comprising: (D)(1) generating a plurality of interpretations of the patent claim, (D)(2) for each particular interpretation in the plurality of interpretations of the patent claim: (D)(2)(a) using a first language model to evaluate the first sub-objective function with the product data and the particular interpretation as inputs to the first sub-objective function, (D)(2)(b) using a second language model to evaluate the second sub-objective function with the prior art data and the particular interpretation as inputs to the second sub-objective function.

Other features and advantages of various aspects and embodiments of the present invention will become apparent from the following description and from the claims.

DETAILED DESCRIPTION

Figure 1A:
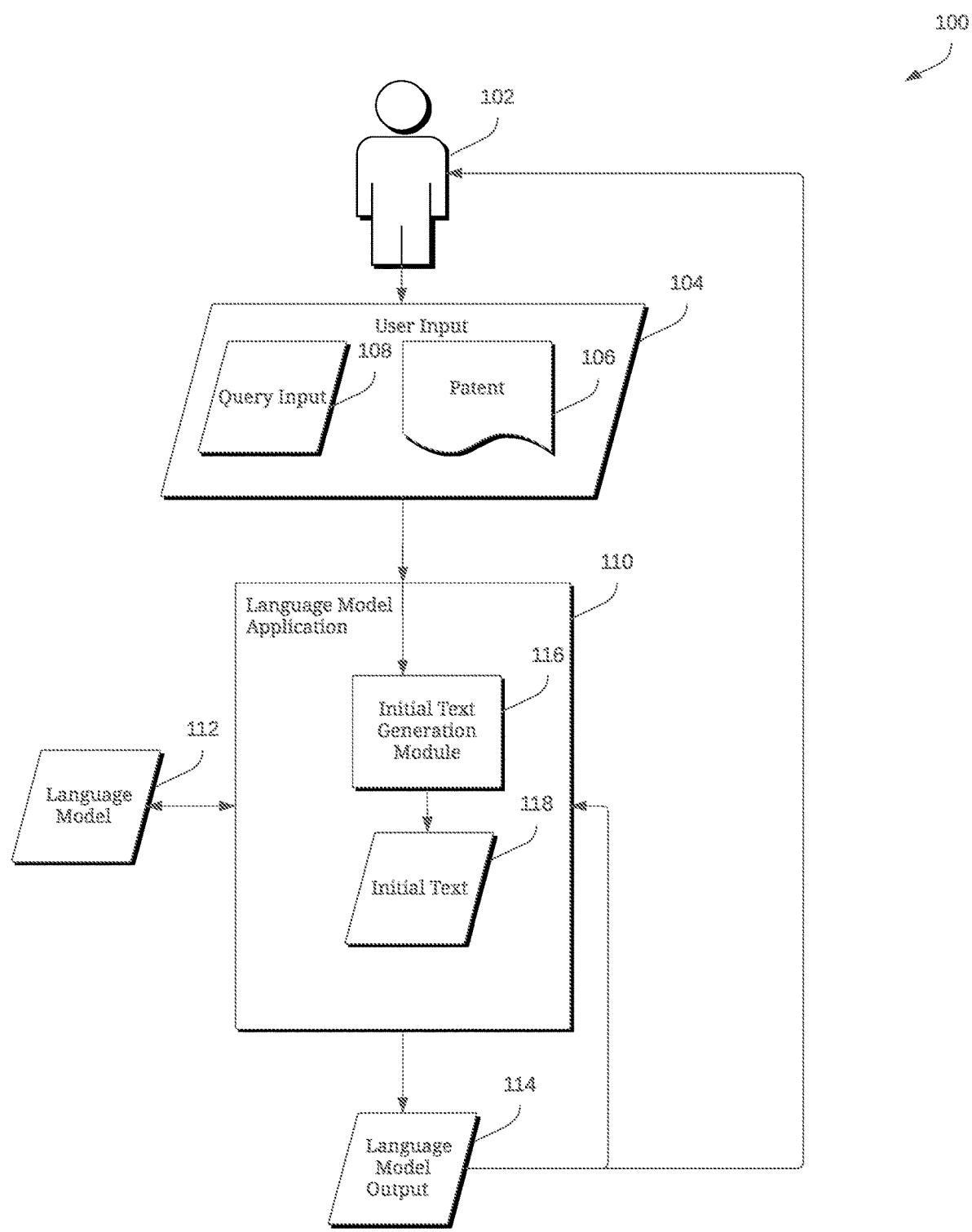
FIG. 1A is a dataflow diagram of a system for automatically generating output responsive to a query relating to a patent document according to one embodiment of the present invention.
Figure 1B:
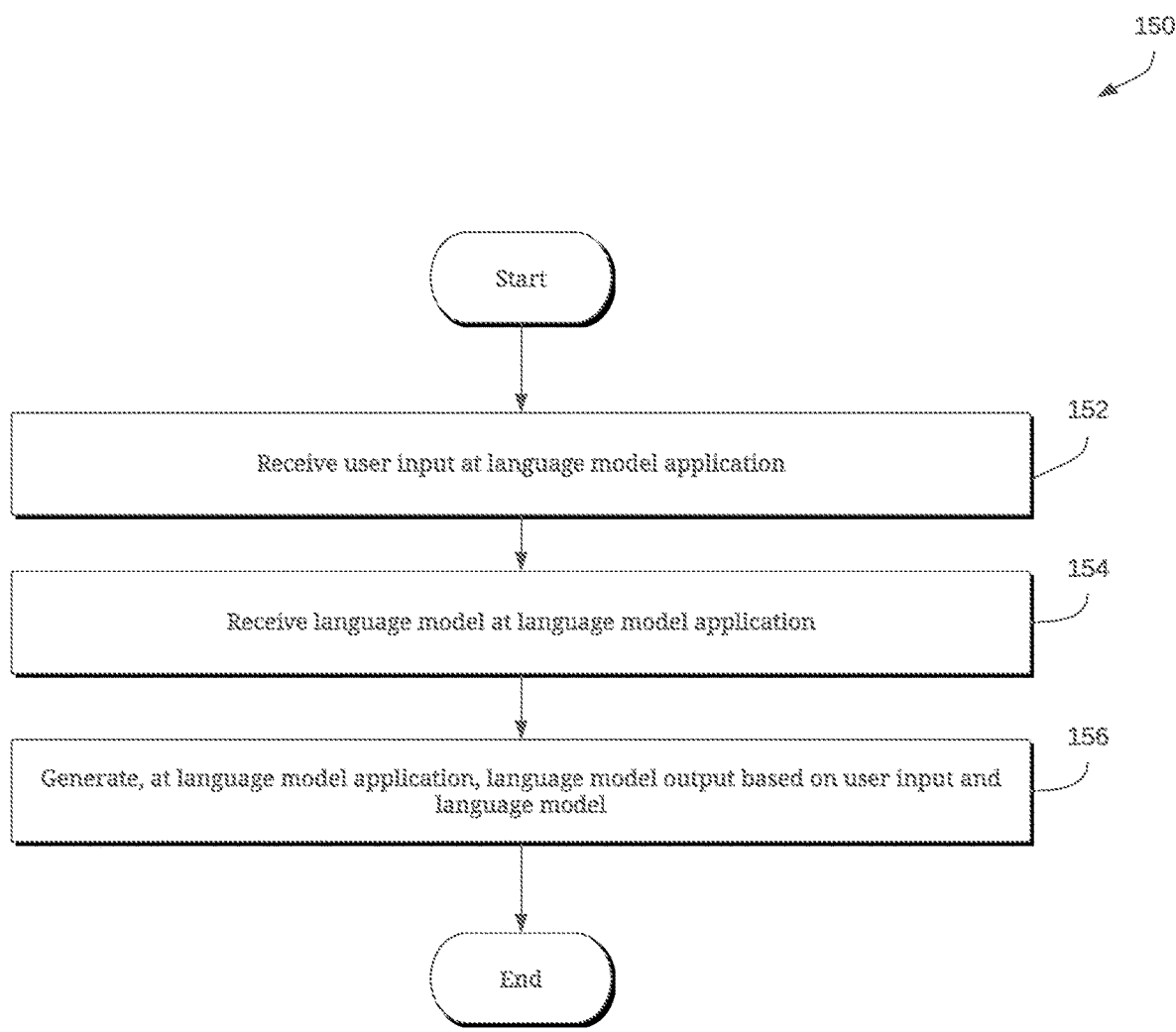
FIG. 1B is a flowchart of a method performed by the system of FIG. 1A according to one embodiment of the present invention.

Referring to FIG. 1A, a dataflow diagram is shown of a system 100 for automatically generating output responsive to a query relating to a patent according to one embodiment of the present invention. Referring to FIG. 1B, a flowchart is shown of a method 150 performed by the system 100 of FIG. 1A according to one embodiment of the present invention.

The system 100 includes a user 102, a language model 112, and a language model application 110. The user 102 provides user input 104 to the language model application 110, which receives the user input 104 (FIG. 1B, operation 152). The language model application 110 receives the language model 112 as input (FIG. 1B, operation 154). The language model application 110 generates, based on the user input 104 and the language model 112, language model output 114 (FIG. 1B, operation 156).

Without limitation, and solely to aid in understanding the disclosure herein, example of some terms used herein are provided below:

"Unstructured Text" (also referred to herein as "Freeform Text" and "Natural Language Text"): text written in a natural language (such as English), without any annotations (e.g., XML tags) that are specifically designed to enable a computer to understand the meaning of the text. Examples of unstructured text include:
"What are common components of a mousetrap?"
"A patent filed by ABC Corp. on Feb. 1, 2018 for a mousetrap."
"Many mousetraps include a hammer, a spring, a hold-down bar, a catch, and a platform."
"Structured Text": data which includes both text (e.g., unstructured text) and annotations (also referred to as "markup"). The annotations (e.g., tags) represent meanings of the text. (As this implies, any annotations which represent meaning are examples of "meaning data," as that term is used herein.) For example, a particular annotation (or a particular set, e.g., pair, of annotations) may correspond to particular text within the structured text, and represent one or more meanings of the particular text. The meanings of the annotations may be unambiguously interpreted by a computer. Text written in a markup language, such as Extensible Markup Language (XML), is an example of structured text.
"Computer-Encoded Data" (also referred to herein as "Encoded Data"): data whose meaning(s) is/are unambiguously interpretable by a computer. Examples of computer-encoded data include binary numbers, integers, floating point numbers, enumerations, lists, pointers (e.g., URLs), and unions whose meaning(s) is/are unambiguously interpretable by a computer. An example of computer-encoded data is a Boolean variable representing the state of a hardware setting, in which a value of True means that the hardware setting is on and a value of False means that the hardware setting is off. Any particular instance of unstructured text may or may not be computer-encoded data, depending on whether that instance of unstructured text has a meaning that is unambiguously interpretable by a computer.

"Mixed Data": any combination of unstructured text and at least one of structured text and computer-encoded data "Lexical Token" (also referred to herein as a "Token"): a string with an assigned meaning that is unambiguously interpretable by a computer "Meaning Data": data representing one or more meanings of structured text, unstructured text, or computer-encoded data. Terms such as "contents of data" and "semantics of data" are used synonymously herein with "meaning(s) of data." Particular meaning data that represents one or more meanings of particular subject data is referred to herein as meaning data that "corresponds to" or is "associated with" the particular subject data. A computer-implemented system and/or method may, for example, generate meaning data corresponding to subject data based on that subject data, such as by applying any one or more of the following techniques, in any combination, to the subject data: semantic analysis, abstractive text summarization, natural language processing, natural language understanding, text simplification, information extraction, and named entity recognition. A human may, for example, manually input meaning data corresponding to subject data. Regardless of how and from which source meaning data corresponding to subject data is received, the meaning data corresponding to subject data may be stored in association with that subject data, such as by combining the meaning data with the corresponding subject data, annotating the subject data with the corresponding meaning data, and/or storing a link (e.g., URL or other pointer) between the meaning and the corresponding subject data. The resulting meaning data may or may not be contained within the corresponding subject data. As this implies, meaning data that corresponds to subject data may include data that is not within the subject data itself. Two or more units of subject data may have a common meaning (e.g., they may correspond to the same meaning data), whether or not those units of subject data share data in common. For example, the subject data "dog" and "cat" may share a meaning of "animal" even though neither the text "dog" nor the text "cat" includes the text "animal." Meaning data corresponding to subject data may be generated in any of a variety of ways, such as by performing any kind(s) of Natural Language Processing (NLP) on the subject data to generate the corresponding meaning data. An example of performing such NLP is applying any kind(s) of language model (e.g., any kind of language model disclosed herein) to the subject data to generate the corresponding meaning data. Meaning data may be represented in any of a variety of forms, such as in the form of unstructured text, structured text, and/or computer-encoded data. As one example, annotations (e.g., tags) in structured text may be an example of meaning data.

"Natural Language Processing (NLP)": processing information (e.g., any kind of subject data) to generate data representing one or more meanings of the information. NLP may use any of a variety of techniques, such as any one or more of the following, in any combination: conceptual ontologies, rule-based parsing, generative grammars, morphologies, machine learning (e.g., supervised, unsupervised, and/or semi-supervised machine learning), and neural NLP (e.g., representation learning and/or deep neural network-style machine learning).

"Subject Data": any combination of one or more of unstructured text, structured text, and encoded data "Query": any subject data which is suitable to be provided as input to a query processor "Unstructured Query": a query which consists of unstructured text "Structured Query": a query which consists of any combination of one or more of the following: (1) structured text; (2) a query written in a query language; (3) computer-encoded data, such as computer-encoded data representing one or more parameters and, for each such parameter, one or more corresponding search criteria (e.g., one or more parameter values); and (4) one or more Boolean operators connecting any of the foregoing and/or any subset(s) of the foregoing "Encoded Query": a query which consists of encoded data "Non-Freeform Query": a query which consists of structured text and encoded data "Result": any subject data which results from processing a query using a query processor "Unstructured Result": a result which consists of unstructured text "Structured Result": a result which consists of structured text "Encoded Result": a result which consists of encoded data "Non-Freeform Result": a result which consists of structured text and encoded data "Converter" (also referred to herein as a "Conversion Module"): a module which performs a "conversion operation" to generate, based on original subject data, corresponding converted subject data representing at least some of the meaning of the query or result, wherein the converted subject data is not identical to the original subject data. A converter may, for example, use a language model (e.g., an autoregressive language model, such as GPT-3) to generate some or all of the converted subject data based on some or all of the original subject data. As a particular example, a converter may use a GPT-based application, such as ChatGPT, available from OpenAI of San Francisco, California, USA to perform any of the functions of a converter disclosed herein. As an example, if the original subject data includes unstructured text, the converter may use a language model (e.g., an autoregressive language model, such as GPT-3) to generate some or all of the converted subject data (which may include or consist of unstructured text) based on some or all of the unstructured text in the original subject data. Examples of the operation of a converter include:

Converting input structured text into output unstructured text, wherein at least some of the output unstructured text has the same meaning as at least some of the input structured text. At least some of the input structured text may be contained in the output unstructured text.

Converting input unstructured text into output structured text, wherein at least some of the output structured text has the same meaning as at least some of the input unstructured text. At least some of the input unstructured text may be contained in the output structured text.

Converting input structured text into output encoded data, wherein at least some of the output encoded data has the same meaning as at least some of the input structured text. At least some of the input structured text may be contained in the output encoded data.

Converting input unstructured text into output encoded data, wherein at least some of the output encoded data has the same meaning as at least some of the input unstructured text. At least some of the input unstructured text may be contained in the output encoded data.

Converting input encoded data into output unstructured text, wherein at least some of the output unstructured text has the same meaning as at least some of the input encoded data. At least some of the input encoded data may be contained in the output unstructured text.

Converting input encoded data into output structured text, wherein at least some of the output structured text has the same meaning as at least some of the input encoded data. At least some of the input encoded data may be contained in the output structured text.

"Query Processor" (also referred to herein as a "Query Processing Module"): a module which performs a "query operation" to generate, based on a query, a result, where the result may or may not include any of the data in the query, where the query may or may not include any of the data in the result, and where the result may or may not have any meaning in common with the query. A query processor may generate the result based on the query in any of a variety of ways, such as by using any techniques known to be used by conventional search engines/query language processors and/or by applying a language model (e.g., an autoregressive language model, such as GPT-3) to some or all of the query to generate some or all of the result. As a particular example, a query processor may use a GPT-based application, such as ChatGPT, available from OpenAI of San Francisco, California, USA to perform any of the functions of a query processor disclosed herein. As an example, if the query includes unstructured text, the query processor may use a language model (e.g., an autoregressive language model, such as GPT-3) to generate some or all of the result (which may include or consist of unstructured text) based on some or all of the unstructured text in the query. Examples of the operation of a query processor include:

processing a query which includes or consists of input structured text to generate a result which includes or consists of output unstructured text;

processing a query which includes or consists of input unstructured text to generate a result which includes or consists of output structured text;

processing a query which includes or consists of input structured text to generate a result which includes or consists of output encoded data;

processing a query which includes or consists of input unstructured text to generate a result which includes or consists of output encoded data;

processing a query which includes or consists of input encoded data to generate a result which includes or consists of output unstructured text; and processing a query which includes or consists of input encoded data to generate a result which includes or consists of output structured text.

"Transformer" (also referred to herein as a "Transformation Module"): a module which performs a "transformation operation" and thereby is, or performs the functions of, a converter and/or a query processor. A transformer receives a transformation input and performs a transformation operation on the transformation input to produce a transformation output. A converter is an example of a transformer; as this implies, a conversion operation is an example of a transformation operation, in which the transformation input is original subject data and in which the transformation output is converted subject data. A query processor is an example of a transformer; as this implies, a query operation is an example of a transformation operation, in which the transformation input is a query and in which the transformation output is a result. A transformer which solely performs the functions of a converter is an example of a transformer. A transformer which solely performs the functions of a query processor is an example of a transformer. A transformer which performs the functions of both a converter and a query processor is an example of a transformer. As this implies, the functions of a converter and a query processor may be implemented in a single module, which is an example of a transformer. Terms such as "transformation module," "transformer," and "transformation" should be understood to have the meanings used herein, and should not be interpreted to be limited to the meaning of a "transformer" within the context of a Generative Pre-Trained Transformer (GPT). A transformation operation may, for example, include performing any one or more of the following, in any combination, whether or not including the use of a language model:

applying a language model to the transformation input to produce the transformation output;

applying a model that is not a language model (e.g., a neural network that is not a language model) to the transformation input to produce the transformation output;

performing any kind of NLP on the transformation input to produce the transformation output;

applying one or more rules to the transformation input to produce the transformation output;

applying one or more algorithms to the transformation input to produce the transformation output;

applying any parsing technique(s) to the transformation input to produce the transformation output;

using a lexical database to generate or otherwise identify, based on the transformation input, transformation output containing any one or more of the following, in any combination: one or more synonyms of the transformation input, one or more antonyms of the transformation input, one or more hypernyms of the transformation input, and one or more hyponyms of the transformation input;

generating or otherwise identifying, based on the transformation input, a class that contains one or more instances represented by the transformation input, to generate the transformation output;

generating or otherwise identifying, based on the transformation input, one or more instances of a class represented by the transformation input, to generate the transformation output;

performing a search (e.g., a structured search) of a dataset (e.g., a database) using a query (e.g., the transformation input and/or a query generated based on the transformation input) to produce a search result;

performing a transformation specified by input received from a user (e.g., user 102);

ranking the transformation input, e.g., assigning values to data within the transformation input, such as data that assigns relative ranks to data within the transformation output, to generate the transformation output;

filtering the transformation input, e.g., removing data from the transformation input, such as by removing data whose values (assigned in the ranking above) satisfy (or do not satisfy) one or more criteria, to generate the transformation output;

sorting the transformation input, e.g., changing the order of data within the transformation input, such as based on the values assigned in the ranking above, to generate the transformation output;

annotating the transformation input, e.g., associating meaning data with the transformation input, such as by storing such meaning data within the transformation input, to generate the transformation output;

supplementing the transformation input, e.g., adding data to the transformation input, such as by adding one or more of the following, in any combination, to the transformation input, to generate the transformation output;

summarizing the transformation input, e.g., generating summary data based on data in the transformation input, and either replacing the summarized data with the summary data or adding the summary data to the transformation input, to generate the transformation output;

rephrasing the transformation input, e.g., generating transformation output (e.g., plain text) that shares at least some meaning with the transformation input, but which is written using different words, such as words that convey the common meaning in a way that is easier to understand (e.g., omits legal jargon) than the transformation input; and normalizing the transformation input, e.g., normalizing values and/or putting data within the transformation input into a normalized form (e.g., a canonical form), to generate the transformation output.

"Patent Claim" (also referred to herein as a "Claim"): data (e.g., unstructured text, structured text, and/or computer-encoded data) defining an invention. A patent claim may, for example, consist of unstructured text. A patent claim may, for example, be written in a format that complies with the patent law of one or more legal jurisdictions (e.g., countries and/or regions). A patent claim may, for example, be part of a patent claim set. A patent claim may, for example, be part of a patent document. A patent claim may, for example, be an independent claim or a dependent claim. A patent claim may, for example, include structured text which includes both unstructured text of a patent claim from a patent document (e.g., a published patent application or an issued patent) and markup of the patent claim from the patent document. A patent claim may, in addition to or instead of the data described above, include meaning data representing one or more meanings of the patent claim. For example, a patent claim may include computer-encoded data (e.g., one or more tokens) representing the meaning of unstructured text.

"Independent Patent Claim" (also referred to herein as an "Independent Claim"): a patent claim that is not a dependent patent claim.

"Dependent Patent Claim" (also referred to herein as a "Dependent Claim"): a patent claim that makes reference to at least one other patent claim (such as one or more independent patent claims and/or one or more dependent patent claims) and thereby depends on the at least one other patent claim. A dependent claim incorporates all of the limitations of the other patent claim(s) on which it depends. A dependent claim that depends on an independent claim is said to be a "child" of the independent claim, and the independent claim is said to be a "parent" of the dependent claim. When a first claim depends on a second claim indirectly through a third claim (as in the example of claim 3, which depends on claim 2, which depends on claim 1), the first claim is said to be a "descendant" of the second claim, and the second claim is said to be an "ancestor" of the first claim.

"Patent Claim Set": a set of one or more patent claims. At least one patent claim in a patent claim set may be a dependent claim which depends on at least one other claim in the patent claim set. A patent claim set may, for example, include one or more independent claims. A patent claim set may, for example, include one or more dependent claims. The dependencies (if any) in a patent claim set define a hierarchical structure in which each independent claim corresponds to a root node in the hierarchical structure, and in which each dependent claim corresponds to a child (e.g., leaf) node in the hierarchical structure. A patent claim set may, for example, be part of a patent document, such as a published patent application or an issued patent. For example, a patent claim set may include all of the claims in a published patent application or an issued patent.

"Patent Claim Element" (also referred to herein as a "Claim Element" or "Element"): a portion of a patent claim which describes a component of a product or an act in a process. A patent claim may include one or a plurality of claim elements, each of which describes a corresponding component or act. A claim element may, for example, include or consist of unstructured text. A claim element may, for example, include or consist of structured text. A claim element may, for example, include or consist of computer-encoded data. A claim element may, for example, include structured text which includes both unstructured text of a claim element from a patent document (e.g., a published patent application or an issued patent) and markup of the claim element from the patent document. A claim element may, in addition to or instead of the data described above, include meaning data representing one or more meanings of the claim element. For example, a claim element may include computer-encoded data (e.g., one or more tokens) representing the meaning of unstructured text.

"Patent Claim Limitation" (also referred to herein as a "Claim Limitation" or a "Limitation"): a portion of a patent claim which describes a property of the product or process recited by the claim, or which describes a property of a product or process that is related to the product or process recited by the claim. For example, a claim limitation may describe a workpiece that is not an element of the product or process recited by the claim. Multiple limitations in a claim, which may be noncontiguous within the claim, may have the same meaning as each other. In such a case, both limitations (e.g., text strings) may be referred to as a single limitation in reference to their common meaning. For example, in the claim text, "a shelf having a planar surface and a screw affixed to the planar surface of the shelf," the text "planar surface" appears twice and may be referred to as two limitations in reference to the two "planar surface" text strings, and may also be referred to as a single limitation in reference to the common meaning of the two "planar surface" text strings. A patent claim may include one or a plurality of claim limitations, each of which describes a corresponding property. A claim limitation may, for example, include or consist of unstructured text. A claim limitation may, for example, include or consist of structured text. A claim limitation may, for example, include or consist of computer-encoded data. A claim limitation may, for example, include structured text which includes both unstructured text of a claim limitation from a patent document (e.g., a published patent application or an issued patent) and markup of the claim limitation from the patent document. A claim limitation may, in addition to or instead of the data described above, include meaning data representing one or more meanings of the claim limitation. For example, a claim limitation may include computer-encoded data (e.g., one or more tokens) representing the meaning of unstructured text.

"Patent Drawing": an image in a patent document. Typically, patent drawings are located on pages that are separate from the specification (e.g., Summary, Detailed Description, Claims, and Abstract) of a patent document, and are numbered sequentially. Patent drawings may include text in addition to line drawings and other images. Any functions herein which are described as being applied to a patent document (e.g., performing a transformation, applying a language model) may be applied to one or more patent drawings in the patent document.

"Patent Document": any of the following, which may or may not be stored in a file in a computer file system:
a patent issued (in some jurisdictions referred to as "granted" or "registered") by any government or agency that has legal authority to issue patents (such as the U.S. Patent and Trademark Office, the European Patent Office, or the Japan Patent Office);
a patent application published by any government or agency that has legal authority to publish patent applications (such as the World Intellectual Property Organization); and
subject data of any of the kinds disclosed herein (whether or not in the form of a document) containing any one or more of the following, in any combination, whether or not issued or published by any government or other entity: a complete or partial patent specification, one or more patent claims (e.g., a patent claim set, or a subset of the claims therein), and one or more patent drawings. As this implies, a patent document may, for example, not include all of the parts that are required by law in a published patent application or an issued patent. For example, a patent document may include one or more claims, but not include a specification. As another example, a patent document may include a specification, but not include any claims.

"Patent Document Identifier (ID)": any data that uniquely identifies a particular patent document. The particular patent document that is identified by a particular patent document identifier is said to "correspond to" or "be associated with" that particular patent document identifier, and vice versa. A patent document identifier may, for example, include or consist of any subject data (e.g., any one or more of unstructured text, structured text, and computer-encoded data, in any combination), or a pointer (e.g., URL) to any such data. A patent document identifier may, for example, include or consist of a patent number, a patent application publication number, or a patent application serial number. A patent document identifier may, for example, include or consist of data (e.g., text) which a human and/or computer may process to identify a particular patent document unambiguously. As an example, consider the following text: "U.S. Pat. No. 9,876,543 to Smith ("the Smith '543 patent") issued on Jan. 1, 2002." In this example, the text "the Smith '543 patent" is an example of a patent document identifier (which unambiguously identifies U.S. Pat. No. 9,876,543) because it may be used, based on the contents of the entire sentence, to determine unambiguously that the text "the Smith '543 patent" identifies U.S. Pat. No. 9,876,543, even though the text "the Smith '543 patent" does not, by itself (i.e., without additional context) unambiguously identify U.S. Pat. No. 9,876,543. At least some subject data that is not a patent document ID may be used as input to a transformer (e.g., a converter or a query processor) to generate output that is a patent document ID.

"Patent Descriptor": any data that identifies (e.g., describes) one or a plurality of patent documents, whether unambiguously or ambiguously. A patent document ID is an example of a patent descriptor. An example of a patent descriptor that identifies one or a plurality of patent documents ambiguously is the unstructured text, "patents issued between January 1 and December 31 or 2020 which claim software for security a telecommunications network." Consider, as an example, a patent descriptor which is provided as an input to a transformer, which performs a transformation on the patent descriptor to generate output which contains or consists of one or both of the following: (1) a patent document identifier of a patent document; and (2) a patent document. In this example, the patent descriptor "identifies" the patent document. At least some subject data that is not a patent document descriptor may be used as input to a transformer (e.g., a converter or a query processor) to generate output that is a patent descriptor. For the avoidance of doubt, a patent descriptor may itself be or include a patent document that is identified by the patent descriptor. For example, a patent descriptor may itself be a patent document, as those terms are used herein.

"Structured Patent Query": a structured query which may be processed by a query processor in an attempt to identify one or more patent document identifiers and/or patent document. The result of using a query processor to process a structured patent query may be a set including or consisting of one or more patent document identifiers and/or one or more patent documents (or any subset thereof, e.g., one or more claims). A structured patent query may, for example, include or consist of one or more query terms (e.g., one or more parameter values) for each of one or more patent document fields, examples of which are Country and/or Jurisdiction (e.g., US, EPO, or WIPO), Application Number, Patent Number, Publication Number, Title, Filing Date, Publication Date, Grant Date (also referred to as Issue Date), Specification, Abstract, Claims, Assignee, Applicant, Inventor, Attorney, and Classification. The term "patent number" or "patent number field" may refer herein, for example, to: a number in isolation (e.g., "9,876,543"), in which case the country/jurisdiction of the patent document may be implied; a combination of a country and a number (e.g., "U.S. Pat. No.

9,876,543"); or a combination of a country, a number, and a document type (e.g., "U.S. Pat. No. 9,876,543B2"), merely as examples. Any two or more of such query terms may, for example, be connected by any Boolean operator(s), in any combination. Any of a variety of known structured searching techniques may, for example, be used by the query processor to perform a search using a structured patent query.

"Product Descriptor": any data that identifies (e.g., describes) one or a plurality of products, whether unambiguously or ambiguously. The term "product," as used herein, encompasses both products and services (e.g., methods/processes), as those terms are used in colloquial usage, unless otherwise stated. An example of a product descriptor that identifies one or a plurality of products ambiguously is the unstructured text, "products having a hammer, a spring, a hold-down bar, a catch, and a platform." A product descriptor may, for example, include or consist of unstructured text. A product descriptor may, for example, include or consist of structured text. A product descriptor may, for example, include or consist of computer-encoded data. A transformer (e.g., a converter or a query processor) may process a product descriptor in any of the ways disclosed herein to generate output. As an example, if such output uniquely identifies a product, then the product descriptor "identifies" the product. At least some subject data that is not a product descriptor may be used as input to a transformer (e.g., a converter or a query processor) to generate output that is a product descriptor.

"Feature Descriptor": any data that identifies (e.g., describes) one or a plurality of features of a product, whether unambiguously or ambiguously. The term "feature," as used herein, includes both components (e.g., physical components of physical products) and acts (e.g., acts performed by a process), unless otherwise stated. An example of a feature descriptor is the unstructured text, "a hammer." A feature descriptor may, for example, include or consist of unstructured text. A feature descriptor may, for example, include or consist of structured text. A feature descriptor may, for example, include or consist of computer-encoded data. A transformer (e.g., a converter or a query processor) may process a feature descriptor in any of the ways disclosed herein to generate output. As an example, if such output uniquely identifies a feature, then the feature descriptor "identifies" the feature. At least some subject data that is not a feature descriptor may be used as input to a transformer (e.g., a converter or a query processor) to generate output that is a feature descriptor.

"Structured Feature Query": a structured query which may be processed by a query processor in an attempt to identify data relating to (e.g., describing or uniquely identifying) one or more products. The result of using a query processor to process a structured product query may, for example, be a product descriptor. A structured feature query may, for example, include or consist of one or more query terms (e.g., one or more parameter values) for each of one or more product fields, examples of which are Make (e.g., Manufacturer), Model, Version, Release Date (e.g., Year), Category, UPC, and SKU. Any two or more of such query terms may, for example, be connected by any Boolean operator(s), in any combination. Any of a variety of known structured searching techniques may, for example, be used by the query processor to perform a search using a structured feature query.

Any transformer (e.g., a converter and/or a query processor) may produce its output based on its input by performing either: (1) a single transformation (e.g., conversion operation or query processing operation), also referred to herein as a "primitive transformation"; or (2) a compound transformation, which refers to performing a plurality of transformations (e.g., one or more conversions and/or query processing operations of any kind(s), in any combination), also referred to herein as "component transformations," and then performing a "combination operation" on the component transformation outputs to produce the transformer's output. Note that any of the component transformations in a compound transformation may itself be a primitive transformation or a compound transformation. As this implies, a component transformation within a compound transformation may itself include a plurality of component transformations, each of which may be either a primitive transformation or a compound transformation. Embodiments of the present invention do not impose any limits on the depth of compound transformations.

Each of the conversion operations in the plurality of transformations in a compound transformation may be any of the kinds of conversion operations disclosed herein, such as converting input structured text into output unstructured text, converting input unstructured text into output structured text, converting input structured text into output encoded data, converting input unstructured text into output encoded data, converting input encoded data into output unstructured text, or converting input encoded data into output structured text. Any two conversion operations in the plurality of transformations in a compound transformation may receive inputs of the same type as each other or of different types as each other, and may produce outputs of the same type as each other or of different types as each other. As one example, a first conversion operation in a compound transformation may convert first unstructured text into first structured text, and a second conversion operation in the compound transformation may convert the first structured text into second unstructured text. As another example, a first conversion operation in a compound transformation may convert first computer-encoded data into first structured text, and a second conversion operation in the compound transformation may convert the first structured text into first unstructured text.

Each of the query processing operations in the plurality of transformations in a compound transformation may be any of the kinds of query processing operations disclosed herein, such as processing input structured text to generate output unstructured text, processing input unstructured text to generate output structured text, processing input structured text to generate output encoded data, processing input unstructured text to generate output encoded data, processing input encoded data to generate output unstructured text, or processing input encoded data to generate output structured text. Any two query processing operations in the plurality of transformations in a compound transformation may receive inputs of the same type as each other or of different types as each other, and may produce outputs of the same type as each other or of different types as each other. As one example, a first query processing operation in a compound transformation may process first unstructured text to generate first structured text, and a second query processing operation in the compound transformation may process the first structured text to generate second unstructured text. As another example, a first query processing operation in a compound transformation may process first computer-encoded data to generate first structured text, and a second query processing operation in the compound transformation may process the first structured text to generate first unstructured text.

As the above description implies, a compound transformation may include one or more conversion operations and one or more query processing operations. As further implied by the description above, each such conversion operation and each such query processing operation may be any of the kinds disclosed herein, and such conversion operations and query processing operations may be combined in any way within a compound transformation. Any conversion operation and query processing operation in the plurality of transformations in a compound transformation may receive inputs of the same type as each other or of different types as each other, and may produce outputs of the same type as each other or of different types as each other. As one example, a conversion operation in a compound transformation may convert first unstructured text into first structured text, and a query processing operation in the compound transformation may process the first structured text to generate second unstructured text. As another example, a query processing operation in a compound transformation may process first computer-encoded data to generate first structured text, and a conversion operation in the compound transformation may convert the first structured text into first unstructured text.

As described above, a transformer may perform a compound transformation, which refers to performing a plurality of component transformations, each of which produces a corresponding component transformation output, and performing a "combination operation" on the component transformation outputs to produce the transformer's output. The combination operation may take any of a variety of forms, such as any one or more of the following, in any combination:

- including some or all of the component transformation outputs in the transformer's output, such as by generating the transformer's output as a union of some or all of the component transformation outputs;
- generating the transformer's output as unstructured text (e.g., one or more text strings) that includes some or all of the component transformation outputs, such as by concatenating some or all of the component transformation outputs into a single text string in the transformer's output;
- performing conversion operations on some or all of the component transformation outputs, such as by converting some or all of the component transformation outputs into converted outputs of the same type (e.g., unstructured text, structured text, or computer-encoded data), and including the resulting converted outputs in the transformer's output;
- sorting some or all of the component transformation outputs according to one or more sort criteria to produce sorted component transformation outputs in a particular sequence, and including the sorted component transformation outputs in the particular sequence in the transformer's output; and
- filtering the component transformation outputs according to one or more filter criteria to remove at least one of the component transformation outputs, thereby resulting in filtered component transformation outputs, and including the filtered component transformation outputs (but not the removed component transformation output(s)) in the transformer's output.

The user 102 may, for example, be any one or more of the following, in any combination:
- one or more humans;
- one or more devices (e.g., computers); and
- one or more computer programs (e.g., software applications).

For example, in some embodiments of the present invention, the user 102 is a human who generates the user input 104 using one or more input devices, such as any one or more of the following, in any combination: a keyboard, a mouse, a touchpad, a touchscreen, a microphone, and a camera. For example, the user 102 may type some or all of the user input 104 using a physical keyboard or virtual keyboard. As another example, the user 102 may speak, and the user's speech may be captured by a microphone, which may generate output signals representing the user 102's speech, and an automatic speech recognition (ASR) engine may recognize the user 102's speech to generate text, which may be included within the user input 104.

The user input 104 may take any of a variety of forms. For example, the user input 104 may include any kind of subject data, such as: (1) query input 108 representing a query; and/or (2) patent input 106, which may, for example, include one or more patent descriptors. The user input 104 may, for example, include any one or more of the following, in any combination:
- unstructured text;
- structured text, such as text which has been marked up with tags (e.g., HTML tags and/or XML tags);
- one or more tokens, such as one or more tokens representing contents of unstructured text (such as unstructured text in the user input 104) and/or contents of structured text (such as structured text in the user input 104);
- computer-encoded data;
- one or more documents, each of which may, for example, contain any one or more of the above, in any combination;
- one or more files containing any one or more of the above, in any combination; and
- one or more pointers, links, and/or references to any one or more of the above, in any combination.

The user input 104 may, for example, consist of unstructured text, such as a single sentence or a plurality of consecutive sentences. Text in the user input 104 may, for example, be written in a natural language (e.g., English), not in a language that is specifically designed to be understood by computers, such as a programming language (e.g., C, C++, or Java), a scripting language (e.g., JavaScript, Python, or PHP), or a query language (e.g., SQL, AQL, or XPath). The user input 104 may, for example, consist of text written in a natural language. As another example, the user input 104 may include non-text data that is not represented in a natural language, but all text in the user input 104 may be written in a natural language.

In cases in which the user input 104 includes both the query input 108 and the patent input 106, the query input 108 and the patent input 106 may or may not be disjoint within the user input 104. For example, the query input 108 and the patent input 106 may overlap partially or entirely. For example, some or all of the user input 104 may be included in both the query input 108 and the patent input 106. As a particular example, if the user input 104 includes or consists of text written in a natural language, then some or all of that text may be included in both the query input 108 and the patent input 106.

The user 102 and/or the system 100 more generally may generate the user input 104 in any of a variety of ways. For example, the user 102 may highlight or otherwise select one or more parts of a patent document (such as a patent document corresponding to the patent data 106), such as by using a user interface to select such parts of the patent document in visual output representing the patent document, or by typing or otherwise entering descriptions of such parts of the patent document (e.g., "U.S. Pat. No. 9,876,543, page 3, lines 10-20"). The system 100 may include the selected parts (and/or any output generated by a transformer (e.g., a converter and/or a query processor) when applied to some or all of the selected parts as input) within the user input 104.

The system 100 may, for example, prompt the user 102 to select or otherwise identify one or more parts of a patent document. For example, the system 100 may prompt the user 102 to select or otherwise identify any one or more of the following in a patent document: (1) the specification; (2) the Summary; (3) the Detailed Description; (4) the Abstract; (5) the claims; and (6) individual claims, including relationships among the claims (e.g., identifying that a particular claim depends on a particular other claim). The system 100 may generate and include data within the user input 104 based on such selections/identifications by the users. For example, in any of the techniques disclosed herein which involve identifying a claim of a patent document, the system 100 may use input received from the user 102 to identify the claim.

As is implied by the fact that the user 102 may, for example, be or include one or more devices (e.g., one or more computers) and/or one or more computer programs, the user 102 may, for example, generate the user input 104 partially or entirely automatically (i.e., without human intervention). As one example, the system 100 may receive a first instance of the user input 104 in any of the ways disclosed herein (e.g., via manual input received from the user 102, who may be a human), and use the language model application 110 to apply the language model 112 to the first instance of the user input 104 to generate a first instance of the language model output 114 in any of the ways disclosed herein. The system 100 may generate, based on the first instance of the language model output 114, a second instance of the user input 104 automatically (i.e., without input from a human). The system 100 may use the language model application 110 to apply the language model 112 to the second instance of the user input 104 to generate a second instance of the language model output in any of the ways disclosed herein.

Although only one instance of the user input 104 is shown in FIG. 1A for ease of illustration, the system 100 may include and process multiple instances of the user input 104 over time. Each such instance of the user input 104 may have any of the properties disclosed herein in connection with the user input 104, and such instances of the user input 104 may differ from each other in any of a variety of ways. For example, the contents of the different instances of the user input 104 may differ from each other in any of a variety of ways. As another example, the method by which different instances of the user input 104 may differ from each other in any of a variety of ways. For example, one instance of the user input 104 may be generated manually by the user 102, while another instance of the user input 104 may be generated automatically by the system 100.

As an example, the user input 104 may include patent data 106. The patent data 106 may, for example, include any data contained within and/or referring to one or more patent documents. The patent data 106 may, for example, include or consist of one or more patent document IDs. The patent data 106 may, for example, include or consist of one or more patent descriptors. The patent data 106 may, for example, include or consist of one or more patent document IDs and one or more patent descriptors.

Some particular examples of the patent data 106 include the following:
  a patent document issued by a government or agency that has legal authority to issue patents, such as in the form of a digital document (e.g., in plain text format, Rich Text Format (RTF), Microsoft Word format, or Portable Document Format (PDF)) representing that patent;
  a patent application published by a government or agency that has legal authority to publish patent applications, such as in the form of a digital document (e.g., in plain text format, Rich Text Format (RTF), Microsoft Word format, or Portable Document Format (PDF)) representing that patent application;
  a specification from any such patent or patent application;
  some or all of the drawings from any such patent or patent application;
  some or all of the claims from any such patent or patent application;
  a link (e.g., a hyperlink), pointer, or other reference to any of the above, such as an identifier of a patent number of any such patent (e.g., the plain text "U.S. Pat. No. 9,876,543"), an identifier of a publication number of any such patent application (e.g., the plain text "U.S. Pat. App. Pub. No. 2020/1234567"), or an identifier of a serial number of any such patent application (e.g., the plain text "U.S. application Ser. No. 16/123,456").

The patent data 106 may, additionally or alternatively, include any output generated by a transformer (e.g., a converter and/or a query processor when applied to some or all of the patent data described above.

The patent data 106 may be said herein to "correspond to" or "be associated with" one or more patent documents, and vice versa. For example, if the patent data 106 includes a particular issued patent, then the patent data 106 may be said to "correspond to" or "be associated with" that particular issued patent. As another example, if the patent data 106 includes an identifier of a patent document, such as a patent number, patent application publication number, or patent application serial number, of a patent document, then the patent data 106 may be said to "correspond to" or "be associated with" that patent document.

If a particular patent document identifier is associated with a particular patent document, and the particular patent document is associated with the patent data 106, then the particular patent document identifier is said herein to "be associated with" or "correspond to" the patent data 106, and vice versa.

Although the user input 104 is shown in FIG. 1A as including the patent data 106, this is merely an example and does not constitute a requirement of the present invention. The user input 104 may, for example, not include the patent data 106.

The user input 104 may, for example, contain query input 108. For example, the query input 108 may include or consist of a query, such as a query that refers to some or all of the patent data 106 and/or some or all of the patent document(s) associated with the patent data 106.

Before describing the query input 108, it should be noted that the user input 104 may, for example, contain:
- the patent data 106, but not the query input 108;
- the query input 108, but not the patent data 106;
- both the query input 108 and the patent data 106, and no other data;
- both the query input 108 and the patent data 106, in addition to other data (not shown in FIG. 1A); or
- neither the query input 108 nor the patent data 106.

As a particular example, the user input 104 may consist of the patent data 106. As another particular example, the user input 104 may consist of the query input 108.

The query input 108 may take any of a variety of forms. For example, the query input 108 may include any one or more of the following, in any combination:
- unstructured text;
- structured text, such as text which has been marked up with tags (e.g., HTML tags and/or XML tags);
- one or more documents, each of which may, for example, contain text, images, videos, and/or any combination thereof;
- one or more files containing one or more of the above; and
- one or more pointers, links, and/or references to one or more of the above.

The query input 108 may, for example, consist of unstructured text, such as a single sentence or a plurality of consecutive sentences. Text in the query input 108 may, for example, be written in a natural language (e.g., English), not in a language that is specifically designed to be understood by computers, such as a programming language (e.g., C, C++, or Java), a scripting language (e.g., JavaScript, Python, or PHP), or a query language (e.g., SQL, AQL, or XPath). The query input 108 may, for example, consist of text written in a natural language. As another example, the query input 108 may include non-text data that is not represented in a natural language, but all text in the query input 108 may be written in a natural language.

The query input 108 may, for example, refer to some or all of the patent data 106, directly and/or indirectly. For example, the query input 108 may refer to some or all of the patent data 106 by virtue of including any one or more of the following, in any combination:
- one or more machine-readable pointers, each of which may point to the patent data 106 as a whole or to any portion of the patent data 106; and
- text representing a patent document identifier associated with the patent data 106.

As stated above, the query input 108 may include data which refers to one or more portions of a patent document associated with the patent data 106. Such portions may include for example, any one or more of the following, in any combination:
- one or more sections of the patent document, such as by referring to each such section by name (e.g., "Summary," "Detailed Description," "Claims," or "Abstract") or by using an identifier of the section(s) in a Document Object Model (DOM) or other document model or object model;
- the specification of the patent document, e.g., all non-drawing content of the patent document except for the claims of the patent document;
- one or more paragraphs within the patent document, such as by referring to each such paragraph by paragraph number, or by referring to one or more ranges of paragraph numbers;
- one or more lines within the patent document, such as by referring to each such line by a combination of page and line number, or by referring to one or more ranges of page/line numbers (e.g., "page 2, line 10-page 4, line 20");
- some or all of the drawings of the patent document; and
- one or more elements within the drawings of the patent document, such as by referring to those elements by reference number.

Some or all of the query input 108 may, for example, be represented in any query language, such as SQL, AQL, or XPath. The query input 108 may represent any query that may be applied to the patent data 106. The query input 108 may represent a query that is applied to some or all of the patent data 106 in addition to other data (not shown).

The query input 108 may include or consist of text written in a natural language (e.g., English). As another example, the query input 108 may include non-text data that is not represented in a natural language, but all text in the query input 108 may be written in a natural language.

The query input 108 may include subject data which requests one or more features of the language model output 114 to be generated by the language model application 110 based on the user input 104 (including the query input 108). The language model application 110 may, for example, process the user input 104 in any of the ways disclosed herein to generate the language model output 114, which may have some or all of the features, if any, requested by the query input 108. The language model output 114 that is generated based on the user input 104 may or may not include the feature(s), if any, requested by the query input 108. Examples of features that may be requested by the query input 108, and which the language model output 114 may have, include any one or more of the following, in any combination:
- a data type of the language model output 114, e.g., binary (e.g., Yes or No), integer, floating point, token, string;
- a range within which the language model output 114 is requested to fall (e.g., a range of 0-10 or a range of 0-1.0);
- a set of values (e.g., tokens) from which the language model output 114 is to be selected;
- a confidence value representing a confidence that the language model output 114 is accurate;
- a minimum size (e.g., length) of the language model output 114;
- a maximum size (e.g., length) of the language model output 114;
- one or more sources (e.g., one or more patent documents, patent descriptors, and/or product descriptors) for the language model application 110 to use when generating the language model output 114;
- a tone in which the language model output 114 is to be written;
- a format in which the language model output 114 is to be written;
- a level/kind of complexity/understandability in which the language model output 114 is to be written, such as may be specified by a school grade level, age, and/or occupation of an audience by which the language model 114 is to be understandable.

Although not shown in FIG. 1A, the system 100 may also include a transformer of any kind disclosed herein, which may receive the user input 104 (e.g., the query input 108 and/or the patent data 106) as input, and which may perform a transformation of any kind disclosed herein on some or all of the user input 104 (e.g., the query input 108 and/or the patent data 106) to generate transformed user input (not shown). The transformation may, for example, include performing a query operation, using the query represented by the query input 108, on the patent data 106. The system 100 may provide the transformed user input to the language model application 110 in addition to, instead of, or in any combination with, the user input 104. As a result, any reference herein to the language model application 110 receiving and/or processing the user input 104 should be understood to refer to the language model application 110 receiving and/or processing any combination of the user input 104 and the transformed user input.

Any language model disclosed herein (e.g., the language model 112) may, for example, include one or more language models, such as any one or more of the following, in any combination:
- a unigram language model;
- an n-gram language model;
- an exponential language model;
- a generative language model;
- an autoregressive language model; and
- a neural network language model.

Any language model disclosed may, for example, include at least 1 billion parameters, at least 10 billion parameters, at least 100 billion parameters, at least 500 billion parameters, at least 1 trillion parameters, at least 5 trillion parameters, at least 25 trillion parameters, at least 50 trillion parameters, or at least 100 trillion parameters. Embodiments of the present invention may, however, use language models of any suitable size.

Any language model disclosed herein may, unless otherwise specified, have a size of a least 1 gigabyte, at least 10 gigabytes, at least 100 gigabytes, at least 500 gigabytes, at least 1 terabyte, at least 10 terabytes, at least 100 terabytes, or at least 1 petabyte.

Any language model disclosed herein (e.g., the language model 112) may, for example, include one or more of each of the types of language models above, unless otherwise specified. As a particular example, any language model disclosed herein (e.g., the language model 112) may, unless otherwise specified, be or include any one or more of the following language models, in any combination:
- Any language model in the GPT-n series of language models (such as GPT-1, GPT-2, GPT-3, or GPT-4) available from OpenAI Incorporated of San Francisco, California;
- any version of the Language Model for Dialogue Applications (LaMDA), Generalist Language Model (GLaM), Pathways Language Model (PaLM), or Gemini language model, available from Google LLC of Mountain View, California;
- any version of the Gopher language model, available from DeepMind Technologies of London, United Kingdom;
- any version of the Turing-NLG (Turing Natural Language Generation) language model, available from Microsoft Corporation of Redmond, Washington;
- any version of the Megatron Language Model (Megatron-LM), available from Nvidia Corporation of Santa Clara, California; and
- any version of the Large Language Model Meta AI (LLaMA), available from Meta Platforms, Inc. of Menlo Park, California.

The language model application 110 may receive some or all of the user input 104 as input. The language model application 110 may generate, based on the received user input 104 and the language model 112, language model output 114. The language model application 110 may apply the language model 112 to the user input 104 to generate the language model output 114. The language model application 110 may provide the user input 104 as input to the language model 112, which may generate the language model output 114 as output as a result. The language model output 114 may be said to be output of the language model 112 when the language model 112 is applied to the user input 104. As a particular example, the language model application 110 may include or otherwise use a GPT-based application, such as ChatGPT, available from OpenAI of San Francisco, California, USA to perform any of the functions of the language model application 110 disclosed herein.

The language model application 110 may provide the user input 104 to the language model 112, or otherwise apply the language model 112 to the user input 104, to generate the language model output 114. Additionally or alternatively, the language model application 110 may process the user input 104 to generate processed input, which the language model application 110 may provide to the language model 112 to generate the language model output 114. For example, the language model application 110 may include an initial text generation module 116, which may receive the user input 104 as input, and process the user input 104 in any of a variety of ways to generate initial text 118 as output. The initial text generation module 116 may, for example, use a transformer to perform any transformation operation disclosed herein on the user input 104 to generate the initial text 118 as output. The language model application 110 may provide the initial text 118 to the language model 112, either in addition to providing the user input 104 to the language model 112 or instead of providing the user input 104 to the language model 112.

As this implies, the language model application may generate, based on the language model 112, and the user input 104 and/or the initial text 118, the language model output 114. The language model application 110 may apply the language model 112 to the user input 104 and/or the initial text 118 to generate the language model output 114. The language model application 110 may provide the user input 104 and/or the initial text 118 as input to the language model 112, which may generate the language model output 114 as output as a result. The language model output 114 may be said to be output of the language model 112 when the language model 112 is applied to the received user input 104 and/or the initial text 118.

Use of a transformer to perform a transformation operation on the user input 104 and thereby to generate the initial text 118 as output may itself involve the use of one or more language models (e.g., the language model 112). For example, such a transformer may apply a language model (e.g., the language model 112) to some or all of the user input 104 to generate some or all of the initial text 118. Since the language model application 110 may subsequently apply the language model 112 to the initial text 118 to generate the language model output 114, the language model application 110 may use the language model 112 both to generate the initial text 118 and to generate the language model output 114 based on the initial text 118. This may be seen as using the language model 112 to generate a query, in the form of the initial text 118, which is itself used by the language model 112 to generate the language model output 114. The language model application 110 may, therefore, both be a query generator and a query processor. This is also the case if the language model application 110 uses a second language model, other than the language model 112 (not shown), to generate a query, in the form of the initial text 118, and then applies the language model 112 to the generated query (i.e., the initial text 118) to generate the language model output 114.

The language model application 110 may generate the initial text 118 using techniques that do not involve use of the language model 112 (or of any language model). For example, the user input 104 may include non-freeform data, such as a structured query (e.g., a title, filing date, and assignee of a patent), in which case the language model application 110 may use a template to generate the initial text 118 in the form of unstructured text representing the structured query, e.g., "a patent having a title of 'Mousetrap,' a filing date of Jan. 1, 2020, and an assignee of ABC Corp." In this example, the language model application 110 may generate the initial text 118 without using the language model 112 (e.g., without using any language model). The language model application 110 may use any of a variety of techniques to generate the initial text 118 based on the user input 104 (e.g., the query input 108 and/or the patent data 106) by applying any kind of transformation (e.g., conversion and/or query processing) to the user input 104 to generate the initial text 118, whether or not that transformation includes use of the language model 112 (and whether or not that transformation includes the use of any language model).

As implied by the description of transformers above, the language model application 110 may generate the initial text 118 based on some or all of the user input 104 using a compound transformer. As this implies:

The user input 104 may include or consist of unstructured text and the initial text 118 may include or consist of unstructured text. The language model application 110 may perform a compound transformation on some or all of the user input 104 to generate the initial text 118, where at least one of the component transformations of the compound transformation produces output which includes or consists of non-freeform data (e.g., structured text and/or computer-encoded data). As one example, the compound transformation may include: (1) a first transformation which generates first non-freeform data (e.g., structured text and/or computer-encoded data) based on some or all of the user input 104; and (2) a second transformation which generates the initial text 118 (which includes or consists of unstructured text) based on some or all of the first non-freeform data.

The user input 104 may include or consist of non-freeform data (e.g., structured text and/or computer-encoded data) and the initial text 118 may include or consist of unstructured text. The language model application 110 may perform a compound transformation on some or all of the user input 104 to generate the initial text 118, where at least one of the component transformations of the compound transformation produces output which includes or consists of non-freeform data (e.g., structured text and/or computer-encoded data). As one example, the compound transformation may include: (1) a first transformation which generates first non-freeform data (e.g., structured text and/or computer-encoded data) based on some or all of the user input 104; and (2) a second transformation which generates the initial text 118 (which includes or consists of unstructured text) based on some or all of the first non-freeform data.

As the above examples illustrate, a compound transformation performed by the language model application may produce intermediate output (by one or more of the compound transformation's component transformations) which is of a different type than the language model output 114, where "types" include unstructured text, structured text, and computer-encoded data. As the above examples further illustrate, a compound transformation performed by the language model application may produce intermediate output (by one or more of the compound transformation's component transformations) which is of a different type than the some or all of the user input 104.

The initial text generation module 116 may, for example, tokenize some or all of the user input 104 (e.g., some or all of the query input 108 and/or some or all of the patent 106) to generate tokens that represent the tokenized parts of the user input 104. The initial text generation module 116 may perform such tokenization at any stage(s) in the processing that it performs to generate the initial text 118. As a result of such tokenization, the initial text 118 may include some or all of the generated tokens. As this implies, the language model 112 may receive and act on such tokens as part of generating the language model output 114.

More generally, elements of the system 100 may perform tokenization on any of the data disclosed herein. For example, the system 100 may tokenize some or all of the user input 104 (e.g., some or all of the query input 108 and/or some or all of the patent 106) before the user input 104 is provided as input to the language model application 110. As a result of such tokenization, the user input 104 may include some or all of the generated tokens. As this implies, the language model application 110 may receive and act on such tokens as part of generating the language model.

When the system 100 tokenizes any data disclosed herein, the generated tokens may replace or supplement the data from which the tokens were generated. For example, if the system 100 tokenizes a unit of data in the user input 104 to generate a token representing that unit of data, the system 100 may: (1) add the token to the user input 104 and retain the unit of data in the user input 104; (2) add the token to the user input 104 and remove the unit of data from the user input 104; (3) retain the unit of data in the user input 104 and add the token to data other than the user input 104 (not shown); and/or (4) remove the unit of data from the user input 104 and add the token to data other than the user input 104 (not shown).

Despite the name of the initial text 118, the initial text 118 may include any kind of subject data, not only text. For example, the initial text 118 may include any of the data described above in connection with the user input (e.g., unstructured text, structured text, tokens, computer-encoded data, documents, files, and/or pointers). The term "initial" is used in connection with the initial text 118 because, if the language model 112 is a generative language model, then providing the initial text 118 to the language model 112 may result in the language model 112 treating the initial text 118 as a prompt and producing output which continues the prompt. (In fact that initial text 118 sometimes is referred to as a "prompt.") This use of "initial" is merely an example, however, and not a limitation of the present invention. More generally, the initial text 118 should be understood to be any data that may be provided as input to the language model 112, which may be any type of language model, not necessarily a generative language model, and not necessarily a language model which treats its input as initial text.

The initial text 118 may include some or all of the previous "dialogue" between the user 102 and the language model application 110, and/or data derived from such a dialogue (e.g., by applying a transformation to the dialogue). The "dialogue" between the user 102 and the language model application 110 refers to the sequence of pairs of: (1) instances of the user input 104; and (2) corresponding instances of the language model output 114. For example, consider a first instance of the user input 104, which is provided as input to the language model application 110, which generates a first corresponding instance of the language model output 114 based on the first instance of the user input 104 in any of the ways disclosed herein. Then consider a second instance of the user input 104, which is provided as input to the language model application 110 (after the language model application generates the first instance of the language model output 114), which generates a second corresponding instance of the language model output 114 based on the second instance of the user input 104. The data consisting of the first instance of the user input 104, the first instance of the language model output 114, the second instance of the user input 104, and the second instance of the language model output 114, in that order, is an example of a "dialogue" between the user 102 and the language model application 110. Although only two instances of the user input 104 and two corresponding instances of the language model output 114 are described in this example, a dialogue between the user 102 and the language model application 110 may include any number of such instances of the user input 104 and the language model application 110. The system 100 may automatically include, in the initial text 118, any subset of the dialogue between the user 102 and the language model application 110 at a particular time, such as by concatenating (e.g., prepending or postpending), with the current instance of the user input 104 received from the user 102, any subset of the dialogue between the user 102 and the language model application 110 that has occurred up to that time (or any transformation output resulting from performing a transformation (e.g., summary) operation on that subset of the dialogue).

The user input 104 may include data (referred to herein as "referent identification data" for ease of explanation) which represents or otherwise identifies a plurality of referents. Examples of such a plurality of referents include a plurality of patents, patent claims, patent claim elements, patent claim limitations, products, product categories, product manufacturers, and product industries. Referent identification data in the user input 104 which identifies such a plurality of referents may identify the plurality of referents in any of a variety of ways, such as in any one or more of the following ways, in any combination: (1) including a plurality of data elements, each of which refers to a distinct corresponding one of the plurality of referents (e.g., "U.S. Pat. Nos. 9,876,543, 9,876,542, and 9,876,541" to refer to three patents); or (2) include a single data element, which refers to the plurality of referents implicitly, as in the case of a data element representing a hyponym (e.g., "cats"), which implicitly refers to a plurality of the hyponym's hypernyms (e.g., Siamese cats, Persian cats, and Burmese cats). As disclosed elsewhere herein, any of a variety of transformation operations may be performed on a single data element which refers to a plurality of referents implicitly to generate a plurality of data elements, each of which refers to a distinct corresponding one of the plurality of referents explicitly, as in the example of applying a transformation on the text "cats" to generate the text "Siamese cats," "Persian cats," and "Burmese cats."

In the case of referent identification data (e.g., in the user input 104) which identifies a plurality of referents, regardless of the form taken by such referent identification data and regardless of how that referent identification data was generated, embodiments of the present invention may process such referent identification data in any of a variety of ways, such as in any one or more of the following ways, in any combination:

If the referent identification data identifies the plurality of referents implicitly, embodiments of the present invention may perform any of the functions herein on the referent identification data without modifying it. For example, referent identification data in the form of the text, "U.S. patents issued to IBM in December 2022," may be processed without modifying it. As an example, if that text is in the user input 104, the language model application 110 may include that text in the initial text 118 and process the initial text 118 in any of the ways disclosed herein.

If the referent identification data includes a plurality of referent identification data elements, each of which refers explicitly (e.g., uniquely or otherwise unambiguously) to a corresponding referent (e.g., the text "U.S. Pat. Nos. 9,876,543; 9,876,542; and 9,876,541"), embodiments of the present invention may perform any of the functions herein on the referent identification data without modifying it. As an example, if the text "U.S. Pat. Nos. 9,876,543; 9,876,542; and 9,876,541" is in the user input 104, the language model application 110 may include that text in the initial text 118 and process the initial text 118 in any of the ways disclosed herein.

If the referent identification data refers to a plurality of referents implicitly, then embodiments of the present invention may generate or otherwise identify, based on the referent identification data (e.g., by performing a transformation on the referent identification data), a plurality of referent identification data elements, and then perform, on each of some or all of the plurality of referent identification data elements, any function disclosed herein to generate output corresponding to that referent identification data element. For example, referent identification data in the form of the text, "U.S. patents issued to IBM in December 2022," may be processed to generate a plurality of patent descriptors (e.g., patent document identifiers), each of which describes a distinct corresponding U.S. patent issued to IBM in December 2022. Embodiments of the present invention may perform a function (e.g., a transformation) on each of the plurality of patent descriptors to generate corresponding output. For example, if the user input 104 includes the text, "U.S. patents issued to IBM in December 2022," embodiments of the present invention may provide each of the plurality of patent descriptors within the initial text 118 to the language model 112 to generate the language model output 114. If, for example, the user input 104 includes the text, "Does <Product X> infringe any U.S. patents issued to IBM in December 2022?," embodiments of the present invention may generate, for each of the plurality of patent descriptors, a corresponding instance of the initial text 118 (e.g., in the form, "Does <Product X> infringe <U.S. Patent Y>?") by including the patent descriptor within the initial text 118, and provide the resulting instance of the initial text 118 as input to the language model 112 to generate a corresponding instance of the language model output 114, thereby generating a plurality of instances of the language model output 114 based on and corresponding to the plurality of patent descriptors which were implicitly referred to by the user input 104.

If the referent identification data refers to a plurality of referents implicitly, then embodiments of the present invention may generate or otherwise identify, based on the referent identification data (e.g., by performing a transformation on the referent identification data), a plurality of referent identification data elements, and then perform, on some or all of the plurality of referent identification data elements in combination, any function (e.g., transformation) disclosed herein to generate output corresponding to that combination of referent identification data elements. For example, referent identification data in the form of the text, "U.S. patents issued to IBM in December 2022," may be processed to generate a plurality of patent descriptors (e.g., patent document identifiers), each of which describes a distinct corresponding U.S. patent issued to IBM in December 2022. Embodiments of the present invention may perform a function (e.g., a transformation) on some or all of the plurality of patent descriptors, in combination, to generate corresponding output. For example, if the user input 104 includes the text, "U.S. patents issued to IBM in December 2022," embodiments of the present invention may generate, based on that text, the plurality of patent descriptors, "U.S. Pat. No. 9,876,543," "U.S. Pat. No. 9,876,542," and "U.S. Pat. No. 9,876,541." Embodiments of the present invention may include some or all of this plurality of patent descriptors within the initial text 118 (e.g., by concatenating or otherwise combining them into the string, "U.S. Pat. Nos. 9,876,543; 9,876,542; and 9,876,541") and provide that initial text 118 as input to the language model 112 to generate the language model output 114. If, for example, the user input 104 includes the text, "Does <Product X> infringe any U.S. patents issued to IBM in December 2022?," embodiments of the present invention may include, within the initial text 118, the text, "Does <Product X> infringe any of the following: U.S. Pat. Nos. 9,876,543; 9,876,542; and 9,876,541?," and provide that input text as input to the language model 112 to generate a corresponding instance of the language model output 114.

If the referent identification data refers to a plurality of referents explicitly, then embodiments of the present invention may generate or otherwise identify, based on the referent identification data (e.g., by performing a transformation on the referent identification data), a single referent identification data element, and then perform, on the single referent identification data element, any function (e.g., transformation) disclosed herein to generate output corresponding to that single referent identification data element. For example, referent identification data in the form of the text strings, "Victor Mousetrap Model A," "Victor Mousetrap Model B," and "Victor Mousetrap Model C," may be processed to generate the text "Victor Mousetraps". In this example, a plurality of referent identification data elements, each of which referred to a distinct instance of a class, were processed to generate a single referent identification data element, which refers to the class. Embodiments of the present invention may perform a function on the single referent identification data element to generate corresponding output. For example, if the user input 104 includes the text, "Does Victor Mousetrap Model A, Victor Mousetrap Model B, or Victor Mousetrap Model C infringe U.S. Pat. No. 9,876,543?," embodiments of the present invention may generate, based on that text, the product descriptor, "Victor mousetraps." Embodiments of the present invention may include this product descriptor within the initial text 118 and provide that initial text 118 as input to the language model 112 to generate the language model output 114. If, for example, the user input 104 includes the text, "Does Victor Mousetrap Model A, Victor Mousetrap Model B, or Victor Mousetrap Model C infringe U.S. Pat. No. 9,876,543," embodiments of the present invention may include, within the initial text 118, the text, "Does any Victor Mousetrap infringe U.S. Pat. No. 9,876,543?," and provide that input text as input to the language model 112 to generate a corresponding instance of the language model output 114.

The language model output 114 may take any of a variety of forms. For example, the language model output 114 may include any kind of subject data disclosed herein (e.g., unstructured text, structured text, tokens, computer-encoded data, documents, files, and/or pointers). The language model output 114 may, for example, consist of text, such as unstructured text.

The language model output 114 may include data (e.g., text) representing a response to the query represented by the query input 108 when applied to the patent data 106.

The system 100 may provide the language model output 114 to the user 102. For example, the system 100 may provide the language model output 114 directly to the user 102 via one or more output devices, or the system 100 may generate, based on the language model output 114, processed language model output based on some or all of the language model output 114, and provide the language model output 114 and/or the derived language model output to the user 102 via one or more output devices. Examples of such output devices include display screens, printers, and speakers.

If the user 102 is or includes one or more devices and/or one or more computer programs, then the system 100 may provide the language model output 114 (and/or data derived therefrom) to such device(s) and/or computer program(s). For example, the system 100 may provide the language model output 114 to the user 102 via an Application Program Interface (API), by transmitting one or more messages to the user 102, by providing one or more files to the user 102, by communicating with the user 102 via an intra-program communication mechanism, or any combination thereof.

The system 100 may use any of the mechanisms described herein in connection with providing the language model output 114 as output to provide the language model output 114 to the language model application 110, which may receive the language model output 114 as input and perform any of a variety of processing on the language model output 114, such as in various ways disclosed herein.

As disclosed herein, generating the language model output 114 may include applying the language model 112 to the initial text 118 to generate the language model output 114. The language model output 114 may, therefore, include or consist of the raw output of the language model 112. The system 100 (e.g., the language model application 110) may perform any of a variety of processing on the language model output 114 (e.g., any transformation(s)) to generate processed language model output, which may supplement and/or replace the language model output 114. Any function disclosed herein as being performed on or by the language model output 114 may, alternatively or additionally, be performed on or by the processed language model output. The processing that is performed on the language model output 114 to generate the processed language model output may include, for example, any kind(s) of transformation(s) disclosed herein.

For example, such processing may include any one or more of the following, in any combination:

processing structured text in the language model output 114 to generate unstructured text in the processed language model output;

processing unstructured text in the language model output 114 to generate unstructured text in the processed language model output;

processing structured text in the language model output 114 to generate encoded data in the processed language model output;

processing unstructured text in the language model output 114 to generate encoded data in the processed language model output;

processing encoded data in the language model output 114 to generate unstructured text in the processed language model output;

processing encoded data in the language model output 114 to generate structured text in the processed language model output.

As some particular examples:

the language model output 114 may consist of unstructured text and the processed language model output may consist of structured text;

the language model output 114 may consist of unstructured text and the processed language model output may consist of unstructured text;

the language model output 114 may consist of structured text and the processed language model output may consist of encoded data;

the language model output 114 may consist of unstructured text and the processed language model output may consist of encoded data;

the language model output 114 may consist of encoded data and the processed language model output may consist of unstructured text;

the language model output 114 may consist of encoded data and the processed language model output may consist of structured text.

The system 100 (e.g., the language model application 110) may process the language model output 114 in any of a variety of ways to generate processed language model output (not shown), such as by performing any kind(s) of transformation operation on the language model output 114 to generate the processed language model output. Any description herein of functions that are performed in connection with the language model output 114 are equally applicable to the processed language model output.

Similarly, the system 100 may perform any kind(s) of transformation on any one or more of the following to produce transformed output, in which case any function disclosed herein as being performed on the input may, additionally or alternatively, be performed on the resulting transformed output:

some or all of one or more instances of the user input 104 (e.g., the instance of the user input 104 that was used as input to the language model 112 to generate the language model output 114, and/or one or more previous instances of the user input 104 that were used to generate previous instances of the language model output 114);

some or all of one or more previous instances of the language model output 114;

data obtained from one or more of the following, in any combination: a database (e.g., a patent database and/or a lexical database), the Internet (e.g., one or more results of an Internet search performed by an Internet search engine), a document, and input received from the user 102 other than the user input 104 (such as input received from the user 102 after the language model output 114 has been generated by the language model application 110).

As described above, the system 100 may provide the language model output 114 to the user 102 and/or to the language model application 110. Furthermore, the system 100 may provide the language model output 114 to other components, which are not shown in FIG. 1A. After the system 100 generates the language model output 114, the user 102 (or another user, not shown in FIG. 1A) may generate second user input (not shown, and which is also referred to herein as another instance of the user input 104), which may have any of the features of the user input 104 disclosed herein, but whose content may differ from the user input 104 in any way.

The second user input may, for example, be generated, at least in part, based on the language model output 114. For example, the user 102 may receive the language model output 114 as input and generate, based on some or all of the language model output 114, the second user input. As another example, the language model application 110 may receive the language model output 114 as input and generate, based on some or all of the language model output 114, the second user input. As another example, another application (not shown in FIG. 1A) that is distinct from the user 102 and the language model application 110, may receive the language model output 114 as input and generate, based on some or all of the language model output 114, the second user input.

The language model application 110 may receive the second user input as input and perform any of the functions disclosed herein in connection with the first user input 104 to generate second language model output 114 (not shown, and which is also referred to herein as a second instance of the language model output 114). In so doing, the language model application 110 may apply the same language model 112 and/or one or more language models other than the language model 112 (not shown).

The system 100 may apply the feedback loop described above, in which a first instance of the language model output 114 (and subsequent instances of the language model output 114) is used to generate an additional instance of the user input 104, which in turn is used to generate additional instances of the language model output 114, any number of times. Similarly, the system 100 may perform the functions disclosed herein any number of times to generate any number of instances of the language model output 114, whether or not the instance of the user input 104 provided to the language model application 110 in any particular iteration was generated based on language model output generated by the system 100 (e.g., an instance of the language model output 114).

The system 100 may retrain, or otherwise update, the language model 112 based on some or all of the language model output 114 in any of a variety of ways, such as by using any of a variety of known techniques for updating a language model based on its output. For example, the language model 114 may be used as training data to retrain or otherwise update the language model 112 using any training technique that was used to generate the language model 112. As another example, some or all of the language model output 114 may be provided to the user 102. The user 102 may provide feedback input (not shown) based on the language model output 114, such as feedback input indicating whether the user 102 considers the language model output 114 to be accurate. Such feedback input may take any of a variety of forms, such as a binary value (e.g., representing "Accurate" or "Inaccurate") or an accuracy score on some scale (e.g., 1-10). Any of a variety of known techniques may be used to retrain or otherwise update the language model 112 based on the language model output 114 and such feedback input from the user 102.

The system 100 may receive input (referred to herein as "feedback input") from a human (e.g., the user 102) and, in response to and/or based on that feedback input, the system 100 may perform any of a variety of functions on any data disclosed herein, such as any one or more of the following, in any combination:

ranking components of the data, e.g., assigning values to components of the data, based on the feedback input;

filtering the data, e.g., removing components of the data specified by the feedback input;

sorting, e.g., changing the order of components of the data based on the feedback input;

annotating, e.g., associating meaning data with the data specified by the feedback input;

approving or disapproving of the data, e.g., assigning a value of "approved" (or an equivalent) or "disapproved" (or an equivalent) to the data (and/or any one or more components thereof) based on the feedback input;

replacing some or all of the data based on the feedback input; and modifying the data based on the feedback input.

Examples of data that the above operations may be applied to include:

the user input 104, e.g., if the user input 104 was generated automatically by the system 100;

the query input 108, e.g., if the query input 108 was generated automatically by the system 100;

the patent input 106, e.g., if the patent input 106 was generated automatically by the system 100;

the language model 112;

the initial text 118; and the language model output 114.

In any case in which the system 100 performs an operation (e.g., a transformation) on data based on feedback input received from a user, the result of that operation may be or include a modified version of the data, referred to herein as "feedback-modified data." Examples of feedback-modified data include feedback data having components which have been ranked, filtered, sorted, approved/disapproved, replaced, and/or modified based on feedback input. Any of the functions which are disclosed herein as being performed on particular data may, additionally or alternatively, be performed on feedback-modified data that was generated based on the particular data. As just one example, if the system 100 modifies the initial text 118 based on feedback input received from the user 102 to generate a feedback-modified version of the initial text 118, then the system 100 may provide the feedback-modified version of the initial text 118 as input to the language model 112 (instead of or in addition to the initial text 118) to generate the language model output 114.

The system 100 may receive feedback input from a user (e.g., the user 102) in any of a variety of ways. For example, the system 100 may generate output, referred to herein as "initial output," based on particular data (e.g., the user input 104, the initial text 118, the language model 112, or the language model output 114), and provide the initial output to the user, such as by displaying the initial output on a display screen. The user may, after the initial output has been provided to the user, provide feedback input to the system 100. The user may, for example, provide the feedback input via a graphical user interface in which the initial output is displayed, such as by selecting a portion of the initial output (e.g., a subset of text within the initial output) corresponding to a portion of the particular data, and providing feedback input specifying one or more operations to perform on the portion of the particular data (e.g., approve/disapprove). In response to and/or based on the feedback input, the system 100 may perform the specified operation(s) on the portion of the particular data to produce feedback-modified data.

As merely some particular examples of feedback input and operations that the system 100 may perform on initial data to generate feedback-modified data, consider the following:

The user 102 may provide patent input 106, which may include a patent descriptor which does not unambiguously identify a single patent document. For example, the patent input 106 may include freeform text which ambiguously describes a plurality of patents, such as, "All patents issued to ABC Corp. on mousetraps in the last year." The system 100 may perform any of the functions disclosed herein to generate an original set of one or more patent document identifiers, and to generate output representing the original patent document identifier(s), such as in the form of visual output representing a list of the original patent document identifier(s). The user 102 may provide feedback input selecting some or all of the patents specified by the original patent document identifier(s), such as by selecting, next to the output representing each such patent document identifier, a checkbox. Based on such feedback input, the system 100 may generate feedback-modified data which includes only the patent document identifier(s) selected by the user 102. The system 100 may then perform any of the functions disclosed herein on the feedback-modified data (e.g., the selected patent document identifier(s)), e.g., in addition to or instead of performing those functions on the original plurality of patent document identifiers. Examples of such functions include determining whether the patent document(s) identified by the feedback-modified data (i.e., the selected patent document identifier(s)) is/are infringed by one or more products.

The user 102 may provide patent input 106, which may include a patent descriptor, which may or may not unambiguously identify a single patent document. For example, the patent input 106 may include freeform text, such as, "All patents issued to ABC Corp. in the last year." The system 100 may perform any of the functions disclosed herein to generate an original set of one or more patent document identifiers, and to identify one or more patent documents identified by the original set of patent document identifier(s). The system 100 may provide output representing the identified patent document(s), such as by displaying some or all of the text of the identified patent documents. The user 102 may provide feedback input selecting some or all of the claims in each of the identified patent documents. Such feedback input may, for example, include input specifying one or more of the following, in any combination, for each of one or more claims in one or more of the identified patent documents: (1) the text of the claim; (2) the claim number of the claim; (3) the relationship(s) of the claim to other claims in the same patent document (e.g., the claim(s) on which the claim depends); (4) the text of one or more elements in the claim; and (5) the text of one or more limitations in the claim. Based on such feedback input, the system 100 may generate feedback-modified data, which may, for example, annotate some or all of the claims of the identified patent document(s) with the corresponding feedback input received from the user 102.

The user 102 may provide query input 108, which may include a product descriptor which does not unambiguously identify a single product. For example, the query input 108 may include freeform text which ambiguously describes a plurality of products, such as, "All models of mousetrap sold by ABC Corp. in the last year." The system 100 may perform any of the functions disclosed herein to generate an original set of one or more product descriptors, and to generate output representing the original set of product descriptor(s), such as in the form of visual output representing the original set of product descriptors. The user 102 may provide feedback input selecting some or all of the products specified by the original set of product descriptor(s), such as by selecting, next to the output representing each such product descriptor, a checkbox. Based on such feedback input, the system 100 may generate feedback-modified data which includes only the product descriptors selected by the user 102. The system 100 may then perform any of the functions disclosed herein on the feedback-modified data (e.g., the selected product descriptor(s)), e.g., in addition to or instead of performing those functions on the original set of product descriptors. Examples of such functions include determining whether the products(s) identified by the feedback-modified data (i.e., the selected product descriptors (s)) infringe one or more patents.

The system 100 may generate initial output (e.g., within the language model output 114) indicating a prediction of whether a particular product falls within a scope of a meaning of (e.g., infringes) a particular patent claim, element, or limitation. The user 102 may provide, to the system 100, feedback input indicating the user's agreement or disagreement with the prediction represented by the initial output (e.g., "agree" or "disagree"), or feedback input representing a substitute prediction (e.g., "infringement" or "noninfringement"). The system 100 may, based on the feedback input, modify and/or supplement the initial output to generate feedback-modified output. For example, the system 100 may replace a prediction represented by the initial output (e.g., "infringement") with a substitute prediction represented by the feedback input (e.g., "noninfringement") to generate the feedback-modified output, which may include the substitute prediction and not the prediction represented by the initial output. The system 100 may perform any function disclosed herein in connection with an infringement prediction on the feedback-modified output.

Various outputs generated by embodiments of the present invention may represent predictions of various conditions. For example, the determination whether the subject features are within a scope of a meaning of subject patent claims in operation 306 of the sytem 206 of FIG. 3 may include or consist of generating a prediction whether the subject features are within a scope of a meaning of the subject patent claims. The same is true, for example, of operations 406, 506, 606, and 706. As this implies, any particular output which is described as indicating that a particular condition has been satisfied, e.g., whether a particular product descriptor falls within a scope of a meaning of a particular patent claim may, in certain embodiments, not necessarily indicate that the condition has been satisfied, but may instead, for example, merely indicate that an embodiment of the present invention has generated a prediction that the condition has been satisfied. As a result, any description herein of an operation which "determines whether" a particular condition has been satisfied should be understood to include, in at least some embodiments, generating a prediction whether the particular condition has been satisfied, whether or not that particular condition has been satisfied.

Any of the elements shown in FIG. 1A may be divided into additional elements and/or combined into fewer elements to perform the functions disclosed herein. Similarly, any of the functions disclosed herein as being performed by particular elements of the system 100 of FIG. 1A may, additionally or alternatively, be performed by other elements of the system 100 of FIG. 1A and/or by other elements not shown in FIG. 1A. For example, any functions disclosed herein as being performed by the initial text generation module 116 may, additionally or alternatively, be performed by the user 102. As a result, the user input 104 may have any of the properties of the initial text 118 disclosed herein. As another example, the user input 104 may be within the language model application 110 (e.g., the user input 104 may be generated by the language model application 110), in which case the language model application need not receive the user input 104 as input (e.g., operation 152 in FIG. 1B may be omitted). As another example, the language model 112 may be within the language model application 110, in which case the language model application 110 need not receive the language model 112 as input (e.g., operation 154 in FIG. 1B may be omitted).

The system 100 may, when performing any of the functions disclosed herein, use any natural language processing (NLP) and/or any of a variety of other techniques to recognize the meaning of words, phrases, and other text/data, and to store data (e.g., XML tags) representing such recognized meanings, e.g., within the user input 104, the initial text 118, and/or the language model output 114. Data representing such meanings may be stored in addition to, or instead of, the data (e.g., text) that was used to generate the data representing such meanings (referred to herein as "source data"). If data representing such meanings are stored in addition to the source data, then the system 100 may store data linking the source data to the data that was generated based on the source data. Any of the functions that are disclosed herein may be performed on source data and/or data generated based on source data.

The system 100 may, when performing any of the functions disclosed herein on any particular subject data, perform any one or more of the following, in any combination:
  generate or otherwise identify, based on the subject data, class data representing a class that contains one or more instances represented by the subject data;
  generate or otherwise identify, based on the subject data, instance data representing one or more instances of a class represented by the subject data;

For example, if particular subject data is or includes a product descriptor that describes a particular product (e.g., "Victor Mousetrap Model A"), the system 100 may generate or otherwise identify class data representing one or more manufacturers, product categories, industries, patent classifications, and/or other classes that contain the Victor Mousetrap Model A. As another example, if particular subject data is or includes a product descriptor that describes a product category (e.g., "mousetraps"), the system 100 may generate or otherwise identify instance data representing one or more instances of that category, such as one or more makes of mousetrap (e.g., "Victor mousetraps") and/or one or more models of mousetrap (e.g., "Victor Mousetrap Model A" and "Victor Mousetrap Model B").

As another example, if particular subject data is or includes a patent descriptor that describes a particular patent (e.g., "U.S. Pat. No. 9,876,543"), the system 100 may generate or otherwise identify instance data representing one or more patent classifications, art units, technology centers, assignees, inventors, and/or other class(es) that contain (or are otherwise associated with, e.g., via common metadata) U.S. Pat. No. 9,876,543. As another example, if particular subject data is or includes a patent descriptor that describes a patent classification, art unit, technology center, assignee, inventor, and/or other class(es) that contain (or are otherwise associated with, e.g., via common metadata) the described class, the system 100 may generate or otherwise identify instance data representing one or more instances of that category, such as one or more individual patents that are within the described class (e.g., "U.S. Pat. No. 9,876,543," "U.S. Pat. No. 9,876,542," and "U.S. Pat. No. 9,876,541").

The system 100 may, when performing any of the functions herein, use any of a variety datasets (e.g., databases and/or ontologies), such as:

One or more datasets (e.g., databases) that represent synonyms, antonyms, hypernyms, and/or hyponyms. An example of such a dataset is a lexical database, such as the WordNet® lexical database. The system 100 may use such a dataset to identify, for any particular source data (e.g., word, phrase, or other text) (e.g., within the user input 104, the initial text 118, and/or the language model output 114), corresponding mapped data (e.g., a word, phrase, or other text) that has a specified relationship to the source data, such as a synonym, antonym, hypernym, or hyponym relationship. The system 100 may store the mapped data in addition to, or instead of, the source data. If mapped data are stored in addition to corresponding source data, then the system 100 may store data linking the source data to the corresponding mapped data. Such linking data may, for example, be unidirectional or bidirectional. Any of the functions that are disclosed herein may be performed on source data and/or mapped data. Replacing or supplementing particular source data (e.g., a word, phrase, or other text) with one or more synonyms, antonyms, hypernyms, and/or hyponyms of the particular source data is an example of a "conversion operation," as that term is used herein. In some embodiments, a "hyponym" of a particular term is a term that a lexical database identifies as a direct hyponym of the particular term. In other embodiments, a "hyponym" of a particular term is a term that a lexical database identifies as a direct or indirect hyponym of the particular term (e.g., a hyponym of a hyponym of the particular term). In some embodiments, a "hypernym" of a particular term is a term that a lexical database identifies as a direct hypernym of the particular term. In other embodiments, a "hypernym" of a particular term is a term that a lexical database identifies as a direct or indirect hypernym of the particular term (e.g., a hypernym of a hypernym of the particular term).

One or more datasets (e.g., databases) containing data relating to one or more products, such as the Consumer Product Information Database, available from the National Institute of Environmental Health Sciences (NIEHS) of the National Institutes of Health (NIH) of the U.S. Public Health Service in the U.S. Department of Health & Human Services. Any such dataset may, for example, include, for each of a plurality of products, any one or more of the following data fields, each having one or more corresponding values, in any combination: name, brand, type, ingredients, manufacturer, and SKU. Any function disclosed herein which involves generating and/or identifying product information (e.g., one or more product descriptors) may, for example, use such a product-related dataset in the performance of that function.

One or more datasets (e.g., databases) containing data relating to one or more patents, such as any patent-related database available from a patent office, such as the U.S. Patent and Trademark Office (USPTO), World Intellectual Property Organization (WIPO), or European Patent Office (EPO). Any function disclosed herein which involves generating and/or identifying a patent descriptor and/or a patent document may, for example, use such a patent-related database in the performance of that function.

Embodiments of the present invention may, when performing any of the functions disclosed herein, generate and/or use one or more models (e.g., one or more language models) that have been generated based on any of the data disclosed herein, such as any of the lexical datasets, product datasets, and/or patent datasets disclosed herein. Embodiments of the present invention may, for example, update the language model 112 based on any such data, such as by updating the training of the language model 112 based on any such data (e.g., any of the lexical datasets, product datasets, and/or patent datasets disclosed herein). The resulting updated language model may be used to perform any of the functions disclosed herein in connection with the language model 112.

Any techniques disclosed herein for predicting whether first subject data falls within a scope of a meaning of second subject data may be used to predict, or modified to predict, whether the first subject data does not fall within a scope of a meaning of the second subject data in any of a variety of ways, such as any one or more of the following, in any combination:

Any technique disclosed herein may be used to predict whether the first subject data falls within a scope of a meaning of second subject data and thereby to generate output representing a result of such a determination. A function (e.g., a logical NOT operation or any inversion function) may be performed on that output to produce modified output, which may be treated as representing a prediction whether the first subject data does not fall within a scope of a meaning of the second subject data.

Any technique disclosed herein for predicting whether the first subject data falls within a scope of a meaning of second subject data may be modified to predict whether the first subject data falls within a scope of a meaning of second subject data in any of a variety of ways. For example, any query disclosed herein which asks whether first subject data falls within a scope of a meaning of second subject data may be modified to ask whether the first subject data does not fall within (or falls outside) a scope of a meaning of second subject data. For example, a query, "Does <Patent Claim Element X> describe <Product Feature Y>?," may be modified to produce a modified query, "Does <Patent Claim Element X> not describe <Product Feature Y>?" As another example, a query, "Does <Product Feature Y> fall within a scope of a meaning of <Patent Claim Element X>?," may be modified to produce a modified query, "Does <Product Feature Y> not fall within a scope of a meaning of <Patent Claim Element X>?" or "Does <Product Feature Y> fall outside a scope of a meaning of <Patent Claim Element X>?"

Having described various embodiments of the present invention, certain use cases of embodiments of the present invention will be described.

Embodiments of the present invention may generate output (e.g., the language model output 114) which represents a response to a query relating to infringement of a patent document in any of a variety of ways. For example, the following table contains examples of the user input 104 which may represent a query relating to infringement of a patent document. The "Query Specification" column of the table describes each query in general terms, and the "Query Text" column of the table provides example text that may be used to implement the corresponding specification from the "Query Specification" column.

In the tables below and elsewhere herein, text between angled brackets (i.e., "<" and ">") represents tokens, each of which may be implemented by corresponding specific text. For example, the token "<Patent Number>" may be implemented by any patent document identifier, such as "U.S. Pat. No. 9,876,543." As another example, the token "<Product X>" may be implemented by any text identifying or otherwise describing a particular product, such as "the model ABC mousetrap sold by American Mousetrap Corporation." In the tables below, "|" means "or," such that a string of the form "<A>|<B>" may, for example, be implemented as "<A>" or "<B>".

In the tables below and elsewhere herein, text of the form "<Product A>" is an example of a product descriptor, as that term is used herein. A product descriptor may, for example, identify (e.g., uniquely identify) a particular product (or service), product family (or service family), or product class (or service class). The referent of a particular product descriptor (e.g., a particular product/service, product/service family, or product/service class) is said to "correspond to" or "be associated with" that particular product descriptor, and vice versa. A product descriptor may, for example, include or consist of plain text, structured text, or a pointer (e.g., hyperlink). A product descriptor may, for example, include or consist of a description of the corresponding product/service, product/service family, or product/service class, whether or not that description is complete or unambiguous. A product descriptor may, for example, include or consist of data (e.g., text) which may be processed by any kind of transformer to generate output representing a particular product/service, product/service family, or product/service class unambiguously. An example of this is a combination of manufacturer, make, and model number.

The term "infringe," as used herein in connection with a particular patent document (or a part thereof, such as a claim, element, or limitation of the particular patent document) and a corresponding particular product or process (or a part thereof, such as a component of the particular product or a step or act of the particular process) means that the particular product or process (or part thereof) falls within the scope of a meaning of the particular patent document (or part thereof). A product or process (or part thereof) may "infringe" a particular patent document (or part thereof) even if the particular patent document (or the part thereof) has not issued as a patent. As a result, the term "infringe" is used herein with a meaning that is broader than the meaning of "infringe" within patent law, which only applies to claims of issued patents. Instead, as used herein, the phrase "<Product A> infringes <Claim B>," for example, may be understood to mean that <Product A> falls within the scope of a meaning of <Claim B>.

Any reference herein to determining whether first subject data (e.g., first text or a meaning of first text) "falls within a scope of a meaning of" second subject data (e.g., second text or a meaning of second text) may refer to performing such a determination in any of a variety of ways, such as any one or more of the following, in any combination:

Receiving input from a human user and determining whether a meaning of the first subject data falls within the scope of a meaning of second subject data based on the input. For example, the input may include a value (e.g., a binary value) which indicates whether a meaning of the first subject data falls within the scope of a meaning of second subject data, and the value may be used (e.g., without modification) to indicate the result of determining whether a meaning of the first subject data falls within the scope of a meaning of the second subject data.

Using a lexical database to determine whether a meaning of the first subject data falls within the scope of a meaning of second subject data, such as by performing any one or more of the following, in any combination:

Determining whether the first subject data is a synonym of the second subject data, and concluding that a meaning of the first subject data falls within the scope of a meaning of second subject data in response to determining that the first subject data is determined to be a synonym of the second subject data. It may be concluded that a meaning of the first subject data does not fall within the scope of a meaning of the second subject data in response to determining that the first subject data is not a synonym of the second subject data.

Determining whether the first subject data is a hyponym of the second subject data, and concluding that a meaning of the first subject data falls within the scope of a meaning of second subject data in response to determining that the first subject data is determined to be a hyponym of the second subject data. It may be concluded that a meaning of the first subject data does not fall within the scope of a meaning of the second subject data in response to determining that the first subject data is not a hyponym of the second subject data.

Determining whether the first subject data is a synonym or a hyponym of the second subject data, and concluding that a meaning of the first subject data falls within the scope of a meaning of second subject data in response to determining that the first subject data is determined to be a synonym or a hyponym of the second subject data. It may be concluded that a meaning of the first subject data does not fall within the scope of a meaning of the second subject data in response to determining that the first subject data is neither a synonym nor a hyponym of the second subject data.

Determining whether the first subject data is a hypernym of the second subject data, and concluding that a meaning of the first subject data falls within the scope of a meaning of second subject data in response to determining that the first subject data is determined to be a hypernym of the second subject data. It may be concluded that a meaning of the first subject data does not fall within the scope of a meaning of the second subject data in response to determining that the first subject data is not a hypernym of the second subject data.

Determining whether the first subject data is a hypernym of a hyponym of the second subject data, and concluding that a meaning of the first subject data falls within the scope of a meaning of second subject data in response to determining that the first subject data is determined to be a hypernym of a hyponym of the second subject data. As an example, if the first subject data is the token <cat> and the second subject data is the token <dog>, a hyponym of the token <dog> may be the token <animal>. In this example, the token <cat> may be a hypernym of the hyponym (i.e., the token <animal>) of the token <dog>. In this example, the first subject data and the second subject data are "cousins" in the lexical database, because they are both descendants (i.e., hypernyms), in different branches, of a common ancestor (i.e., the token <animal>).

Performing text entailment on the first subject data and the second subject data, which involves determining whether one unit of text entails another. Specifically, in textual entailment datasets, there are pairs of sentences and the goal is to determine if the relationship is positive textual entailment (one sentence entails the other), negative textual entailment (one sentence contradicts the other), or neither (text does not entail or contradict).

Generating initial text representing a query whether the first subject data falls within the scope of a meaning of the second subject data (e.g., "Does <First Subject Data> fall within the scope of the meaning of <Second Subject Data>?," or "Is <First Subject Data> an example of <Second Subject Data>?," "Is <First Subject Data> a <Second Subject Data>?," or "Is <First Subject Data> an instance of the class of <Second Subject Data>?"), providing that query as initial text 118 to the language model 112 to generate language model output 114 in any of the ways disclosed herein, and determining whether the first subject data falls within the scope of a meaning of the second subject data based on the language model output 114.

Using any dataset (e.g., dictionary, lexical database, language model, and/or other model) representing meanings of words, phrases, and/or tokens to determine whether a meaning of the first subject data falls within the scope of a meaning of second subject data. Examples of such datasets include, for example, any one or more of the following, in any combination:

A dataset (e.g., database) containing a plurality of patent documents.

A dataset (e.g., database) containing a plurality of patent-related decisions by courts and/or administrative bodies (e.g., one or more patent offices). For example, such a dataset may include decisions containing constructions (interpretations) of one or more patent claims and/or elements/limitations of such patent claims, such as may be the result of performing one or more "Markman hearings" under U.S. patent law.

A dataset containing meanings of one or more terms (e.g., words/phrases) contained in one or more patent claims. Such meanings may, for example, include a plurality of mappings, each of which maps a particular claim, element, or limitation to a corresponding meaning. Such meanings may or may not be obtained from legally-binding sources (e.g., court decisions and/or patent office decisions).

One or more models (e.g., language models) trained using any one or more of the above as training data. For example, a language model may be trained using training data that contains patent claims, elements, and/or limitations and corresponding meanings of such patent claims, elements, and/or limitations.

| Query Specification | Query Text | Example Language Model Output |
|---|---|---|
| Inquire whether a particular patent is infringed by a particular product/process | (1) "Does <Product X> infringe any claim of <Patent Number>?" <br> (2) "Does <Product X> infringe claim <Claim Number> of <Patent Number>?" <br> (3) "Is <Product X> described by the following description: <Claim Text \| Element Text \| Limitation Text \| Summary Text \| Abstract Text>?" <br> (4) "Does <Product X> infringe the element of <Claim Number> of <Patent Number> which recites <Element Text>?" <br> (5) "Does <Product X> infringe the limitation of <Claim Number> of <Patent Number> which recites <Limitation Text>?" | (1) "<Product X> infringes <Patent Number>" <br> (2) "<Product X> likely infringes <Claim Number> of <Patent Number> because <Product X> contains each of the elements of <Claim Number> of <Patent Number>" <br> (3) "<Product X> contains a <Element Text>, and therefore likely infringes the element of <Claim Number> of <Patent Number> which recites <Element Text>" <br> (4) "<Product X> likely satisfies the limitation of <Claim Number> of <Patent Number> which recites <Limitation Text> because <Product X> contains a <Component>, which is an example of a <Limitation Text>" |
| Inquire whether a particular patent claim is infringed by a particular product/process | (1) "Is <Claim> infringed by <Product>?" <br> (2) "Does <Product> infringe <Claim>?" | (1) "<Claim> is infringed by <Product>" <br> (2) "<Product> infringes <Claim>" |

| Query Specification | Query Text | Example Language Model Output |
|---|---|---|
| | (3) "Does <Claim> describe <Product>?"<br>(4) "Is <Product> described by <Claim>?"<br>(5) "Does <Claim> include <Product>?"<br>(6) "Does <Product> include <Claim>?"<br>(7) "Does <Product> perform <Claim>?" (e.g., in the case of a process and a process claim)<br>(8) "Does <Claim> perform <Product>?" (e.g., in the case of a process claim and a process)<br>(9) "Is <Product> an example of <Claim>?"<br>(10) "Does <Product> fall within a scope of a meaning of <Claim>?" | (3) "<Claim> describes <Product>?"<br>(4) "<Product> is described by <Claim>"<br>(5) "<Claim" includes <Product>"<br>(6) "<Product> includes <Claim>"<br>(7) "<Product> performs <Claim>"<br>(8) "<Claim> performs <Product>"<br>(9) "<Product> is an example of <Claim>"<br>(10) "<Product> falls within a scope of a meaning of <Claim>" |
| Inquire whether a particular patent claim element is infringed by a particular product/process | (1) "Is <Element> infringed by <Product>?"<br>(2) "Does <Product> infringe <Element>?"<br>(3) "Does <Element> describe <Product>?"<br>(4) "Is <Product> described by <Element>?"<br>(5) "Does <Element> include <Product>?"<br>(6) "Does <Product> include <Element>?"<br>(7) "Does <Product> perform <Element>?" (e.g., in the case of a process and a process claim)<br>(8) "Does <Element> perform <Product>?" (e.g., in the case of a process claim and a process)<br>(9) "Is <Product> an example of <Element>?"<br>(10) "Does <Product> fall within a scope of a meaning of <Element>?" | (1) "<Element> is infringed by <Product>"<br>(2) "<Product> infringes <Element>"<br>(3) "<Element> describes <Product>?"<br>(4) "<Product> is described by <Element>"<br>(5) "<Claim" includes <Product>"<br>(6) "<Product> includes <Element>"<br>(7) "<Product> performs <Element>"<br>(8) "<Element> performs <Product>"<br>(1) "<Product> is an example of <Element>"<br>(2) "<Product> falls within a scope of a meaning of <Element>" |
| Inquire whether a particular patent claim limitation is infringed by a particular product/process | (1) "Is <Limitation> infringed by <Product>?"<br>(2) "Does <Product> infringe <Limitation>?"<br>(3) "Does <Limitation> describe <Product>?"<br>(4) "Is <Product> described by <Limitation>?"<br>(5) "Does <Limitation> include <Product>?"<br>(6) "Does <Product> include <Limitation>?"<br>(7) "Does <Product> perform <Limitation>?" (e.g., in the case of a process and a process claim)<br>(8) "Does <Limitation> perform <Product>?" (e.g., in the case of a process claim and a process)<br>(9) "Is <Product> an example of <Limitation>?" | (1) "<Limitation> is infringed by <Product>"<br>(2) "<Product> infringes <Limitation>"<br>(3) "<Limitation> describes <Product>?"<br>(4) "<Product> is described by <Limitation>"<br>(5) "<Claim" includes <Product>"<br>(6) "<Product> includes <Limitation>"<br>(7) "<Product> performs <Limitation>"<br>(8) "<Limitation> performs <Product>"<br>(1) "<Product> is an example of <Limitation>"<br>(2) "<Product> falls within a scope of a meaning of <Limitation>"<br>(3) "<Limitation> is a property of <Product>" |

-continued

| Query Specification | Query Text | Example Language Model Output |
|---|---|---|
| | (10) "Does <Product> fall within a scope of a meaning of <Limitation>?" | |
| | (11) "Is <Limitation> a property of <Product>?" | |
| Request examples of products/processes that infringe a particular patent | "What are examples of products that are described by <Patent Number>?" "What are examples of products that are described by the following description: <Claim Text | Element Text | Limitation Text | Summary Text | Abstract Text>?" | "The following are examples of products that fall within the scope of the following description: <Claim Text | Element Text | Limitation Text | Summary Text | Abstract Text>: (1) <Product A>; (2) <Product B>; (3) <Product C>." |
| Request examples of companies that make, use, sell, or import products/processes that infringe a particular patent | "What are examples of companies that sell products described by the following description: <Claim Text | Element Text | Limitation Text | Summary Text | Abstract Text>?" | "The following are examples of companies that sell products falling within the scope of the following description: <Claim Text | Element Text | Limitation Text | Summary Text | Abstract Text>: (1) <Company A>; (2) <Company B>; (3) <Company C>." |

The system 100 may generate the user input 104 and/or the initial text 118 (such as any of the query text in the table above) automatically or semi-automatically. For example, the patent data 106 may include a patent document identifier, such as a patent number. The system 100 may receive user input 104 containing that patent data 106 as input and, based on the patent number in the patent data 106, automatically extract any one or more of the following from the patent document corresponding to that patent number: text of some or all of the claims of the patent document, text of the Summary of the patent document, text of the Abstract of the patent document, and text of the specification of the patent document. The system 100 (e.g., the language model application 110) may include some or all of that extracted data within the initial text 118, such as within any of the query text in the table above.

Although certain examples of the user input 104 (e.g., the patent input 106) disclosed herein include references to a patent claim, claim element, or claim limitation (e.g., "<Claim Element Y>") as part of a query, this is merely an example and not a requirement of the present invention. The user input 104 (e.g., the patent input 106) may or may not include any data from a patent claim, and may not even include any data from a patent document or patent descriptor. For example, if the user 102 is interested in understanding whether a particular product includes a particular feature, the user 102 may include, within the user input 104 (e.g., within the patent input 106), data representing a query as to whether the particular product includes the particular feature, whether or not the particular feature is described by a patent document. Even if the particular feature is described by a particular patent document, the user 102 may, for example, include, within the user input 104 (e.g., within the patent input 106), data representing a query as to whether the particular product includes the particular feature, where that data may not be contained within the particular patent document, or may not be contained within any claim of the patent document. As a particular example, one or more claims of the particular patent document may describe the particular feature in complex language, and the user 102 may (manually and/or automatically) generate data describing the particular feature in simpler or otherwise different language, and include that generated data (instead of the original complex language) in the data representing the query as to whether the particular product includes the particular feature. In this example, the data, in the user input 104, representing the query may not be contained within the particular patent, but the data representing the query may, for example, share at least some meaning with data (e.g., the original complex language) contained in the particular patent.

As the above implies, any reference herein to examples of the user input 104 (e.g., the query input 108) which include a reference to a particular patent, patent claim, patent claim element, or patent claim limitation, should be understood to be equally applicable to similar user input 104 which include any data that refers to a feature of interest, whether or not that feature of interest is described, explicitly or implicitly, in any patent, patent claim, patent claim element, or patent claim limitation.

Although certain examples of the user input 104 (e.g., the query input 108) disclosed herein include references to a particular product (e.g., "<Product X>") as part of a query, it should be understood that any such reference may be any kind of product descriptor, not merely a description (e.g., name) of a particular product. Any such reference may, for example, include data that refers in any manner disclosed herein to one or more features of a product, whether or not such data is contained in any particular pre-existing description of the product (e.g., in the product's manual, website, or promotional materials). Any such reference may, for example, be generated manually by the user 102 in any manner.

The system 100 (e.g., the initial text generation module 116) may process the user input 104, such as any of the query text shown in the table above, in any of a variety of ways to product the initial text 118, and provide the initial text 118 to the language model 112. For example, the system 100 may process the user input 104 to generate initial text 118 that is in a canonical form or other form that is more suitable for providing to the language model 112 than the user input 104, such as any of the forms shown in the table above.

The system 100 may process the language model output 114 (e.g., any of the example language model output in the table above) to assign a confidence level to the language model output 114 as a whole and/or to parts of the language model output 114. Such confidence levels may be represented in any way, such as binary values and/or floating point values between 0 and 1. Such confidence levels may be added to the language model output 114.

The system 100 may filter the language model output 114 in any of a variety of ways. For example, the system 100 may identify product names and/or company names in the language model output 114, and remove data other than such product names and/or company names from the language model output 114.

One example of a workflow that may be implemented by the system 100 is the following:

(1) The system 100 receives user input 104 containing a product descriptor, which may have been entered manually by the user 102 or generated automatically by the user 102 and/or other element of the system 100. For example, the product descriptor may be contained within the language model output 114, which was generated by a previous iteration of the system 100. The user input 104 also contains patent data 106 containing a patent document identifier, which may have been entered manually by the user 102 or generated automatically by the user 102 and/or other element of the system 100. For example, the patent document identifier may be contained within the language model output 114, which was generated by a previous iteration of the system 100.

(2) The system 100 may perform any of the functions disclosed herein to generate, based on the user input 104 and the language model 112, language model output 114 which describes whether the product/service described by the product descriptor infringes the patent corresponding to the patent document identifier.

For example, to generate such language model output 114 describing whether the product/service identified by the product descriptor infringes the patent corresponding to the patent document identifier:

(1) The system 100 may perform any of the functions disclosed herein to generate, based on the product descriptor and the language model 112, output describing a plurality of components in a product corresponding to the product descriptor, or describing a plurality of acts/steps in a service corresponding to the product descriptor. The system 100 may, for example, generate such output by using query input 108 of a form such as, "What are the components of <Product A>?"

(2) Once such output describing the plurality of components in the product (or acts/steps in the service) has been generated, the system 100 may use any of the techniques disclosed herein to inquire whether each of the plurality of components in the product (or acts/steps in the service) infringes the patent corresponding to the patent document identifier. The system 100 may, for example, perform a separate inquiry (e.g., query operation) for each of the plurality of components/acts/steps to produce separate language model output for each of the plurality of components/acts/steps. The system 100 may, for example, perform a separate inquiry (e.g., query operation) for each combination of components/acts/steps and claim elements, or for each combination of components/acts/steps and claim limitations, to product separate language model output for each such combination.

Another example of a workflow that may be implemented by the system 100 is the following:

(1) The system 100 receives user input 104 containing a product descriptor, which may have been entered manually by the user 102 or generated automatically by the user 102 and/or other element of the system 100. For example, the product descriptor may be contained within the language model output 114, which was generated by a previous iteration of the system 100. The user input 104 also contains patent data 106 containing a patent document identifier, which may have been entered manually by the user 102 or generated automatically by the user 102 and/or other element of the system 100. For example, the patent document identifier may be contained within the language model output 114, which was generated by a previous iteration of the system 100.

(2) The system 100 may perform any of the functions disclosed herein to generate, based on the user input 104 and the language model 112, language model output 114 which describes one or more products/services that are similar to, but not the same as, the products/services identified by the product descriptor.

(3) The system 100 generates, for some or all of the products/services described by the language model output 114, user input 104 which queries (e.g., by performing a query operation) whether each of those products/services infringes the patent identified by the patent document identifier. Such user input 104 may, for example, be divided into separate instances of the user input 104, such as one instance for each of the products/services described by the language model output 114.

(4) The system 100 may perform any of the functions disclosed herein to generate, based on the newly-generated user input 104 and the language model 112, language model output 114 which describes whether each of the products/services identified by the previous language model output 114 infringes the patent corresponding to the patent document identifier. If the user input 104 is divided into separate instances of the user input 104, then the system 100 may perform one pass for each such instance to produce separate language model output 114 for each such instance in a separate pass.

Another example of a workflow that may be implemented by the system 100 is the following:

(1) The system 100 receives user input 104 containing patent data 106 containing a patent document identifier, which may have been entered manually by the user 102 or generated automatically by the user 102 and/or other element of the system 100. For example, the patent document identifier may be contained within the language model output 114, which was generated by a previous iteration of the system 100.

(2) The system 100 may perform any of the functions disclosed herein to generate, based on the user input 104 and the language model 112, language model output 114 which describes features encompassed by the patent document corresponding to the patent identifier. For example, the language model output 114 may include any one or more of the following, in any combination: (1) the Summary of the patent document; (2) the Abstract of the patent document; (3) one or more of the claims of the patent document (such as claim 1 of the patent document); (4) a part and/or summary of any of the preceding data.

(3) The system 100 may use the language model output 114 as new user input 104 and/or generate new user input 104 based on the language model output 114.

(4) The system 100 may perform any of the functions disclosed herein to generate, based on the new user input 104 and the language model, new language model output 114 which describes one or more products/services that are described by the new user input 104.

(5) The system 100 may use the workflow described above to generate, by using the new language model output 114 and yet additional user input 104, yet additional language model output 114 which describes whether each of the products/services identified by the previous language model output 114 infringes the patent corresponding to the patent document identifier.

In any of the methods disclosed herein, when the system 100 inquires (e.g., using a query operation) whether a dependent claim is infringed, the system 100 may use, as the text of the dependent claim, a combination (e.g., concatenation) of the text of the dependent claim's ancestors with the text of the dependent claim. For example, if claim 3 depends on claim 2, which depends on claim 1, then the system 100 may use, as the text of claim 3, a combination (e.g., concatenation) of claims 1, 2, and 3, or any portion thereof.

In any of the methods disclosed herein, when the system 100 inquires whether a patent document is infringed, the system 100 may inquire (e.g., using a query operation) separately into whether each of some or all of the claims of the patent document are infringed. For example, the system 100 may select some or all of the claims of the patent document, and enter a loop over the selected claims. The system 100 may perform any of the methods disclosed herein in connection with each claim in the loop, and produce separate language model output 114 corresponding to each such claim.

Similarly, in any of the methods disclosed herein, when the system 100 inquires (e.g., using a query operation) whether a patent claim is infringed, the system 100 may inquire separately into whether each of some or all of the elements of the patent claim are infringed. For example, the system 100 may enter a loop over the elements of the patent claim. The system 100 may perform any of the methods disclosed herein in connection with each element in the loop, and produce separate language model output 114 corresponding to each such element.

Similarly, in any of the methods disclosed herein, when the system 100 inquires (e.g., using a query operation) whether a patent claim element is infringed, the system 100 may inquire separately into whether each of some or all of the limitations of the patent claim element are infringed. For example, the system 100 may enter a loop over the limitations of the patent claim element. The system 100 may perform any of the methods disclosed herein in connection with each limitation in the loop, and produce separate language model output 114 corresponding to each such limitation.

In any of the methods disclosed herein, when the system 100 inquires (e.g., using a query operation) whether a patent claim is infringed, the system 100 may:

(1) inquire separately into whether each and every element of the patent claim is infringed, using any of the techniques disclosed herein, to generate separate language model output 114 corresponding to each such element; and (2) generate, based on the language model output 114 corresponding to all of the elements of the patent claim, output representing a response to the query whether the patent claim is infringed.

Such a process may, for example, be used to implement the "all elements rule" of patent claim infringement, according to which a patent claim is infringed if and only if all elements of the patent claim are infringed. The system 100 may, for example: (1) generate, based on the language model output 114 corresponding to each of the patent claim's elements, output indicating whether that element is infringed (represented, for example, as a binary value or a confidence level); and (2) generate, based on the outputs indicating whether each of the elements is infringed, an output indicating whether the patent claim is infringed. The output generated in (2) may, for example, be a function of the outputs generated in (1). As a particular example, if the outputs generated in (1) are binary values, then the system 100 may generate the output in (2) by applying a logical AND operation to all of the outputs generated in (1), so that the output generated in (2) is true if and only if all of the outputs generated in (1) are true. As another example, if the outputs generated in (1) are confidence levels, then the system 100 may generated a confidence level in (2), which is a function of the confidence levels generated in (1).

The system 100 may use any of the techniques disclosed herein to inquire whether each of some or all of the claims of a particular patent document are infringed by a particular product/service, thereby generating language model output 114 corresponding to each such claim. The system 100 may generate, based on the language model output 114 corresponding to such a plurality of claims, output corresponding to the plurality of claims. As an example, if the language model outputs corresponding to the plurality of claims include a plurality of confidence levels corresponding to the plurality of claims, the system 100 may generate an aggregate confidence level as a function of that plurality of confidence levels. Such a function may, for example, assign different weights to different claims. For example, the function may assign higher weights to dependent claims, with claims that are deeper in the claim hierarchy being assigned higher weights, based on the assumption that such claims are more specific, and that infringement of such claims is, therefore, more valuable.

In any of the methods disclosed herein, when the system 100 inquires (e.g., using a query operation) whether a patent document (e.g., a patent claim set, a patent claim, a patent claim element, or a patent claim limitation) is infringed to generate language model output 114 representing a response to that query, the system 100 may generate (e.g., within the language model output 114 and/or in output external to the language model output 114) "evidence output" representing evidence related to the language model output 114, such as evidence which supports the response represented by the language model output 114 and/or evidence which refutes the response represented by the language model output 114.

The system 100 (e.g., the language model application 110) may generate evidence output in any of a variety of ways. For example, the user input 104 may include data (e.g., in the query input 108) representing a request to generate evidence for/against the response represented by the language model output 114, such as text (e.g., plain text) representing a request, e.g., "Provide evidence justifying the conclusion," "Provide evidence from documentation for <Product X> that justifies the conclusion," "Provide text from a product manual for <Product X> that justifies the conclusion," or something similar. Data in the user input 104

(e.g., in the query input 108) may represent both a patent infringement query and a request for evidence related to that query, such as:
(1) "Provide an answer to the question, 'Does <Product X> infringe <Patent Claim Element Y>?' Justify the answer using evidence from documentation for <Product X>."
(2) "Provide an answer to the question, 'Does <Product X> infringe <Patent Claim Element Y>?,' along with supporting evidence from documentation for <Product X>."
(3) "Provide an answer to the question, 'Does <Product X> infringe <Patent Claim Element Y>?,' along with confirming evidence and disconfirming evidence for the answer."

Data representing a request for evidence may, for example, be contained within the user input 104 (e.g., within the query input 108). Alternatively, for example, the user input 104 may not contain any request for evidence, but the language model application 110 may include such a request for evidence in the initial text 118, such as by adding such a request for evidence to some or all of the user input 104 to generate the initial text 118. For example, if the user input 104 contains a query such as, "Does <Claim Element Y> describe <Product X>?," the language model application 110 may add data (e.g., plain text) representing a request for evidence to this query to product the initial text 118 (e.g., "Does <Claim Element Y> describe <Product X>? Provide evidence justifying the answer."

The resulting evidence output may take any of a variety of forms. For example, the evidence output may take any of the forms that subject data generally may take (e.g., unstructured text, structured text, and/or encoded data). The evidence output may, for example, include any one or more of the following, in any combination: text (e.g., unstructured text and/or structured text), image data, video data, and audio data. If the language model output 114 contains data representing a response to a query (e.g., a query in the user input 104), the evidence output may, for example, include text that describes confirming evidence for the response and/or text that describes disconfirming evidence for the response.

Generating the evidence output may include, for example, generating the evidence output based, at least in part, on data derived from (e.g., resulting from a transformation operation performed on) data relating to a product. Such data relating to a product may, for example, include any one or more of the following, in any combination:
(1) a product descriptor;
(2) data relating to (e.g., describing) the product in one or more records of a database;
(3) one or more reviews of the product;
(4) one or more manuals for the product;
(5) one or more advertisements for the product;
(6) one or more websites and/or webpages containing information about the product (such as one or more official pages for the product, provided by the product's manufacturer);
(7) and one or more descriptions of the product (e.g., on one or more websites promoting the product).

As the above implies, the evidence output may include and/or otherwise be derived from (e.g., be the result of performing a transformation operation on) any of the above data relating to the product. As one example, the evidence output may include data (e.g., unstructured text) describing confirming and/or disconfirming evidence obtained from a product webpage and/or manual for the product, e.g., "The <Product X> website specifically mentions that <Product X> contains a <Claim Element Y>," "According to the website of <Product X's Manufacturer>, the <Product X> does not contain any <Claim Element Y>," or "According to the product manual for <Product X>: '<Product X> contains a <Claim Element Y>.'"

As stated above, the language model output 114 may include both: (1) data representing a response to a query relating to a product, and (2) data representing evidence which confirms/disconfirms the response to the query. As some particular examples, the language model output 114 may be or include:
(1) "'<Product X> includes <Claim Element Y>, as described by the manual for <Product X>, which states that '<Product X> has a <Claim Element Y.'"
(2) "The website for <Product X> supports the conclusion that <Product X> includes a <Claim Element Y>."
(3) "'<Product X> does not include a <Claim Element Y>, as evidenced by the manual for <Product X>, which states that 'One of the benefits of <Product X> is that it does not include any <Claim Element Y>.'"

The user input 104 (e.g., query input 108) may, for example, solely request evidence related to (e.g., confirming/disconfirming) a response to a query, either without requesting a response to the query itself, or by affirmatively requesting non-response to the query itself. Examples of the former are:
(1) "Provide evidence for an answer to the question, 'Does <Product X> infringe <Claim Element Y>?'";
(2) "Provide evidence confirming and disconfirming an answer to the question, 'Does <Claim Element Y> describe <Product X>?'"; and
(3) "Provide evidence supporting a conclusion that <Product X> contains a <Claim Element Y>."
Examples of the latter are:
(1) "Provide evidence for an answer to the question, 'Does <Product X> contain a <Claim Element Y>?,' but do not provide the answer to the question."
(2) "Provide evidence supporting a conclusion that <Product X> contains a <Claim Element Y>, without providing the conclusion itself."
(3) "Without providing an answer to the question, 'Does <Claim Element Y> describe <Product X>?,' provide evidence supporting an answer to that question."

The language model output 114 may, for example, not include both: (1) data representing a response to a query relating to a product, and (2) data representing evidence which confirms/disconfirms the response to the query. Alternatively, for example, the language model output 114 may include data representing evidence which confirms/disconfirms the response to the query, and not include data representing a response to the query. This may be the case if, for example, the user input 104 (e.g., the query input 108) solely requests evidence related to a response to the query. An example of such language model output 114 is, "The manual for <Product X> states that <Product X> contains a <Claim Element Y>."

Any transformation operation (e.g., a filtering operation and/or a summarization operation) may be performed on the language model output 114 to obtain data representing one or both of: (1) data representing a response to a query relating to a product, and (2) data representing evidence which confirms/disconfirms the response to the query. For example, if the language model output 114 contains both: (1) data representing a response to a query relating to a product, and (2) data representing evidence which confirms/disconfirms the response to the query, a transformation operation (e.g., a filtering operation and/or a summarization operation) may be performed on the language model output 114 to obtain: (1) the data representing the response to the query relating to a product (and/or data resulting from a transformation operation performed thereon), and (2) the data representing evidence which confirms/disconfirms the response to the query (and/or data resulting from a transformation operation thereon).

A single instance of the user input 104 may be provided as input to the language model application 110 to produce a single instance of the language model output 114 which contains both: (1) data representing a response to a query relating to a product, and (2) data representing evidence which confirms/disconfirms the response to the query. Alternatively, for example: (1) a first instance of the user input 104 may be provided as a first input to the language model application 110 to produce a first instance of the language model output 114 which contains data representing a response to a query relating to a product; and (2) a second instance of the user input 104 may be provided as a second input to the language model application 110 to produce a second instance of the language model output 114 which contains data representing evidence which confirms/disconfirms the response to the query. The second instance of the user input 104 may, for example, include some or all of the first instance of the language model output 114 and/or include data resulting from performing a transformation operation on the first instance of the language model output 114.

Embodiments disclosed herein may, for example, be used to generate one or more instances of the language model output 114 which, individually or in combination, perform a function that is the same as or similar to a "patent claim chart." A patent claim chart (and hence, one or more instances of the language model output 114) may, for example, include a plurality of elements of a patent claim and, for each of some or all elements E in the plurality of elements, data providing support for (e.g., confirming) and/or against (e.g., disconfirming) a conclusion that a particular product falls within a scope of the element E. The patent claim chart may, for example, also indicate, for each of some or all of the elements E, a conclusion indicating whether the element E describes (e.g., is infringed by) the particular product. A patent claim chart may, for example, take the form of a list or a table containing such data. A patent claim chart may, for example, contain such data not only for one or a plurality of elements of a particular patent claim, but also such data for a plurality of patent claims (e.g., some or all of the claim elements in some or all of the patent claims in a particular issued patent).

The system 100 may, for example, generate a patent claim chart in relation to a particular product using techniques disclosed herein, such as by entering a loop over a plurality of patent claim elements and, for each such element E:

(1) selecting (e.g., receiving and/or generating) an instance of the user input 104 corresponding to element E, where that instance of the user input contains: (1) data (e.g., in the query input 108) representing a query whether the particular product infringes element E (e.g., whether the particular product contains element E, whether element E describes the particular product, or whether the particular product falls within a scope of a meaning of element E); and (2) data (e.g., in the query input 108) representing a request to generate evidence confirming/disconfirming the query whether the particular product infringes element E;

(2) providing the instance of the user input 104 corresponding to element E as input to the language model application 110 to generate an instance of the language model output 114, where instance of the language model input corresponding element E may, for example, include one or both of: (1) data representing a response to the query whether the particular product infringes element E, and (2) data representing evidence which confirms/disconfirms the response to the query whether the particular product infringes element E; and (3) providing as output, corresponding to claim element E, any one or more of the following, in any combination:

the data representing the query whether the particular product infringes element E, and/or any data resulting from performing a transformation operation thereon;

the data representing the request to generate evidence confirming/disconfirming the query whether the particular product infringes element E, and/or any data resulting from performing a transformation operation thereon;

the data representing the response to the query whether the particular product infringes element E, and/or any data resulting from performing a transformation operation thereon; and data representing evidence which confirms/disconfirms the response to the query whether the particular product infringes element E, and/or any data resulting from performing a transformation operation thereon.

As the above implies, such a method may generate a plurality of outputs of the kind described above, corresponding to the plurality of claim elements, such as in the form of a list or a table. The table may, for example, include a plurality of columns corresponding to the units of output listed above, such as any one or more of the following, in any combination: "Query," "Evidence Request," "Element Reads on Product?," and "Evidence." Such data may vary in any way from column to column and from claim element to claim element. As merely one example, the data representing the response to the query whether the particular product infringes element E may have a first value (e.g., "True") for a first claim element $E_1$, and the data representing the response to the query whether the particular product infringes element E may have a second value (e.g., "False"), which differs from the first value, for a second claim element $E_2$.

Embodiments of the present invention may generate variations of subject data in a variety of ways and for use in a variety of applications. For example, embodiments of the present invention may generate:

based on a patent document, one or more variations of the patent document, such as one or more variations of the specification of the patent document and/or one or more variations of one or more claims of the patent document;

based on a patent claim (or a patent claim set containing the patent claim), one or more variations of the patent claim;

based on a patent claim element (or a patent claim containing the patent claim element, or a patent claim set containing the patent claim element), one or more variations of the patent claim element;

based on a patent claim limitation (or a patent claim element containing the patent claim limitation, or a patent claim containing the patent claim limitation, or a patent claim set containing the patent claim limitation), one or more variations of the patent claim element;

based on a product descriptor, one or more variations of the product descriptor;

based on subject data representing a product feature, one or more variations of the subject data representing the product feature.

The term "variation," when used in connection with particular input subject data (e.g., "one or more variations of input subject data"), refers to output subject data which are generated based on the input subject data, which have at least some data and/or meaning in common with the input subject data, but which are not identical to the input subject data. For example, a variation of a patent claim may be identical to the patent claim, except that one limitation in the variation of the patent claim may be absent from the patent claim.

Any technique disclosed herein for generating a variation is an example of performing a "transformation operation," as that term is used herein. As that implies, any reference herein to performing a transformation operation may be implemented by using any of the techniques disclosed herein for generating one or more variations.

Generating a variation of input subject data may, for example, include generating, based on the input subject data, output meaning data which has a meaning that differs from a meaning of the input subject data. For example, the input subject data may be associated with input meaning data, and the output meaning data may have some data in common with the input meaning data, and: (1) the output meaning data may include data that is not included in the input meaning data; or (2) the input meaning data may include data that is not included in the output meaning data.

Generating a variation of input subject data may, for example, include generating, based on the input subject data, output subject data which has some data in common with the input subject data, and in which: (1) the output subject data may include data that is not included in the input subject data; or (2) the input subject data may include data that is not included in the output subject data.

Generating a variation of input meaning data may, for example, include generating, based on the input meaning data, output meaning data which has a meaning that differs from a meaning of the input meaning data. For example, the output meaning data may have some data in common with the input meaning data, and: (1) the output meaning data may include data that is not included in the input meaning data; or (2) the input meaning data may include data that is not included in the output meaning data.

Generating a variation of input meaning data may, for example, include generating, based on the input meaning data, output subject data which has a meaning that differs from a meaning of the input meaning data. For example, the output subject data may be associated with output meaning data. The output meaning data may have some data in common with the input meaning data, and: (1) the output meaning data may include data that is not included in the input meaning data; or (2) the input meaning data may include data that is not included in the output meaning data.

Embodiments of the present invention may generate a variation of input subject data in any of a variety of ways, such as by performing any kind(s) of transformation operation disclosed herein on the input subject data to generate the variation of the input subject data. For example, embodiments of the present invention may use any of a variety of techniques employed by optimization methods, artificial neural networks, evolutionary (e.g., genetic) algorithms, and simulated annealing to generate a variation of input subject data. As some particular examples, embodiments of the present invention may:

generate a variation of a claim (or a subset thereof, such as a claim element or a claim limitation) by performing any one or more of the following, in any combination:
adding one or more words to the claim;
removing one or more words from the claim;
modifying one or more words in the claim;
adding one or more elements to the claim;
removing one or more elements from the claim;
modifying one or more elements in the claim;
adding one or more limitations to the claim;
removing one or more limitations from the claim;
modifying one or more limitations in the claim;

generate a variation of a product descriptor (or a subject thereof, such as a description of one or more features of a product) by performing any one or more of the following, in any combination:
adding one or more words to the product descriptor;
removing one or more words from the product descriptor;
modifying one or more words in the product descriptor;
adding one or more feature descriptors to the product descriptor;
removing one or more feature descriptors from the product descriptor;
modifying one or more feature descriptors in the product descriptor.

As some particular examples, embodiments of the present invention may generate a variation of input subject data by: (1) identifying one or more definitions, synonyms, hypernyms, and/or hyponyms of the input subject data; and (2) supplementing or replacing the input subject data with the subject data identified in (1). The same may be applied to any subset of the input subject data. For example, embodiments of the present invention may identify a synonym of one word in the input subject data (which may include a plurality of words) and replace that one word in the input subject data with the identified synonym.

As another example, embodiments of the present invention may generate a variation of input subject data by: (1) identifying, in the input subject data, data representing a first value of a parameter; (2) identifying a second value of the parameter, where the second value differs from the first value; and (3) supplementing or replacing the data representing the first value of the parameter in the input subject data with data representing the second vale of the parameter. The same may be performed for any number of parameters, either in sequence or in parallel. For examples of such parameters, see U.S. Pat. No. 9,501,469, entitled "Analogy Finder," issued on Nov. 22, 2016, which is hereby incorporated by reference herein.

As another example, embodiments of the present invention may generate a variation of input subject data by providing the input subject data as input to the language model 112 to produce language model output 114, and the language model output 114 (or any transformation output generated based on the language model output 114) may be used as a variation of the input subject data. For example, initial text including a query and some or all of the input subject data may be provided as input to the language model 112 to produce the language model output 114. Examples of such a query are "Provide a summary of <Input Subject Data>," "Describe <Input Subject Data> in terms that are easy to understand," "Summarize <Input Subject Data> according to common dictionary definitions of the terms within <Input Subject Data>," and the like. More generally, embodiments of the present invention may use any of a variety of known text summarization techniques to generate one or more variations of input subject data.

Embodiments of the present invention may use any of a variety of techniques to generate a variation of input subject data, such as any one or more of the following, in any combination:

Paraphrasing: Paraphrasing involves rephrasing a given text while preserving its original meaning. Paraphrasing may be performed, for example, using natural language processing tools, such as rule-based paraphrasing systems or neural models (e.g., GPT or BERT) to generate paraphrased versions of a text string.

Synonym replacement: Synonym replacement involves replacing words in the input text string with their synonyms. Any lexical database (e.g., WordNet) and/or pre-trained word embeddings (e.g., Word2Vec, GloVe) may be used to find synonyms that are semantically close to the original words.

Active-passive voice transformation: This involves changing the voice of the text string from active to passive or vice versa. For example, "The cat chased the mouse" may be transformed into "The mouse was chased by the cat."

Negation: This involves introducing negation in the text string (or removing negation from a text string) to generate a variation. For example, negation may transform "The weather is sunny" into "The weather is not sunny."

Applying textual entailment techniques: This involves using textual entailment models to generate variations that either imply or are implied by the original text string. Textual entailment models, such as BERT or RoBERTa, can to generate text strings that are semantically related to the original but differ in meaning.

Sentence expansion or compression: This involves adding or removing words, phrases, or clauses in the input text string while maintaining its overall meaning. For example, "She's an excellent cook" may be expanded into "She is an incredibly skilled cook" or to compress "The book, which is very popular, was written by the famous author" into "The famous author wrote the popular book."

Random word swapping: This involves swapping adjacent words or phrases randomly within the input text string, which may change the meaning or make the sentence less coherent.

Back-translation: This involves translate the input text string into another language using machine translation systems (e.g., Google Translate) and then translating it back to the original language. This process often generates slight variations in the wording and meaning of the text.

Embodiments of the present invention may be used to generate variations of input subject data to perform a variety of functions, such as any one or more of the following, in any combination:

Generating, based on input subject data representing one or more patent claims (or any subset thereof, such as one or more patent claim elements, or one or more patent claim limitations), a variation of the input subject data which does not infringe the one or more patent claims (or subset thereof). As a particular example, embodiments of the present invention may receive an input patent claim as input and generate, as output, based on the input patent claim, a variation of the input patent claim which does not fall within a scope of a meaning of the input patent claim. The variation of the input patent claim may, for example, be: (1) an output patent claim which differs in at least some way from the input patent claim; or (2) output meaning data representing a meaning of such an output patent claim. The variation of the input patent claim may, for example, be a product descriptor. Generating a product descriptor which describes a product that does not infringe a particular patent claim is typically referred to as "designing around" the particular patent claim.

Generating, based on input subject data representing one or more patent claims (or any subset thereof, such as one or more patent claim elements, or one or more patent claim limitations), a variation of the input subject data which does infringe the one or more patent claims (or subset thereof). As a particular example, embodiments of the present invention may receive an input patent claim as input and generate, as output, based on the input patent claim, a variation of the input patent claim which falls within a scope of a meaning of the input patent claim. The variation of the input patent claim may, for example, be: (1) an output patent claim which differs in at least some way from the input patent claim; or (2) output meaning data representing a meaning of such an output patent claim. The variation of the input patent claim may, for example, be a product descriptor.

Generating, based on input subject data representing one or more patent claims (or any subset thereof, such as one or more patent claim elements, or one or more patent claim limitations), a variation of the input subject data, in the form of output meaning data which does not infringe the one or more patent claims (or subset thereof). As a particular example, embodiments of the present invention may receive an input patent claim that is associated with input meaning data representing an input meaning of the input patent claim. Embodiments of the present invention may generate, based on the input patent claim and/or the input meaning data, a variation of the input patent claim, in the form of output meaning data having a meaning which does not fall within a scope of a meaning of the input meaning data.

Generating, based on input subject data representing one or more patent claims (or any subset thereof, such as one or more patent claim elements, or one or more patent claim limitations), a variation of the input subject data, in the form of output meaning data which infringes the one or more patent claims (or subset thereof). As a particular example, embodiments of the present invention may receive an input patent claim that is associated with input meaning data representing an input meaning of the input patent claim. Embodiments of the present invention may generate, based on the input patent claim and/or the input meaning data, a variation of the input patent claim, in the form of output meaning data having a meaning which falls within a scope of a meaning of the input meaning data.

Embodiments of the present invention may generate, based on input subject data describing a product that achieves a particular result by performing a particular function, a variation of the input subject data describing a product that achieves the particular result without performing the particular function (e.g., by performing a different function than the particular function). Embodiments of the present invention may generate, based on input subject data describing a product that performs a particular function in a particular way (e.g., by using a particular component or performing a particular act to perform the particular function), a variation of the input subject data describing a product that performs the particular function in a way other than the particular way (e.g., by performing the particular function using a component other than the particular component or by performing the particular function by performing an act other than the particular act).

Any particular patent claim may be interpreted (also referred to as "construed") in any of a variety of ways. The process of interpreting a patent claim is referred to as "claim interpretation" or "claim construction," and typically results in text (referred to as "the claim construction") that describes the interpretation of the claim that resulted from the claim construction process. As disclosed herein, embodiments of the present invention may use any of a variety of techniques disclosed herein to generate meaning data representing a meaning of a particular patent claim. Such meaning data is an example of a "claim construction" of the particular patent claim.

Embodiments of the present invention may use any of a variety of techniques disclosed herein to generate, for a particular patent claim, a plurality of different meaning data, each representing a different meaning of the particular patent claim, in a variety of ways. For example, any technique disclosed herein for generating meaning data representing a meaning of a particular patent claim may be repeated a plurality of times to generate a plurality of meaning data having different meanings from each other. Differences in the meaning data may be achieved in any of a variety of ways, such as by employing a pseudorandom number generator at one or more points in the process, by iterating over a plurality of parameter values (e.g., synonyms, antonyms, hypernyms, and/or hyponyms), or by providing the same patent claim as input to the language model 112 a plurality of times to produce a plurality of meaning data which differ from each other if, for example, the language model 112 is nondeterministic.

In embodiments which generate a plurality of variations of input subject data (e.g., an input patent claim), embodiments of the present invention may select one or a subset of the plurality of variations of the input subject data based on one or more criteria. For example, embodiments of the present invention may use any of a variety of optimization techniques to generate a plurality of variations of input subject data and to select one or a subset of the plurality of variations based on one or a plurality of optimization criteria. Examples of optimization techniques that may be used include, but are not limited to, gradient descent, linear programming, genetic algorithms, simulated annealing, and particle swarm optimization.

Embodiments of the present invention may, for example:
(1) receive one or more optimization criteria (e.g., an objective function);
(2) receive input subject data (e.g., an input patent document, an input patent claim, an input product descriptor, or meaning data representing any of the foregoing);
(3) initialize a set of candidates to include the input subject data and/or one or more variations of the input subject data;
(4) generate, based on the set of candidates, one or more variations of some or all of the candidates in the set of candidates, thereby generating a plurality of variations in any of the ways disclosed herein;
(5) evaluate the plurality of variations to generate evaluation output for each of the plurality of variations;
(6) optionally filter the plurality of variations (e.g., based on the evaluation output generated in (5)) to produce a reduced plurality of variations;
(7) add the (possibly filtered) plurality of variations to the set of candidates;
(8) determine whether a termination criterion has been satisfied:
if so, end the process and output the set of candidates as output;
if not, return to step (4) and repeat steps (4)-(8) using the current set of candidates.

Step (4) may, for example, include generating candidates for use in steps (5)-(8) that are not variations of the current set of candidates.

Any of the steps disclosed herein as being part of an optimization process may be performed entirely automatically or partially automatically and partially by (or based on input received from) the user 102. For example, the user 102 may perform any one or more of the following, in any combination: (1) provide input representing some or all of the optimization criteria; (2) provide input representing some or all of the input subject data; (3) providing input representing some or all of the initial set of candidates; (4) generate some or all of the variations in some or all of the iterations of the optimization process; (5) evaluate some or all of the plurality of variations to generate some or all of the evaluation output in some or all of the iterations of the optimization process; (6) perform some or all of the filtering of the plurality of variations to produce some or all of the reduced plurality of variations in some or all of the iterations of the optimization process; and (7) after some or all of the iterations of the optimization process, provide input indicating whether the termination criterion has been satisfied.

The description above of an optimization process is provided for illustrative purposes. Those having ordinary skill in the art will appreciate that the optimization process described above may be varied in any of a variety of ways.

For example, any optimization method disclosed herein may employ an evolutionary (e.g., genetic) algorithm. A genetic algorithm may, for example: create a population of candidate solutions; evaluate the fitness of each candidate solution; select the best candidate solutions based on the evaluations; create new candidate solutions by applying genetic operators (such as mutation and/or crossover) to some or all of the existing candidate solutions; and repeat the process (starting at the evaluation step) until some termination criterion is satisfied.

For example, any optimization method disclosed herein may employ simulated annealing. Simulated annealing is an optimization technique that is based on the principles of thermodynamics. It simulates the process of heating and cooling a material to reduce its defects and improve its properties. The process of using simulated annealing may, for example, involve the following steps: create an initial candidate solution; calculate the energy of the candidate solution; generate a new candidate solution by making a small change to the current candidate solution; calculate the energy of the new candidate solution; if the new candidate solution is better than the current candidate solution, accept it; if the new candidate solution is worse than the current candidate solution, accept it with a certain probability based on the temperature; repeat the process until some termination criterion is satisfied.

For example, any optimization method disclosed herein may employ particle swarm optimization. Particle swarm optimization is an optimization technique that is based on the principles of swarm intelligence to simulate the behavior of a swarm of particles.

The process of using particle swarm optimization may, fore example, include the following steps: create a swarm of particles; evaluate the fitness of each particle; update the velocity and position of each particle based on the best candidate solution found so far; and repeat the process until some termination criterion is satisfied.

The optimization criteria in an optimization process may, for example, be defined using an objective function (e.g., a cost function). The optimization process may seek to minimize (or maximize) the output of the objective function (also referred to as minimizing or maximizing the objective function). Such an objective function may, for example, be a function of a single objective or of a plurality of objectives. Any of a variety of known techniques for performing multi-objective optimization may be used by various embodiments of the present invention. Multi-objective optimization is a process used to find an optimal (or useful) solution to a problem that involves multiple goals or objectives, which often conflict with each other. A multi-objective optimization process may, for example, use an combined objective function which is composed of a plurality of sub-objective functions corresponding to the plurality of objectives to be optimized. The multi-objective process may, for example, assign distinct weights to each of the plurality of sub-objective functions, calculate the objective values of each of the plurality of sub-objective functions, and calculate a weighted sum of those objective values by applying the weights of the plurality of sub-objective functions in order to produce the value of the combined objective function. Each of the weights may have any value. For example, two or more of the weights may differ from each other in value to reflect the relative importance of the corresponding sub-objective functions within the combined objective function.

The following are examples of objectives that embodiments of the present invention may be optimized using embodiments of the present invention:

Patentability: patentability of a patent claim (or a patent claim set) in relation to subject data, where such subject data may, for example, be or include one or more patent documents (e.g., one or more published patent applications and/or one or more issued patents) and/or one or more product descriptors. Whether a patent claim is patentable in relation to subject data may, for example, be predicted in any of the ways disclosed herein for predicting whether a patent claim is infringed by subject data.

Non-patentability: same as above, but for non-patentability of a patent claim (or patent claim set) in relation to subject data.

Validity: same as for patentability above.

Invalidity: same as for non-patentability above.

Infringement: same as for non-patentability above.

Non-infringement: same as for patentability above.

Non-infringement and functional equivalence: these two objectives may be optimized using any kind of multi-objective optimization. Non-infringement may be defined in the same way as disclosed above for a single non-infringement objective. Functional equivalence may be evaluated, for example, by determining whether a product (or a feature or features of a product) perform the same function as that described by a claim (or a claim element, claim elements, claim limitation, or claim limitations). This combination of objectives may, for example, be used to "design around" a patent claim. This combination of objectives may, for example, seek to maximize non-infringement and functional equivalence of: (1) any one or more features of the product; (2) a specified feature or features of the product; or (3) all features of the product.

Validity and infringement: these two objectives may be optimized using any kind of multi-objective optimization. The individual validity and infringement objectives may be defined in any of the ways disclosed herein for defining a validity objective and an infringement objective, respectively. This combination of objectives may, for example, be useful to a patent owner who seeks to identify, for a particular patent claim and a particular product, an interpretation of the claim that provides the best combination of a case for validity of the claim in light of the prior art and a case for infringement of the claim by the product.

Invalidity and non-infringement: these two objectives may be optimized using any kind of multi-objective optimization. The individual invalidity and non-infringement objectives may be defined in any of the ways disclosed herein for defining an invalidity objective and a non-infringement objective, respectively. This combination of objectives may, for example, be useful to a patent defendant who seeks to identify, for a particular patent claim and a particular product, an interpretation of the claim that provides the best combination of a case for invalidity of the claim in light of the prior art and a case for non-infringement of the claim by the product.

Embodiments of the present invention may or may not include data which explicitly define an objective function. For example, in embodiments which use the language model 112, in whole or in part, to evaluate one or more candidates, such embodiments may use language model input (e.g., the user input 104) to perform some or all of the functions of an objective function. For example, query input 108 such as "Evaluate whether <Product> includes <Claim Element> and assign a score to the result of the evaluation, where a higher score indicates a greater degree to which <Product> is likely to include <Claim Element>" may be provided as input to the language model application 110 to produce language model output 114, which includes data indicating a prediction of whether (and a degree to which) <Product> includes <Claim Element>, in which case the query input 108 may implicitly define an objective function or otherwise perform a function that is equivalent or similar to that of an objective function in an optimization process.

As described above, an optimization process may include generating, based on a set of candidates, one or more variations of some or all of the candidates in the set of candidates, thereby generating a plurality of variations. Embodiments of the present invention may generate the plurality of variations in any of the ways disclosed herein.

In some embodiments, the variations that are generated in the optimization process may include or consist of meaning data. For example, any such variation in meaning data may be generated based on the input subject data and represent a corresponding meaning of the input subject data. As another example, initial meaning data may be generated to represent a corresponding meaning of the input subject data (e.g., at the beginning of the optimization process), and any such variation in meaning data may be generated based on such initial meaning data. In other words, a variation in meaning data may be generated as a variation of previously-generated meaning data. In some embodiments, an optimization process holds the input subject data fixed and only generates variations in meaning data that are generated (directly or indirectly) based on such input subject data. In some embodiments, an optimization process includes, as an objective (e.g., in addition to one or more other objectives), maximization of similarity in meaning between a generated variation in meaning data and either: (1) the input subject data; or (2) some particular meaning data (e.g., meaning data received manually from the user 102 or meaning data generated based directly on the input subject data). Such maximization of similarity in meaning may help to prevent the meaning data that is output by the optimization process from straying too far from an original or desired meaning of the input subject data. More generally, embodiments which generate variations that include or consist of variations in meaning data may be useful, for example, when the language of a claim cannot be modified or would be prohibitively costly and/or risky to modify (e.g., after the grant of the patent containing the claim), and when alternative interpretations of the claim are sought.

In some embodiments, the variations that are generated in the optimization process may include or consist of variations in the input subject data (and variations of such variations, and so on). For example, any such variation may be generated based on the input subject data and/or on a previously-generated variation of the subject data. As a particular example, if the input subject data includes or consists of a patent claim, a variation of such input subject data may include or consist of a modified version of the patent claim, in which one or more words has been added, removed, and/or modified. In some embodiments, an optimization process includes, as an objective, maximization of similarity in meaning between a generated variation and either: (1) the input subject data; or (2) some particular meaning data (e.g., meaning data received manually from the user 102 or meaning data generated based directly on the input subject data). Such maximization of similarity in meaning may help to prevent the output of the optimization process from straying too far from an original or desired meaning of the input subject data. More generally, embodiments which generate variations that include or consist of (direct or indirect) variations in the input subject data may be useful, for example, when it is desired to produce a modified version of a claim and when doing so would not be prohibitively costly and/or risky (e.g., during drafting of a patent application).

As mentioned above, an optimization process may include evaluating the plurality of variations generated during one or more iterations of the optimization process to generate evaluation output for each of the plurality of variations. Such evaluation may be performed, for example, by evaluating the applicable objective function using any of a variety of known techniques.

When evaluating whether a particular claim (or portion thereof) is infringed by a particular product, any meaning of "infringement" disclosed herein may be applied, and any technique(s) disclosed herein for determining infringement may be used.

Any evaluation performed by an embodiment of the present invention (e.g., as part of an evaluation step in an optimization process) may involve evaluating a degree of overlap in meaning between two or more text strings. Such evaluation may be performed using any of a variety of techniques. For example, the cosine similarity of the word embeddings of two text strings may be used as an objective function. Word embeddings are numerical representations of words that capture their meanings in a high-dimensional space. The cosine similarity measures the cosine of the angle between the two vectors, with values ranging from −1 (completely opposite in meaning) to 1 (identical in meaning). An objective function may, for example, try to maximize (or minimize) this cosine similarity to achieve the most (or least) overlap in meaning between the two text strings.

Various other techniques for measuring similarity of meaning of two or more text strings are well-known in the art and may be used by embodiments of the present invention. Examples of such techniques include Jaccard similarity, edit distance (also referred to as Levenshtein distance), semantic textual similarity, Euclidean distance, Manhattan distance, Word Mover's Distance (WMD), and pretrained language models (e.g., BERT, RoBERTa, and GPT). As another example, entailment detection techniques may be used to determine whether the meaning of one text string falls within the scope of the meaning of another text string. Entailment detection is a natural language understanding task where the goal is to determine if the meaning of one text string (the hypothesis) can be inferred from the meaning of another text string (the premise). Pretrained language models, such as BERT or RoBERTa, may be fine-tuned for entailment detection by training on a dataset such as the Stanford Natural Language Inference (SNLI) dataset or the Multi-Genre Natural Language Inference (MultiNLI) dataset. Once fine-tuned, the model may be used to predict the entailment relationship between two text strings: whether the meaning of one text string is entailed by, contradicts, or is neutral with respect to the other text string.

The evaluation output that is generated as the result of evaluating a particular variation during an optimization process may take any of a variety of forms, such as a binary value, an integer, a floating point number, or a more complex data structure representing whether and/or an extent to whether the particular variation satisfies the objective being evaluated.

Any particular evaluation operation may for example, be performed entirely automatically, entirely manually, or using a combination of automatic and manual operations. For example, any evaluation operation disclosed herein may be performed entirely automatically, such as by evaluating an objective function entirely automatically. As another example, any evaluation operation disclosed herein may be performed entirely manually, such as by receiving input from a user representing evaluation output for one or more variations, and using that evaluation output for the purposes disclosed herein. As another example, any evaluation operation disclosed herein may be performed using a combination of automatic and manual operations, such as by evaluating one or more variations automatically to generate evaluation output, and providing that evaluation output (or output derived therefrom) to a user, who may provide feedback input in response, such as feedback input representing approval of, disapproval of, or a modification to the evaluation output, in response to which the system 100 may modify the evaluation output based on the user's feedback input.

Evaluation of any particular variation(s) may be performed, for example, in whole or in part using a language model (e.g., the language model 112). For example, in connection with a particular variation represented by the subject data "<Variation>" and any particular objective represented by the subject data "<Objective>", embodiments of the present invention may evaluate the objective with respect to the variation by providing initial text of the form, "Evaluate <Objective> with respect to <Variation>", thereby generating language model output 114, which may play the role of some or all of the evaluation output disclosed herein. As another example, in connection with a particular variation represented by the subject data "<Variation>" and any particular objective function represented by the subject data "<Objective Function>", embodiments of the present invention may evaluate the objective function with respect to the variation by providing initial text of the form, "Evaluate <Objective Function> with respect to <Variation>", thereby generating language model output 114, which may play the role of the evaluation output disclosed herein.

As mentioned above, an optimization process may include filtering the plurality of variations generated during one or more iterations of the optimization process to produce a reduced plurality of variations. Such filtering is sometimes referred to as "pruning" or "selection." Filtering aims to reduce the search space by eliminating suboptimal or infeasible solutions, allowing the optimization process to focus on more promising candidates. Filtering may be based on any of a variety of criteria, such as fitness, constraints, or objective function values, for example. Filtering may, for example, be performed based (in whole or in part) on the evaluation output generated in the evaluation step of the same iteration (or of one or more previous iterations) of the optimization process.

For example, any particular filtering operation may be performed using any of a variety of well-known filtering techniques, such as ranking, thresholding, tournament selection, truncation selection, or probabilistic selection. As just one example, any particular filtering operation may involve ranking some or all of the plurality of variations generated during a particular iteration of the optimization process (e.g., based on the evaluation output generated based on the plurality of variations generating during the particular iteration of the optimization process), and filtering the plurality of variations based on the ranking, such as by removing a particular number or percentage of the lowest-ranking variations from the plurality of variations, and/or by selecting a particular number or percentage of the highest-ranking variations in the plurality of variations and removing all other variations from the plurality of variations.

Any particular filtering operation may be performed in accordance with one or more filtering parameters (also known as "pruning parameters" or "selection parameters"). An example of a filtering parameter is the threshold value that is used in thresholding. More generally, filtering parameters control various aspects of the filtering process, such as the proportion of candidate solutions to retain or discard, the degree of randomness in the selection process, and/or the specific criteria for comparison. Embodiments of the present invention may use any of a variety of techniques to select, modify, and store filtering parameters.

Any particular filtering operation may for example, be performed entirely automatically, entirely manually, or both automatically and manually. For example, any filtering operation disclosed herein may be performed entirely automatically. As another example, any filtering operation disclosed herein may be performed by receiving input from a user (e.g., input specifying one or more variations to remove from the plurality of variations and/or input specifying one or more variations to keep in the plurality of variations) and filtering the plurality of variations based on the user input (e.g., by removing any variation(s) specified by the user input to remove and/or by keeping any variation(s) specified by the user input to keep). As another example, any filtering operation disclosed herein may be performed using a combination of automatic and manual operations, such as by automatically identifying one or more proposed variations to remove from the plurality of variations and/or one or more proposed variations to keep in the plurality of variations using any of the techniques disclosed herein, and providing output representing the proposed variations to remove/keep to a user, who may provide feedback input in response, such as feedback input representing approval of, disapproval of, or a modification to the proposed variations to remove/keep, in response to which the system 100 may filter the plurality of variations based on the user's feedback input.

Filtering of any particular variation(s) may be performed, for example, in whole or in part using a language model (e.g., the language model 112). For example, in connection with a plurality of variations represented by the subject data "<Variations>", a plurality of evaluation outputs corresponding to those variations represented by the subject data "<Evaluation Outputs>", and one or more filtering parameters represented by the subject data "<Filtering Parameters>", embodiments of the present invention may filter the plurality of variations by providing initial text of the form, "Prune <Variations>, having objective values <Evaluation Outputs>, based on pruning parameters <Filtering Parameters>", thereby generating a filtered set of variations.

As mentioned above, an optimization process may include determining whether a termination criterion has been satisfied. Such a determination may be performed in any of a variety of ways. For example, embodiments of the present invention may use any of a variety of well-known techniques for determining whether the termination criterion has been satisfied, such as by using any of the following techniques:

Maximum iterations/generations: The optimization process is terminated after a pre-defined number of iterations or generations. This is a common criterion in iterative algorithms like genetic algorithms and gradient-based methods.

Convergence threshold: The optimization process is stopped when the change in the objective function value or fitness score between successive iterations falls below a specified threshold. This criterion is used to detect when the algorithm converges to a solution and further iterations are unlikely to result in significant improvements.

Constraint satisfaction: The optimization process is terminated when a candidate solution meets or exceeds all predefined constraints and requirements. This criterion ensures that the optimization algorithm stops once a feasible solution is found.

Computational budget: The optimization process is stopped when a pre-defined limit on computational resources (e.g., time, memory, or CPU usage) is reached. This criterion is useful when resources are limited, and the optimization process needs to be completed within a certain time frame.

Target objective value: The optimization process is terminated when a candidate solution achieves or surpasses a pre-defined target value for the objective function. This criterion ensures that the optimization algorithm stops once a solution of sufficient quality has been found.

Stagnation: The optimization process is stopped when there is no improvement in the best candidate solution or the overall population's fitness for a predefined number of iterations or generations. This criterion indicates that the algorithm may be stuck in a local optimum or has already found the global optimum.

Pareto front convergence: In multi-objective optimization, the optimization process is terminated when the Pareto front converges, meaning the set of non-dominated solutions becomes stable, and no significant improvements are observed.

Embodiments of the present invention may determine whether a termination criterion has been satisfied entirely automatically, entirely manually, or by using a combination of automatic and manual operations. For example, an embodiment may receive (e.g., after some or all iterations of an optimization process) input from a user (e.g., binary input indicating whether to continue/terminate the optimization process), in response to which the embodiment may continue to the next iteration or terminate the optimization process in accordance with the user input. As another example, an embodiment may automatically determine whether a termination criterion has been satisfied, and provide output representing the result of that termination to a user, who may provide feedback input in response, such as feedback input representing approval of, disapproval of, or a modification to the proposed determination, in response to which the embodiment may proceed to the next iteration of the optimization process or not, based on the feedback input. In other words, the user's feedback input may confirm or override the embodiment's automatically-generated determination of whether the termination criterion has been satisfied.

Determining whether a termination criterion has been satisfied may be performed, for example, in whole or in part using a language model (e.g., the language model 112). For example, the termination criterion may be represented by the subject data "<Termination Criterion>", and embodiments of the present invention may determine whether the termination criterion has been satisfied by providing initial text of the form, "Is <Termination Criterion> satisfied?"

Once any optimization process disclosed herein completes and produces one or more candidates as output (also referred to herein as "optimization output"), any technique disclosed herein (such as any transformation operation) may be applied to some or all of the optimization output to produce processed optimization output. For example, any of a variety of techniques may be used to determine whether the optimization output satisfies some criterion. One example of such techniques is to compare the objective function value of the optimization output to an optimal or target objective value. If the difference is within a satisfactory tolerance, the optimization output may be considered to be acceptable.

A language model (e.g., the language model 112) may be used to perform some or all of such post-processing of the optimization output. For example:
  if the optimization process is used to generate optimization output representing an interpretation of a specific claim that is patentable over a particular set of prior art, a language model may be used to predict whether meaning data, representing an interpretation of the specific claim, in the optimization output, represents an interpretation of the specific claim that is patentable over the particular set of prior art, such as by providing the language model with a prompt of the form, "Does <Meaning Data> fall within a scope of a meaning of <Prior Art>?", to generate language model output, and using the language model output to determine whether the meaning data represents an interpretation of the specific claim that is patentable over the particular set of prior art;
  if the optimization process is used to generate optimization output representing an interpretation of a specific claim that is invalid over a particular set of prior art, a language model may be used to predict whether meaning data, representing an interpretation of the specific claim, in the optimization output, represents an interpretation of the specific claim that is invalid over the particular set of prior art, such as by providing the language model with a prompt of the form, "Does <Meaning Data> fall within a scope of a meaning of <Prior Art>?", to generate language model output, and using the language model output to determine whether the meaning data represents an interpretation of the specific claim that is invalid over the particular set of prior art;
  if the optimization process is used to generate optimization output representing an interpretation of a specific claim that is valid over a particular set of prior art and is infringed by a particular product, a language model may be used to predict whether meaning data, representing an interpretation of the specific claim, in the optimization output, represents an interpretation of the specific claim that is valid over the particular set of prior art and is infringed by the particular product, such as by providing the language model with a prompt of the form, "Does <Product> fall within a scope of a meaning of <Meaning Data>, which falls outside a scope of a meaning of <Prior Art>?", to generate language model output, and using the language model output to determine whether the meaning data represents an interpretation of the specific claim that is valid over the particular set of prior art and infringed by the particular product;
  if the optimization process is used to generate optimization output representing an interpretation of a specific claim that is invalid over a particular set of prior art and is not infringed by a particular product, a language model may be used to predict whether meaning data, representing an interpretation of the specific claim, in the optimization output, represents an interpretation of the specific claim that is invalid over the particular set of prior art and is not infringed by the particular product, such as by providing the language model with a prompt of the form, "Does <Product> fall outside a scope of a meaning of <Meaning Data>, which falls within a scope of a meaning of <Prior Art>?", to generate language model output, and using the language model output to determine whether the meaning data represents an interpretation of the specific claim that is invalid over the particular set of prior art and not infringed by the particular product.

In any optimization process performed according to an embodiment of the present invention, a language model may be used to perform one or more steps of the optimization process, in any combination, such any one or more of the following, in any combination: initializing the set of candidates; generating one or more variations of some or all of the candidates in the set of candidates; evaluating the variations; filtering the variations; and determining whether a termination criterion has been satisfied. Some examples of using a language model to perform individual ones of these steps are provided above. Some examples of using a language model to perform a combination of two or more of these steps include:
  Using a language model to evaluate and filter variations, such as by providing a prompt of the following form to the language model 112: "Evaluate <Variations> according to <Objective Function> and remove, from <Variations>, any candidates which do not satisfy <Pruning Parameters>."

Using a language model to generate and evaluate variations, such as by providing a prompt of the following form to the language model 112: "Generate a new set of candidates based on <Variations> evaluate the new set of candidates according to <Objective Function> to generate corresponding objective function outputs."

Using a language model to iterate over steps in the optimization process, such as by providing a prompt of the following form to the language model 112: "Repeat the steps above until <Termination Criterion> is satisfied."

The various optimization processes disclosed herein have a variety of benefits. For example, such optimization processes may be used to multiple interpretations of a patent claim, which can be useful for a variety of purposes, such as:

identifying an interpretation of a patent claim that is most likely to be infringed or not infringed by a particular product or class of products;

generating a variation of the patent claim that is most likely to be infringed (or not infringed) by a particular product or class of products;

identifying an interpretation of the patent claim that is most likely to valid (or invalid);

generating a variation of the patent claim that is most likely to be valid (or invalid), e.g., in light of particular prior art;

identifying an interpretation of a patent claim that is likely to be both valid and infringed by a particular product or class of products; and identifying an interpretation of a patent claim that is likely to be both invalid and not infringed by a particular product or class of products.

The techniques disclosed herein for generating variations of a patent claim (e.g., using optimization processes) are also applicable to generating variations of other kinds of subject data, such as text describing a product or class of products (e.g., a product descriptor).

Some example of practical applications of the ability to generate variations of subject data (e.g., a patent claim or product descriptor), such as by using an optimization processes, include the following:

Patent claim optimization: By analyzing multiple interpretations of a patent claim, inventors, patent owners, and patent attorneys can identify potential weaknesses, ambiguities, or overly narrow language in patent claims. They can then iteratively refine and optimize the claim language to make it more robust, defensible, and valuable. This process can help increase the likelihood of successful patent prosecution and enforcement.

Patent design-around and clearance: Stakeholders can use the multiple interpretations to identify potential infringement risks when developing or modifying their products. By understanding the various ways a patent claim can be interpreted, engineers and product designers can optimize their designs to avoid infringement or develop alternative solutions that do not infringe on existing patents.

IP strategy optimization: Businesses can use the multiple variations generated by embodiments of the present invention to identify opportunities for innovation or improvement within their patent portfolio. By understanding the different ways a patent claim can be construed, companies can make more informed decisions about where to invest in R&D, how to structure their IP filing strategy, and how to position themselves within the competitive landscape.

Licensing and technology transfer optimization: By understanding the various interpretations of a patent claim, parties involved in licensing and technology transfer negotiations can identify areas of overlap or complementarity, allowing them to structure agreements that maximize value and minimize risks. This can lead to more successful partnerships and collaborations.

Optimization processes disclosed herein which generate multiple variations of a patent claim and/or multiple variations of a product descriptor may be integrated into larger processes, thereby creating additional benefits for stakeholders involved in intellectual property management, innovation, and legal practice. Some examples of how optimization processes disclosed herein may be combined with other processes to create even more value include:

Integration with patent landscaping and technology scouting: By incorporating optimization processes into a patent landscaping or technology scouting system, stakeholders may identify trends, emerging technologies, and potential collaboration opportunities. This combined process can help organizations make more informed decisions about their R&D investments, IP strategies, and market positioning.

Integration with IP portfolio management: Combining optimization processes disclosed herein with an IP portfolio management system allows organizations to proactively monitor and manage their entire patent portfolio. This can help companies identify potential infringement risks, optimize their patent claims, and improve their overall IP strategy.

Integration with open innovation and crowdsourcing platforms: Optimization processes disclosed herein may be integrated with open innovation and crowdsourcing platforms, enabling inventors and organizations to collaborate on solving infringement issues or developing new technologies. By understanding multiple interpretations of patent claims, participants can propose alternative solutions or improvements that minimize infringement risks and foster innovation.

Integration with legal analytics and litigation support tools: Optimization processes disclosed herein may be combined with legal analytics and litigation support tools to help attorneys and law firms identify patterns in patent litigation, assess the strength of legal arguments, and develop more effective strategies for patent disputes. This can lead to better case outcomes and a more efficient legal practice.

Integration with due diligence and M&A support systems: By incorporating optimization processes disclosed herein into due diligence assessments, investors and companies can efficiently evaluate the IP risks associated with potential acquisitions, partnerships, and investments (e.g., in patent litigation and/or licensing campaigns). This can help stakeholders make more informed decisions and reduce the likelihood of costly IP disputes.

By integrating optimization processes disclosed herein into larger systems and processes, stakeholders can create a more comprehensive and powerful set of tools for managing intellectual property, fostering innovation, and navigating the complex world of patent law. This can lead to better decision-making, reduced risks, and ultimately, more valuable and defensible patents.

Figure 2:
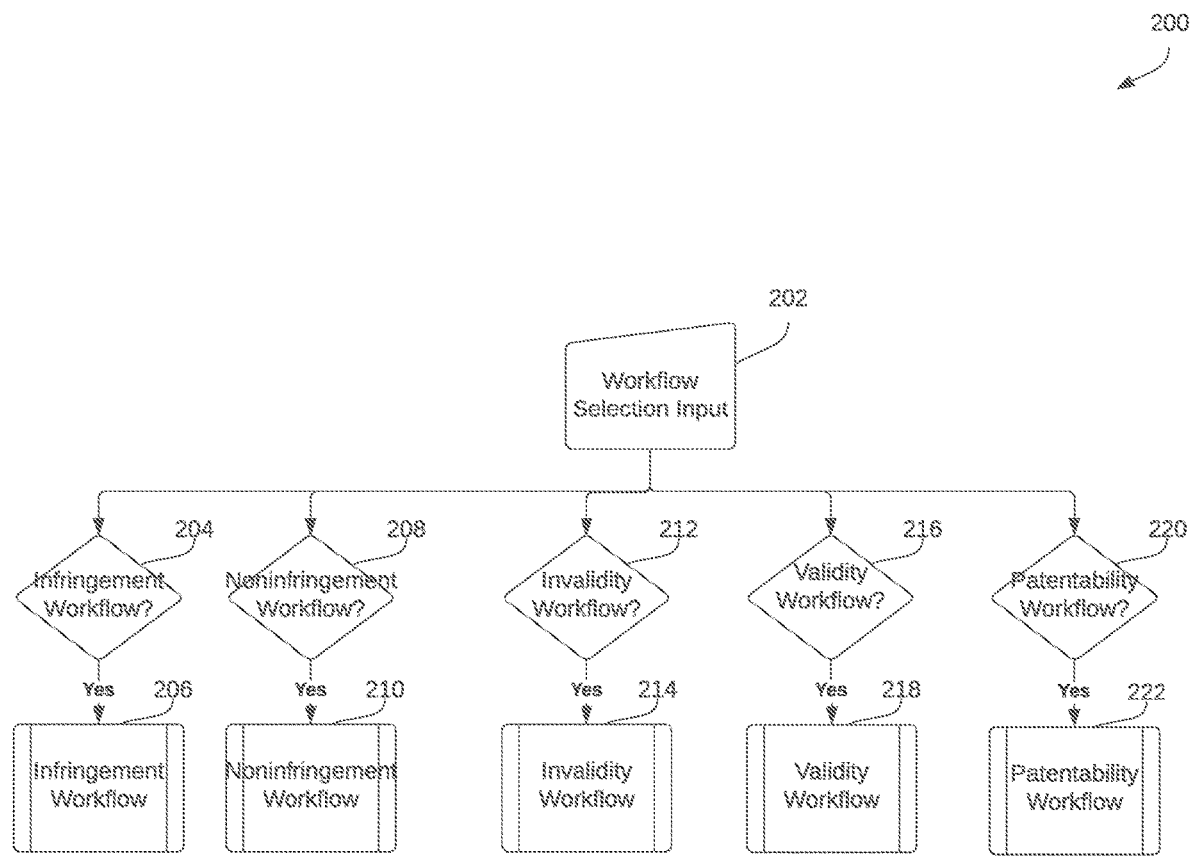
FIG. 2 is a dataflow diagram of a system for using the system of FIG. 1A to perform one or more of a patent infringement workflow, a patent noninfringement workflow, a patent validity workflow, a patent invalidity workflow, and a patentability workflow according to one embodiment of the present invention.

Having described some example embodiments of one specific use case (i.e., determining whether a patent is infringed), another embodiment of the present invention will now be described in which the user 102 may use the system 100 to perform any of a variety of workflows. Referring to FIG. 2, a dataflow diagram is shown of a system 200 which may use the system 100 of FIG. 1A to perform one or more of a patent infringement workflow, a patent noninfringement workflow, a patent validity workflow, a patent invalidity workflow, and a patentability workflow. These particular workflows are merely examples and do not constitute limitations of the present invention. Particular embodiments of the present invention need not implement all of these workflows, and may implement workflows not shown in FIG. 2. The term "workflow" is used synonymously herein with "process" and "method."

The system 200 receives workflow selection input 202, e.g., from the user 102 or from the language model application 110. For example, the user 102 may input the workflow selection input 202 manually, such as by selecting one of a plurality of workflows from a list or by speaking or typing a name or other identifier of a workflow. As another example, the user 102 may enter the workflow selection input 202 in the form of any kind of subject data, such as unstructured text, which the system 200 may process in any of a variety of ways disclosed herein, such as by performing any kind of transformation on the workflow selection input 202 to produce output, which may either supplement or replace the workflow selection input 202. As merely one example, the workflow selection input 202 may be provided as input to the language model application 110 and processed in any of the ways disclosed herein in connection with processing of the user input 104 by the language model application 110 to produce language model output 114 based on the workflow selection input 202. The system 200 may replace the workflow selection input 202 with the resulting language model output 114, supplement the workflow selection input 202 with the resulting language model output 114, or otherwise modify the workflow selection input 202 based on the resulting language model output 114. Any functions disclosed herein as being performed on the workflow selection input 202 may be performed on such replaced, supplemented, or otherwise modified workflow selection input 202.

The system 200 may identify, based on the workflow selection input 202, one or more workflows, such as one or more of the workflows shown in FIG. 2. Such identification may be performed in any of a variety of ways. For example, if the workflow selection input 202 unambiguously identifies one or more workflows (such as by using computer-encoded data, e.g., one or more selections from a list of workflows), then the system 200 may identify the one or more workflows directly from the workflow selection input 202. As another example, the system 200 may perform any kind of transformation on the workflow selection input 202, such as by applying any kind of NLP to the workflow selection input 202 and/or by applying the language model 112 to the workflow selection input 202, thereby generating output (e.g., language model output 114), based on which the system 200 may identify one or more workflows. As a simple example, if the workflow selection input 202 contains a phrase such as, "Is patent 9,999,999 infringed by . . . ", then the system 200 may identify the infringement workflow based on the workflow selection input 202.

Note that, in various embodiments of the present invention, workflows may be performed without receiving the workflow selection input 202 and without identifying the workflow to be performed based on the workflow selection input 202. For example, a particular workflow may be implemented in a software application which is designed only to perform that workflow. In such a case, the software application may perform that workflow without receiving the workflow selection input 202 and without identifying the workflow to be performed based on the workflow selection input 202.

As another example, the process of identifying the workflow to be performed based on the workflow selection input 202 may be performed implicitly by the system 200. For example, if the workflow selection input 202 is used as an implementation of the user input 104 and is provided as an input to the language model application 110, the language model application 110 may apply the language model 112 to the workflow selection input 202 to produce the language model output 114. Such application of the language model 112 to the workflow selection input 202 may implicitly (i.e., perform the functional equivalent of) identify the workflow to be performed based on the workflow selection input 202. For example, if the workflow selection input 202 contains text such as, "Is a patent claim that contains a hammer, a spring, a hold-down bar, a catch, and a platform infringed by a mousetrap model XYZ from ABC Corp?," then the language model application 110 may produce language model output 114 containing an answer to the question represented by the workflow selection input 202, and thereby perform the functional equivalent of identifying the workflow to be performed (e.g., the infringement workflow in this example), without necessarily engaging in an explicit step of determining whether the workflow selection input 202 identifies that workflow.

If the system 200 determines that the workflow selection input 202 identifies a patent infringement workflow (FIG. 2, operation 204), then the system 200 performs the patent infringement workflow in response to the determination (FIG. 2, operation 206). If the system 200 determines that the workflow selection input 202 identifies a patent noninfringement workflow (FIG. 2, operation 208), then the system 200 performs the patent noninfringement workflow in response to the determination (FIG. 2, operation 210). If the system 200 determines that the workflow selection input 202 identifies a patent invalidity workflow (FIG. 2, operation 212), then the system 200 performs the patent invalidity workflow in response to the determination (FIG. 2, operation 214). If the system 200 determines that the workflow selection input 202 identifies a patent validity workflow (FIG. 2, operation 216), then the system 200 performs the patent validity workflow in response to the determination (FIG. 2, operation 218). If the system 200 determines that the workflow selection input 202 identifies a patentability workflow in response to the determination (FIG. 2, operation 220), then the system 200 performs the patentability workflow (FIG. 2, operation 222).

Figure 3:
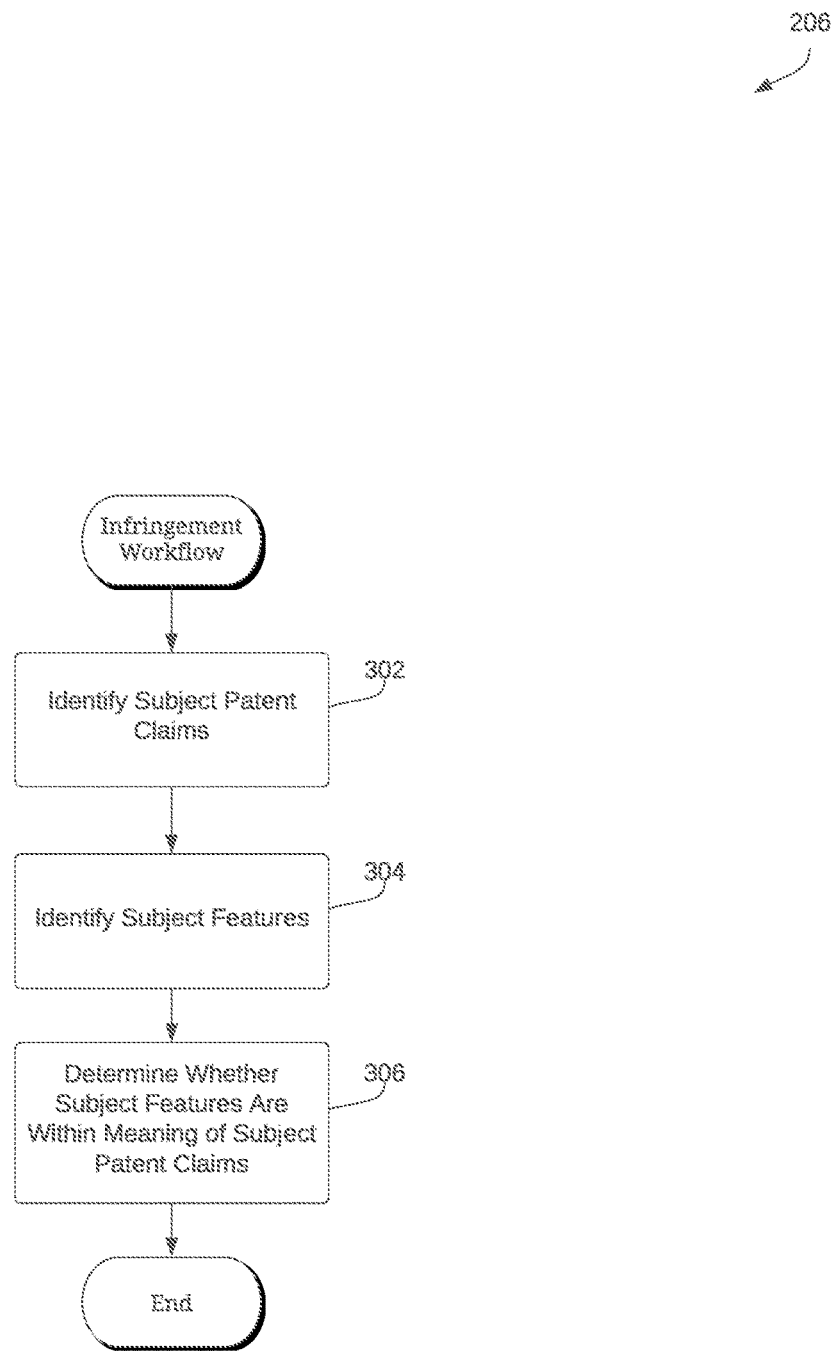
FIG. 3 is a flowchart of an example implementation of a patent infringement workflow according to one embodiment of the present invention.

An example implementation of the patent infringement workflow 206 is shown in FIG. 3. The patent infringement workflow 206 may receive the workflow selection input 202 as input and may include the following operations:

(1) Identify the subject patent claims (FIG. 3, operation 302). "The subject patent claims" refers to one or more patent claims which are the subject of the patent infringement workflow 206. Although the term "subject patent claims" is used herein in the plural for convenience, the subject patent claims may include one or more patent claims. Furthermore, although the term "claims" is used in "the subject patent claims," the subject patent claims may include one or more patent claim elements and/or one or more patent claim limitations, either in addition to or instead of one or more patent claims. As a result, any reference below to "the subject patent claims" should be understood to encompass embodiments in which the subject patent claims include patent claim elements and/or patent claim limitations, but not complete patent claims.

(2) Identify the subject features (FIG. 3, operation 304). "The subject features" refers to the feature(s) of one or more products and/or processes which are the subject of the patent infringement workflow 206. A feature may, for example, be a component of a product or a step/act in a process. More generally, a feature may, for example, be any property of a product or a process. Although the term "subject features" is used herein in the plural for convenience, the subject features may include one or more features. The subject features may be represented in any form, such as in the form of any kind of subject data disclosed herein.

(3) Determine whether one or more of the subject features are within a meaning of one or more of the subject patent claims (FIG. 3, operation 306). The system 206 may produce output representing the result of the determination performed in operation 306.

The system 206 may identify the subject patent claims (FIG. 3, operation 302) in any of a variety of ways, such as:
  (1) Obtaining the subject patent claims from the user 102, who may input the subject patent claims in any of a variety of forms, such as by inputting the subject patent claims manually, providing one or more patent documents containing the subject patent claims, and providing one or more patent document identifiers which identify one or more patent documents containing the subject patent claims. Any such input from the user 102 may be part of the workflow selection input 202 or be separate from the workflow selection input 202.
  (2) Performing a query operation, e.g., on the workflow selection input 202 and/or other input received from the user 102, to identify the subject patent claims, such as by performing such a query operation to identify one or more patent documents, and extracting the subject patent claims from the identified patent document(s).
  (3) Performing any kind of transformation, e.g., on the workflow selection input 202 and/or other input received from the user 102, such as by applying the language model 112 to the workflow selection input 202 and/or other input received from the user 102, to generate language model output 114 which contains the subject patent claims, or which may be the subject of one or more additional transformation operations in order to obtain the subject patent claims.

The system 206 may identify the subject features (FIG. 3, operation 304) in any of a variety of ways, such as:
  (1) Obtaining the subject features from the user 102, who may input the subject features in any of a variety of forms, such as by inputting the subject features manually, providing one or more documents (e.g., web pages and/or product manuals) containing the subject features, and providing one or more product descriptors which contain or may otherwise be used to obtain the subject features. Any such input from the user 102 may be part of the workflow selection input 202 or be separate from the workflow selection input 202.
  (2) Performing a query operation, e.g., on the workflow selection input 202 and/or other input received from the user 102, to identify the subject features, such as by performing such a query operation to identify one or more documents, and extracting the subject features from the identified document(s).
  (3) Performing any kind of transformation, e.g., on the workflow selection input 202 and/or other input received from the user 102, such as by applying the language model 112 to the workflow selection input 202 and/or other input received from the user 102, to generate language model output 114 which contains the subject features, or which may be the subject of one or more additional transformation operations in order to obtain the subject features.

Determining whether the subject features are within the meaning of one or more of the subject patent claims (FIG. 3, operation 306) may include performing such a determination for any combination of one or more of the subject features and one or more of: (1) one or more of the subject patent claims as a whole; (2) one or more claim elements within one or more of the subject patent claims; and (3) one or more claim limitations within one or more of the subject patent claims. The following description will refer to "the subject patent claims" for ease of explanation, even though particular implementations may apply, additionally or alternatively, to any of the subsets just mentioned.

The system 206 may determine whether the subject features are within the meaning of one or more of the subject patent claims in any of a variety of ways, such as any one or more of the following:
  (1) Forming a query (e.g., in the form of unstructured text) of the form "Does <Subject Feature> fall within the meaning of <Patent Claim|Claim Element|Claim Limitation>?," "Is <Subject Feature> an example of <Patent Claim|Claim Element|Claim Limitation>?," "Does <Patent Claim|Claim Element|Claim Limitation> describe <Subject Feature>?," or the like.
  (2) Providing the query as an input to the language model application 110 to produce language model output 114 in any of the ways disclosed herein, and determining whether the subject feature infringes the patent claim, element, or limitation based on the language model output 114.
  (3) Performing any kind of natural language processing on the identified subject patent claims and the identified subject features to determine whether any of the subject features are within the meaning of one or more of the subject patent claims.

Note that one or more of operations 302, 304, and 306 may involve the use of an autoregressive language model (e.g., a language model in the GPT-n family), while one or more other ones of the operations 302, 304, and 306 may be performed without the use of an autoregressive language model. For example:
  (1) Operations 302 and 304 may be performed without the use of an autoregressive language model, while operation 306 may be performed with the use of an autoregressive language model.
  (2) Operation 302 may be performed without the use of an autoregressive language model, while operations 304 and 306 may be performed with the use of an autoregressive language model.
  (3) Operation 304 may be performed without the use of an autoregressive language model, while operations 302 and 306 may be performed with the use of an autoregressive language model.
  (4) Operation 306 may be performed without the use of an autoregressive language model, while operations 302 and 304 may be performed with the use of an autoregressive language model.

Some or all of operations 302, 304, and 306 may be performed implicitly by the system 206. For example, the system 206 may receive user input 104 from the user 102 in any of the forms disclosed herein, and the language model application 110 may apply the language model 112 to the user input 104, thereby generating the language model output 114. The language model output 114 may include any one or more of the following, in any combination: the subject patent claims, the subject features, and the output representing the result of determining whether the subject features are within the meaning of the subject patent claims. Such application of the language model 112 to the user input 104 may implicitly (i.e., perform the functional equivalent of) perform the functions of operations 302, 304, and/or 306 in any combination.

Furthermore, the operations 302, 304, and 306 in FIG. 3 may be performed in any order, as is true of all of the methods disclosed herein.

Consider the following two specific example implementations of the patent infringement workflow 206 of FIG. 3. In a first example implementation of the patent infringement workflow 206 of FIG. 3:

(1) A first instance of the user input 104 includes a query requesting products/services that have particular features, where those features may, for example, be taken from one or more patent claims. Examples of such a query are "What are some examples of products having <Features>?," and "What are some examples of services having <Features>?" The term "service" is used synonymously herein with "method," but is used to connote a commercially-offered/provided method.

(2) The first instance of the user input 104 is applied by the language model application 110 to the language model 112 to produce a first instance of the language model output 114 in any of the ways disclosed herein.

(3) The system 206 identifies, based on the first instance of the language model output 114, one or more product/service descriptors, such as names of one or more products/services.

(4) A second instance of the user input 104 includes a query requesting components of the products/services identified above. Examples of such a query are "What are the components of <Product>?," and "What steps are performed as part of <Service>?"

(5) The second instance of the user input 104 is applied by the language model application 110 to the language model 112 to produce a second instance of the language model output 114 in any of the ways disclosed herein.

(6) The system 206 identifies, based on the second instance of the language model output 114, one or more product/service components/steps.

(7) The system 206 may identify a set of subject patent claims. The system 206 may, for each feature/claim pair (or feature/element pair, or feature/limitation pair), generate an additional corresponding instance of the user input 104, which includes a query asking whether the feature falls within the meaning of the claim. Examples of such a query are, "Does <Claim> describe <Feature>?," "Is <Feature> an example of <Claim>?," and "Does <Feature> fall within the scope of the meaning of <Claim>?"

(8) The language model application 110 applies each such additional instance of the user input 104 to the language model 112 to produce additional instances of the language model output 114 in any of the ways disclosed herein.

(9) The system 206 generates, based on any of the language model outputs 114 generated during the patent infringement workflow 206, output indicating whether the subject features infringe the subject patent claims. Generating such output may include applying the "all elements rule," as described elsewhere herein.

In a first example implementation of the patent infringement workflow 206 of FIG. 3:

(1) A first instance of the user input 104 includes a query requesting products/services that have particular features, where those features may, for example, be taken from one or more patent claims. Examples of such a query are "What are some examples of products having <Features>?," and "What are some examples of services having <Features>?" The term "service" is used synonymously herein with "method," but is used to connote a commercially-offered/provided method.

(2) The first instance of the user input 104 is applied by the language model application 110 to the language model 112 to produce a first instance of the language model output 114 in any of the ways disclosed herein.

(3) The system 206 identifies, based on the first instance of the language model output 114, one or more product/service descriptors, such as names of one or more products/services.

(4) The system 206 may identify a set of subject patent claims. The system 206 may, for each product/claim pair or service/claim pair (or product/element pair, service/element pair, or product/limitation pair, or service/limitation pair), generate an additional corresponding instance of the user input 104, which includes a query asking whether the product/services falls within the meaning of the claim. Examples of such a query are, "Does <Claim> describe <Product|Service>?," "Is <Product|Service> an example of <Claim>?," and "Does <Product|Service> fall within the scope of the meaning of <Claim>?"

(5) The language model application 110 applies each such additional instance of the user input 104 to the language model 112 to produce additional instances of the language model output 114 in any of the ways disclosed herein.

(6) The system 206 generates, based on any of the language model outputs 114 generated during the patent infringement workflow 206, output indicating whether the subject products/services infringe the subject patent claims. Generating such output may include applying the "all elements rule," as described elsewhere herein.

Note that in these example implementations of the patent infringement workflow 206 of FIG. 3, the subject patent claims may or may not be taken from a patent document. Some or all of the subject patent claims may, for example, be entered manually by the user 102 or otherwise obtained from a source other than a patent document. As this implies, the language of the subject patent claims may or may not comply with the laws and regulations that apply to patent claims. Similarly, some or all of the subject patent claims may consist of claim elements or claim limitations, rather than complete patent claims. Furthermore, even in embodiments in which some or all of the subject patent claims are obtained from a patent document (e.g., a patent or published patent application), embodiments of the present invention may (manually and/or automatically) generate data (e.g., unstructured text) based on the subject patent claims from the patent document, where the generated data differs from the subject patent claims from the patent document. Consider an example in which a claim in a patent document (e.g., a patent or a published patent application) includes the limitation "a hammer." Embodiments of the present invention may automatically generate, based on the unstructured text "a hammer," other data (e.g., other unstructured text), such as "a means for exerting a downward force." Note that, in this example, the original unstructured text ("a hammer") does not appear in the generated data ("a means for exerting a downward force") and vice versa. The system 200 may, for example, generate other data based on the text from the patent document by performing any kind of transformation disclosed herein, which may include, for example, generating one or more hypernyms and/or hyponyms of the text from the patent document. The system 200 (e.g., the system 206) may use the generated data (e.g., "a means for exerting a downward force") in addition to or instead of the original text from the patent document in any of the operations disclosed herein.

Figure 4:
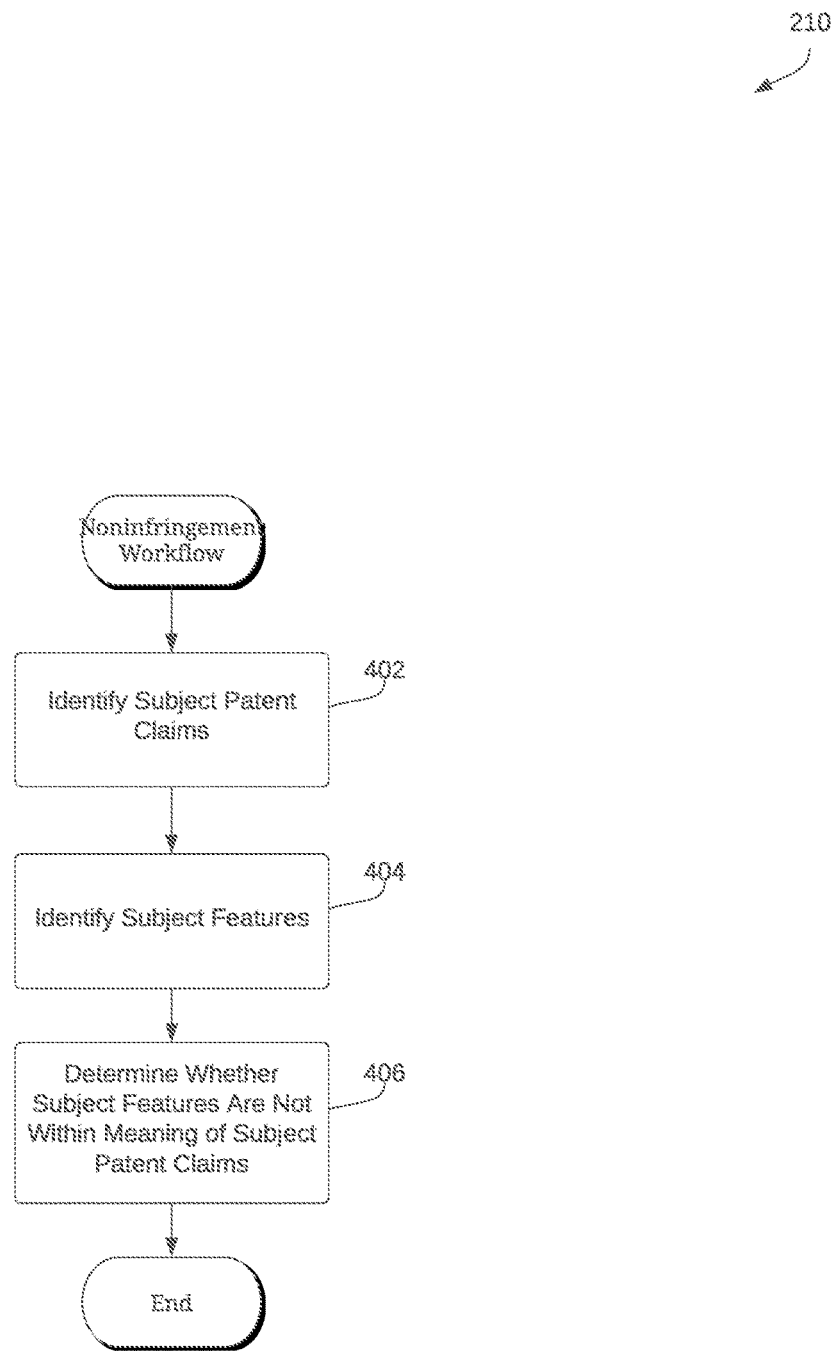
FIG. 4 is a flowchart of an example implementation of a patent noninfringement workflow according to one embodiment of the present invention.

An example implementation of the patent noninfringement workflow 210 is shown in FIG. 4. In general, the patent noninfringement workflow 210 may operate in the same or similar manner to the patent infringement workflow 206. As a result, the disclosure herein of embodiments of the patent infringement workflow 206 are generally applicable to embodiments of the patent noninfringement workflow 210 and therefore will not be repeated except where it will be helpful to note differences between the two workflows.

In general, the patent noninfringement workflow 210 may receive the user input 104 (e.g., the workflow selection input 202) as input and may include the following operations:
(1) Identify the subject patent claims (FIG. 4, operation 402), such as in any of the ways disclosed herein in connection with operation 302 of FIG. 3.
(2) Identify the subject features (FIG. 4, operation 404), such as in any of the ways disclosed herein in connection with operation 304 of FIG. 3.
(3) Determine whether one or more of the subject features are not within a meaning of one or more of the subject patent claims (FIG. 4, operation 406). The system 210 may produce output representing the result of the determination performed in operation 406.

As disclosed elsewhere herein, the patent infringement workflow 206 may apply the "all elements rule," such as by:
(1) generating, for each element in a particular patent claim, output indicating whether a subject product/service infringes that element of the particular patent claim;
(2) applying a logical AND operation to all of the outputs generated in (1); and
(3) generating an infringement determination output that is the result of the logical AND operation, such that the output generated in (3) is true if and only if all of the outputs generated in (1) are true.

The patent noninfringement workflow 210 may instead:
(1) generate, for each element in a particular patent claim, output indicating whether a subject product/service infringes that element of the particular patent claim;
(2) apply a logical AND operation to all of the outputs generated in (1);
(3) apply a logical NOT operation to the result of the logical AND operator from (2); and
(4) generate a noninfringement determination output that is the result of the logical NOT operation, such that the output generated in (4) is true if and only if any of the outputs generated in (1) is false.

Figure 5:
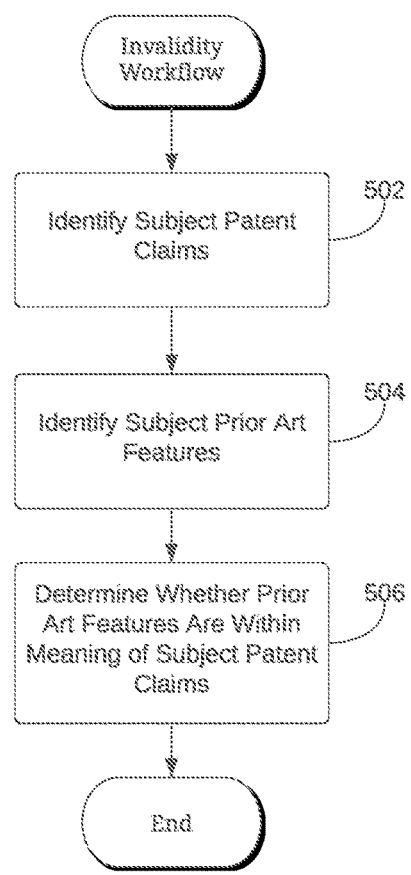
FIG. 5 is a flowchart of an example implementation of a patent invalidity workflow according to one embodiment of the present invention.

An example implementation of the patent invalidity workflow 214 is shown in FIG. 5. In general, the patent invalidity workflow 214 may operate in the same or similar manner to the patent infringement workflow 206, except that the patent invalidity workflow 214 may identify and process prior art features rather than subject product/service features, because determining whether a patent claim is infringed by a product/service involves the same or similar analysis as determining whether a patent claim is rendered invalid by one or more prior art references. As a result, the disclosure herein of embodiments of the patent infringement workflow 206 are generally applicable to embodiments of the patent invalidity workflow 214 and therefore will not be repeated except where it will be helpful to note differences between the two workflows. As this implies, the invalidity analysis implemented by the invalidity workflow 214 of FIG. 5 is intended to be an analysis for lack of novelty and/or for obviousness (inventive step).

In general, the patent invalidity workflow 214 may receive the user input 104 (e.g., the workflow selection input 202) as input and may include the following operations:
(1) Identify the subject patent claims (FIG. 5, operation 502), such as in any of the ways disclosed herein in connection with operation 302 of FIG. 3.
(2) Identify the subject prior art features (FIG. 5, operation 504), such as in any of the ways disclosed herein in connection with operation 304 of FIG. 3, except that operation 504 may be applied to evidence of prior art rather than to evidence of products/services. Examples of such evidence of prior art include, for example, patent documents, non-patent publications (also referred to as "non-patent literature"), and descriptions of sales, offers for sale, and public uses of products/services.
(3) Determine whether one or more of the subject prior art features are within a meaning of one or more of the subject patent claims (FIG. 5, operation 506). The system 214 may produce output representing the result of the determination performed in operation 506. Generating such output may include applying the "all elements rule," such as described above in connection with the infringement workflow 206 of FIG. 3, such that the output generated by operation 506 is true if and only if each of the elements of a subject patent claim is disclosed by at least one of the subject prior art references.

Figure 6:
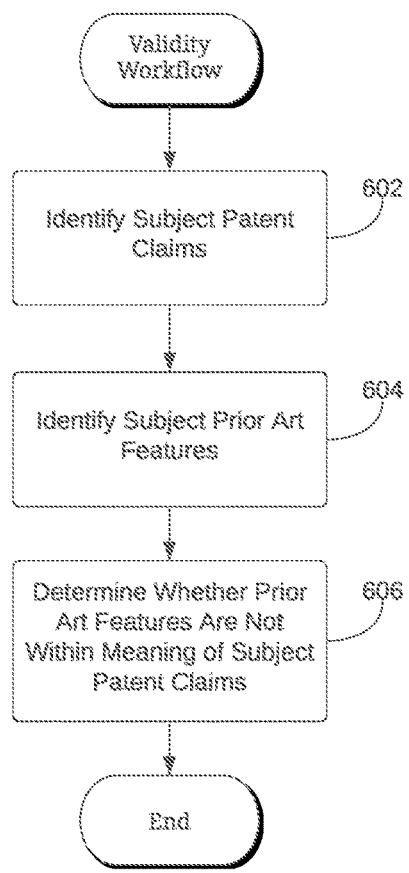
FIG. 6 is a flowchart of an example implementation of a patent validity workflow according to one embodiment of the present invention.

An example implementation of the patent validity workflow 218 is shown in FIG. 6. In general, the patent validity workflow 218 may operate in the same or similar manner to the patent invalidity workflow 214. As a result, the disclosure herein of embodiments of the patent invalidity workflow 214 are generally applicable to embodiments of the patent validity workflow 218 and therefore will not be repeated except where it will be helpful to note differences between the two workflows. As this implies, the validity analysis implemented by the validity workflow 218 of FIG. 6 is intended to be an analysis for novelty and/or for nonobviousness (inventive step).

In general, the patent validity workflow 218 may receive the user input 104 (e.g., the workflow selection input 202) as input and may include the following operations:
(1) Identify the subject patent claims (FIG. 6, operation 602), such as in any of the ways disclosed herein in connection with operation 502 of FIG. 5.
(2) Identify the subject prior art features (FIG. 6, operation 604), such as in any of the ways disclosed herein in connection with operation 504 of FIG. 5.
(3) Determine whether one or more of the subject prior art features are not within a meaning of one or more of the subject patent claims (FIG. 6, operation 606), such as in any of the ways disclosed herein in connection with operation 506 of FIG. 5. The system 218 may produce output representing the result of the determination performed in operation 606. Generating such output may include applying the inverse of the "all elements rule," such as described above in connection with the noninfringement workflow 210 of FIG. 4, such that the output generated by operation 606 is true if and only if any of the elements of a subject claim is not disclosed by any of the prior art references.

Figure 7:
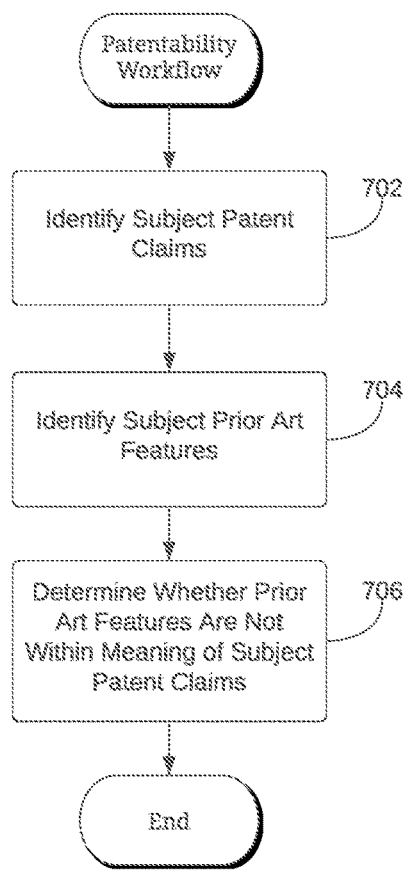
FIG. 7 is a flowchart of an example implementation of a patentability workflow according to one embodiment of the present invention.

An example implementation of the patentability workflow 222 is shown in FIG. 7. In general, the patentability workflow 222 may operate in the same or similar manner to the patent validity workflow 218, because determining whether a claim is patentable over prior art under a novelty and/or nonobviousness analysis (e.g., before filing a patent application containing the claim) is the same as or similar to determining whether the claim is valid over prior art under a novelty and/or nonobviousness analysis (e.g., after a patent containing the claim has been issued). Although some differences in the analysis may be required or desired, such as due to a presumption of validity of an issued patent claim that does not apply to an unissued patent claim, the same general techniques apply to both types of claim. As a result, the disclosure herein of embodiments of the patent validity workflow 218 are generally applicable to embodiments of the patentability workflow 222 and therefore will not be repeated except where it will be helpful to note differences between the two workflows. As this implies, the patentability analysis implemented by the patentability workflow 222 of FIG. 7 is intended to be an analysis for novelty and/or nonobviousness (inventive step).

In general, the patentability workflow 222 may receive the user input 104 (e.g., the workflow selection input 202) as input and may include the following operations:

(1) Identify the subject patent claims (FIG. 7, operation 702), such as in any of the ways disclosed herein in connection with operation 602 of FIG. 6.

(2) Identify the subject prior art features (FIG. 7, operation 704), such as in any of the ways disclosed herein in connection with operation 604 of FIG. 6.

(3) Determine whether one or more of the subject prior art features are not within a meaning of one or more of the subject patent claims (FIG. 7, operation 706), such as in any of the ways disclosed herein in connection with operation 606 of FIG. 6. The system 222 may produce output representing the result of the determination performed in operation 706. Generating such output may include applying the inverse of the "all elements rule," such as described above in connection with the validity workflow 218 of FIG. 6, such that the output generated by operation 706 is true if and only if any of the elements of a subject claim is not disclosed by any of the prior art references.

Various embodiments of the present invention have certain advantages, such as one or more of the following.

Most existing technologies related to automatic processing of patent documents are directed to searching for—and, therefore, finding—patent documents. Improvements in such technologies typically are directed to finding patent documents more accurately, e.g., finding patent documents which are as relevant as possible to user-submitted queries. Some existing technologies perform clustering of patent documents for purposes such as identifying trends in patent filings and grants, such as identifying technology fields which are densely (and sparsely) populated with patent documents. Although embodiments of the present invention may be used for such purposes, embodiments of the present invention provide the benefit of at least partially automating the process of determining whether a product (such as may be represented by a product descriptor) falls within the scope of a patent document (such as one or more claims of an issued patent), such as for the purpose of at least partially automating the process of determining whether the product infringes one or more claims of the patent document. In this way, embodiments of the present invention at least partially automate a process which, heretofore, was solely the province of human judgment and was exercised solely by human experts, such as patent attorneys.

One of the benefits that often is claimed in connection with systems, such as ChatGPT, that use large language models, is that they enable a single input (e.g., a single unstructured text string representing a prompt or query) to be used to generate an output automatically, where the same or similar output would otherwise require multiple inputs to generate if previous techniques, such as structured querying of one or more relational databases, were instead used to generate a response to the same query. As a result, much effort and attention is now being focused on how to create an individual input (referred to herein as "initial text" and "prompts") that can be provided to a language model to generate a useful language model output in a single pass. Such efforts focus, in other words, on improving the quality of the direct output of a language model relative to the direct input to the language model. Although embodiments of the present invention may provide an input to a language model to generate an output of the language model, embodiments of the present invention may produce higher-quality results in other, surprising and unexpected, ways.

For example, some embodiments of the present invention receive a single input (e.g., the user input 104) and: (1) generate (e.g., automatically), based on that input, a plurality of language model inputs; (2) provide (e.g., automatically) the plurality of language model inputs to a language model to generate a plurality of language model outputs; and (3) generate (e.g., automatically) one or more outputs based on the plurality of language model outputs (such as by generating a single output that is a function of the plurality of language model outputs). Such embodiments are contrary to the well-accepted understanding that a primary benefit of a large language model (such as those in the GPT family) is that it may be used to generate a single output based on a single input in a single pass. Yet, the ability of embodiments of the present invention to generate multiple sub-inputs based on a single input, and to use a language model to generate sub-outputs based on each of those sub-inputs, can provide a variety of benefits in comparison to using the language model to process the single input to generate a single output.

For example, some language models, such as those used by ChatGPT, are relatively generic in the sense that they have been trained on a large amount and wide variety of data that are not limited to any specific domain. As a result, attempting to obtain outputs (e.g., answers to queries) that are highly domain-specific using such language models can produce sub-optimal results. For example, asking such a language model, "Does <Product X> infringe <Patent Y>?" is not likely to produce a highly-accurate result for a variety of reasons, such as:

(1) The language model may not be able to identify the referent of <Product X> accurately. In fact, a large language model may identify such a product less accurately than a well-specified structured query suitable for processing by a conventional product database.

(2) The language model may not be able to identify the referent of <Patent Y> accurately. In fact, a large language model may identify such a patent less accurately than a well-specified structured query suitable for processing by a conventional patent database.

(3) The language model may not "understand" the legal meaning of "infringe" and be able to apply that meaning in a way that produces a result that is consistent with that legal meaning.

Embodiments of the present invention address these problems in a variety of ways. For example:

(1) Embodiments of the present invention may use techniques, including techniques that do not involve the use of a language model (such as conventional text parsing and/or structured database searching techniques), to identify the product referred to by <Product X> unambiguously or less ambiguously than would have resulted from using a language model to perform the same function.

(2) Embodiments of the present invention may use techniques, including techniques that do not involve the use of a language model (such as conventional text parsing and/or structured database searching techniques), to identify the patent referred to by <Patent Y> unambiguously or less ambiguously than would have resulted from using a language model to perform the same function.

(3) Embodiments of the present invention may use techniques, including techniques that do not involve the use of a language model, to identify one or more claims, claim elements, and/or claim limitations within the patent referred to by <Patent Y>, more accurately than would have resulted from using a language model to perform the same function.

(4) Embodiments of the present invention may generate (e.g., automatically) one or more instances of input (e.g., initial text), such as based on any of the results of the processing described above (e.g., output representing the product referred to by <Product X>, output representing the patent referred to by <Product Y>, and/or one or more claims, claim elements, and/or claim limitations within that patent), and provide the one or more instances of input (e.g., initial text) to a language model to generate corresponding language model output. The quality (e.g., accuracy and/or relevance) of such language model output(s) may be higher than if the original input (e.g., "Does <Product X> infringe <Patent Y>?") had been provided as input to the language model.

(5) For example, embodiments of the present invention may generate (e.g., automatically), for each of a plurality of claim elements in a patent claim, corresponding input text representing a query whether the product represented by <Product X> falls within a scope of a meaning of that claim element, and provide each of the resulting plurality of input texts to a language model to generate corresponding language model output. The quality (e.g., accuracy and/or relevance) of the resulting plurality of language model outputs, each of which may represent a prediction whether the product represented by <Product X> falls within a scope of a meaning of a corresponding claim element in a claim of the patent represented by <Patent Y>, may be higher than if the original input (e.g., "Does <Product X> infringe <Patent Y>?") had been provided as input to the language model.

As the examples above illustrate, embodiments of the present invention have the surprising and unexpected benefit of processing particular input (e.g., initial text) to generate a plurality of inputs and providing that plurality of inputs to a language model to generate a corresponding plurality of language model outputs which are of higher quality than would have been produced by providing the single particular inputs as an input to the language model, where "quality" may be measured in any of a variety of ways, such as by measuring a relevance of the language model's output(s) to its input(s). For example, if an input to a language model represents a query, and the language model produces particular language model output by processing that query, the relevance of the particular language model output to the query may represent a degree to which the language model output answers the query accurately.

As the above examples and the disclosure herein further illustrate, embodiments of the present invention may generate, based on particular user input (e.g., initial text), a plurality of inputs, and provide that plurality of inputs to a language model. Embodiments of the present invention may use any technique(s), in any combination, to generate the plurality of inputs. For example, any particular one of the plurality of inputs may be generated using techniques (e.g., conventional parsing techniques) that do not involve the use of a language model. As another example, any particular one of the plurality of inputs may be generated using a language model, such as the language model which subsequently is used to process that input or another language model. Such use of a variety of techniques to process the user input (e.g., to generate the plurality of inputs based on the user input, and/or to process some or all of the plurality of inputs to generate corresponding outputs) can be beneficial within particular embodiments of the present invention. For example, conventional text parsing techniques may be better suited than use of a language model to determine that the text "U.S. Pat. No. 9,876,543" refers to a patent document where the country of the patent document is the U.S. and the patent number of the patent document is U.S. Pat. No. 9,876,543. As another example, conventional techniques for performing a structured search of a patent database may be better suited for finding a patent document having a country of U.S. and a patent number of U.S. Pat. No. 9,876,543 than techniques which use the text "U.S. Pat. No. 9,876,543" as initial text to a language model in an attempt to find that patent document. Embodiments of the present invention may (e.g., automatically) identify and use an appropriate technique (or combination of techniques) to process any particular user input and/or any of the plurality of inputs that are generated based on that user input. Such use of different techniques to generate and/or process different inputs generated based on the user input may result in higher quality output than would have been output if the user input were provided directly to a language model to generate language model output.

The description above illustrates examples of how embodiments of the present invention may produce output that is of higher-quality than would have otherwise been produced by a generic language model when processing a particular user input. Much effort and attention is now being put into developing domain-specific language models and other models for use in particular domains, such as the domain of patent law. Without disparaging such efforts, and without implying that such domain-specific language models could not or should not be used within embodiments of the present invention, one benefit of embodiments of the present invention is that they may be used to process domain-specific user inputs (e.g., "Does <Product X> infringe <Patent Y>?") to produce high-quality outputs, even without using domain-specific language models. As a result, embodiments of the present invention may be used to obtain at least some of the benefits of domain-specific language models even before such domain-specific language models exist, and without requiring access to or use of such domain-specific language models.

Embodiments of the present invention provide several significant improvements to computer technology by enhancing the capabilities of automated systems to deeply comprehend the highly complex language used in patents and to answer queries about patents with relevant and accurate answers. For example, embodiments of the present invention use a combination of a generic language model, parsing of queries to extract patent-specific information, and retrieval of patent-specific data (e.g., patent documents from patent databases) to automatically answer patent-specific queries (such as queries about patent infringement) that are more accurate and relevant than those that could be provided using the generic language model alone, but without the need to train or fine-tune a patent-specific language model. Such embodiments combine the strengths of generic language models with the strengths of text parsing and structured querying to produce query results that are more accurate and relevant than could be produced otherwise. Such embodiments, therefore, represent improvements to computer technology.

One technical problem that is solved by embodiments of the present invention is how to use a computer to answer a question about a particular patent (such as whether the particular patent is infringed by a particular product), where that question is written in a natural language (e.g., "Does <Product X> infringe <Patent Y>?"), where that question is not inherently understandable by the computer, and where that question is not inherently capable of being answered by the computer using conventional computer-implemented techniques. A related technical problem that is solved by embodiments of the present invention is how to make use of a particular language model to enable a computer to answer a question about a particular patent (such as whether the particular patent is infringed by a particular product) and, in particular, how to make use of the particular language model to enable the computer to provide an answer to the question that has a higher quality (e.g., accuracy and/or relevance) than would otherwise be produced merely by providing the question to the particular language model to generate language model output.

One technical solution that is provided by embodiments of the present invention is to generate (e.g., automatically using a computer) a plurality of inputs based on an initial user input. An example of such an initial user input is "Does <Product X> infringe <Patent Y>?" Assuming, for example, that claim 1 of the patent document identified by <Patent Y> includes three claim elements, examples of the plurality of inputs that may be generated based on that initial user input are: "Does <Product X> include a <Claim Element 1 of Claim 1 of Patent Y>?," "Does <Product X> include a <Claim Element 2 of Claim 1 of Patent Y>?," and "Does <Product X> include a <Claim Element 3 of Claim 1 of Patent Y>?" Embodiments of the present invention may provide (e.g., automatically using a computer) each of the plurality of inputs as an input to a language model to produce corresponding language model output. Embodiments of the present invention may provide those language model outputs to a user. Embodiments of the present invention may perform a function on some or all of the plurality of language model outputs, such as applying a logical AND operation to all of the language model outputs, to produce a function output and provide that function output to the user.

In this particular example, applying such a logical AND operation would produce a value of TRUE if and only if all of the language model outputs had a value of TRUE (or "Yes" or a similar affirmative value), thereby implementing the "all elements" rule for patent infringement. Such generating of a plurality of inputs based on an initial user input and providing the plurality of inputs to a language model to generate a plurality of language model outputs, and (optionally) generating an additional output based on a function of the plurality of language model outputs, is a technical solution that is inherently rooted in computer technology and which provides benefits, e.g., in the form of output quality (e.g., accuracy and/or relevance), over the mere use of a language model to process the initial user input to generate language model output.

One technical problem facing the field of patent analysis is the inability to automatically process natural language queries about patent documents and provide accurate and relevant responses. Humans rely on domain expertise in patent law to interpret patent information and manual review to evaluate patents. This problem is compounded by the large and increasing number of patent filings, making comprehensive analysis impossible for humans to perform in a reasonable time frame.

Embodiments of the present invention provides a technical solution to this problem by implementing an automated system that can receive free-form, natural language queries as input, process the queries using natural language processing and trained machine learning models to extract meanings and relationships, analyze relevant patent document data to generate a responsive output, and provide the output to the user. The system is inherently rooted in computer technology, as a human cannot manually parse ambiguous natural language queries, map semantic concepts to patent documents, or provide responses in real-time without technological assistance.

By enabling responsive, automatic analysis of patent documents based on natural language queries, the present invention provides a solution necessarily rooted in computer technology to overcome the problems of scale, efficiency, accuracy, and speed facing conventional manual patent analysis techniques. The system's ability to understand inputs, process outputs, and learn from past interactions demonstrates a technical solution improving upon existing patent search, retrieval, and analytical capabilities.

Furthermore, embodiments of the present invention do not merely use generic computer components to perform well-known, routine, and conventional functions. For example, considerable technical challenges underpin developing NLP and ML with enough sophistication to deeply comprehend complex patent language, extract contextual relationships within patent documents, and continuously enhance understanding over time based on past interactions. Embodiments of the present invention go beyond using off-the-shelf NLP tools by implementing custom syntactic, semantic, and lexical analysis tailored to the patent domain.

In addition, embodiments of the present invention solve the established technical problem of enabling responsive analysis of patent documents based on free-form natural language queries rather than solely rigid, structured search terms. Not only does this enhance retrieval of relevant patent passages, but it also facilitates more intuitive interactions for users and allows for more nuanced patentability, (non) infringement, and (in)validity predictions. Embodiments of the present invention realize a technical solution rooted fundamentally in computer technology—leveraging NLP and ML to transform patent data in response to natural language inputs is not conceivably replicable by human analysis alone.

Furthermore, embodiments of the present invention are not merely directed to an abstract idea without significantly more. For example, embodiments of the present invention do not merely automate the abstract process of humans manually analyzing patent documents. The ways in which embodiments of the present invention automatically generate outputs, such as predictions of patentability, (non)infringement, and (in)validity, based on natural language inputs and by processing patent documents in their native form imposes considerable technological challenges that cannot feasibly be addressed without the use of computers.

For example, the manual process of evaluating patents relies extensively on human cognitive abilities including reading comprehension, abstraction, logical reasoning, and professional judgment. Humans leverage these innate skills to interpret patent language, draw conceptual connections, make contextual inferences, and render informed opinions. Automating these cognitive functions requires developing sophisticated natural language processing pipelines and complex machine learning algorithms which, although capable of producing outputs which may be similar to the results of human reasoning, do so in ways that are fundamentally different from the methods employed by humans and which are inherently rooted in computer technology.

As disclosed herein, embodiments of the present invention may, for example, use one or more large language models. Such a language model may, for example, include at least 1 billion parameters, at least 10 billion parameters, at least 100 billion parameters, at least 500 billion parameters, at least 1 trillion parameters, at least 5 trillion parameters, at least 25 trillion parameters, at least 50 trillion parameters, or at least 100 trillion parameters. Any processing of initial text by such a large language model to produce language model output is inherently rooted in computer technology and cannot be performed mentally or manually by a human, especially when taking into account that such language model output may be produced in a very short time, e.g., less than 1 second, less than 10 seconds, less than 30 seconds, or less than one minute. No human could carry out the operations carried out by such a large language model on any input in one human lifetime, much less in the amounts of time disclosed herein.

Any language model disclosed herein (e.g., any embodiments of the language model 112) may, for example, be a pure language model (i.e., may solely receive text input and solely generate text output). Certain embodiments of language models disclosed herein (e.g., certain embodiments of the language model 112), however, may, for example, be or included any one or more of the following, in any combination:

a model that receives text input and generates text output;
a model that receives text input and generates audio (e.g., synthesized speech) output;
a model that receives text input and generates image output;
a model that receives text input and generates video output;
a model that receives audio input and generates text output;
a model that receives audio input and generates audio output;
a model that receives audio input and generates image output;
a model that receives audio input and generates video output;
a model that receives image input and generates text output;
a model that receives image input and generates audio output;
a model that receives image input and generates image output;
a model that receives image input and generates video output;
a model that receives video input and generates text output;
a model that receives video input and generates audio output;
a model that receives video input and generates image output;
a model that receives video input and generates video output.

As the above implies, certain embodiments of language models disclosed herein (e.g., certain embodiments of the language model 112) may, for example, be multimodal models. Such a model may, for example, be capable of receiving input in multiple different modes (e.g., two or more of text, audio, image, and video). Such a model may, for example, be capable of generating output in multiple different modes (e.g., two or more of text, audio, image, and video). Such a model may, for example, be capable of receiving input in multiple different modes (e.g., two or more of text, audio, image, and video) and be capable of generating output in multiple different modes (e.g., two or more of text, audio, image, and video). The input mode(s) of such a model may be the same as or differ from the output mode(s) of such a model in any of a variety of ways.

Although not shown in FIG. 1, embodiments of the present invention may use one or more physical models (also referred to as "scientific models" or "world models"), which represent, explain, and/or predict physical objects and/or phenomena. Such a physical model may, for example, for each product in a plurality of products, include information representing relationships among components of that product, such as "is-a", "has-a," "part-of," "member-of", "subclass-of", "associated-with", "owned-by", "uses", "produces", "adjacent-to", "derived-from", "opposite-of", "cause-effect", and "synonym-of" relationships. Such a physical model may, additionally or alternatively, for each process in a plurality of processes, include information representing such relationships and/or other relationships among acts of that relationship. Embodiments of the present invention may use such a physical model to perform any of a variety of functions disclosed herein, such as to determine whether a component of a product falls within a scope of a meaning of an element of a product claim (e.g., to answer the question, "Is a sole a component of a shoe?") or to determine whether an act in a process falls within a scope of a meaning of an element of a process claim (e.g., to answer the question, "Does manufacturing a shoe include curing rubber?").

One embodiment is directed to a method performed by at least one computer processor executing computer program instructions stored on at least one non-transitory computer-readable medium. The method includes: (A) receiving a patent descriptor that identifies a patent document; (B) receiving a product descriptor that identifies a product; and (C) generating a prediction whether the patent document describes the product.

The method may further include: (D) generating, based on the prediction, prediction output indicating whether the prediction predicts that the patent document describes the product. Operation (D) may include: (D)(1) if the prediction predicts that the patent document describes the product, then generating prediction output indicating that the patent document has been predicted to describe the product; and (D)(2) if the prediction does not predict that the patent document describes the product, then generating prediction output indicating that the patent document has not been predicted to describe the product. Operation (D)(2) may include: if the prediction predicts that the patent document does not describe the product, then generating prediction output indicating that the patent document has been predicted not to describe the product.

Operation (C) may include generating the prediction using a language model. Generating the prediction may consist of generating the prediction using the language model.

The method may further include: (D) receiving feedback input representing feedback on the prediction; and (E) updating the language model, based on the feedback input, to produce an updated language model. Receiving the feedback input may include receiving the feedback input from a human.

The method may further include: (D) receiving feedback input representing feedback on the prediction; and (E) modifying the prediction, based on the feedback input, to produce a modified prediction. Receiving the feedback input may include receiving the feedback input from a human.

Operation (C) may include determining whether the product descriptor falls within a scope of a meaning of the patent descriptor. Operation (C) may include determining whether the product descriptor falls within a scope of a meaning of the patent document.

Operation (C) may include determining whether the product and the patent document satisfy a query relating to the patent document and the product; and the prediction output ma indicate whether the product and the patent document were determined, in (C), to satisfy the query. The method may further include, before (C): receiving query input representing the query. Receiving the query input may include receiving the query input from a human. The query may ask whether the product falls within a scope of a meaning of the patent document; and (C) may include generating the prediction based on the query. The query may ask whether the product does not fall within a scope of a meaning of the patent document; and (C) may include generating the prediction based on the query. The query may ask whether the product invalidates the patent document; and (C) may include generating the prediction based on the query. The query may ask whether the product renders the patent document unpatentable; and (C) may include generating the prediction based on the query. Operation (C) may include generating the prediction based on the query, the patent descriptor, and the product descriptor. Operation (C) may include generating the prediction based on the query, the patent document, and the product descriptor. Operation (C) may include providing the query as input to a language model.

Receiving the patent descriptor may include receiving the patent descriptor from a human. Receiving the patent descriptor may include receiving the patent descriptor from the human via a keyboard. 25. The patent descriptor may include unstructured text. Receiving the patent descriptor may include receiving the patent descriptor from the human via a microphone.

Receiving the patent descriptor may include receiving the patent descriptor from a computer program.

Receiving the patent descriptor may include: receiving language model input; providing the language model input to a language model to generate language model output; and identifying the patent descriptor based on the language model output. Identifying the patent descriptor based on the language model output may include identifying the patent descriptor as the language model output. Identifying the patent descriptor based on the language model output may include generating the patent descriptor based on the language model output. The method may further include receiving feedback input representing feedback on the language model output; and identifying the patent descriptor based on the language model output may include identifying the patent descriptor based on the language model output and the feedback input. Identifying the patent descriptor based on the language model output and the feedback input may include: modifying the language model output, based on the feedback input, to generate modified language model output; and identifying the patent descriptor based on the modified language model output. Receiving the feedback input may include receiving the feedback input from a human.

The patent descriptor may include unstructured text. 35. The patent descriptor may include unstructured text and structured text. 36. The patent descriptor may include unstructured text, structured text, and computer-encoded data. The patent descriptor may include unstructured text and computer-encoded data.

The patent descriptor may consist of unstructured text. The patent descriptor may include structured text. The patent descriptor may consist of structured text. The patent descriptor may include computer-encoded data. The patent descriptor may consist of computer-encoded data.

The patent descriptor may identify the patent document and at least one patent document other than the patent document. The patent descriptor may unambiguously identify the patent document. The patent descriptor may include at least one value of at least one field. The at least one field may include at least one of: a patent number field, a patent serial number field, a patent publication number field, a patent filing date field, a patent publication date field, a patent issue date field, a patent title field, a patent country field, a patent assignee field, a patent applicant field, a patent inventor field, a patent attorney field, and a patent classification field.

The patent document may include unstructured text. The patent document may consist of unstructured text. The patent document may include structured text. The patent document may consist of structured text. The patent document may include computer-encoded data. The patent document may consist of computer-encoded data.

The patent document may include at least one of a patent title; a patent specification; at least one patent claim; a patent abstract; and at least one patent drawing. The patent document may include a patent claim. The patent document may include a plurality of patent claims. The plurality of patent claims may include an independent patent claim and at least one dependent patent claim that is dependent on the independent patent claim. Operation (C) may include providing the patent claim as an input to a language model to generate language model output.

The patent document may consist of a plurality of patent claims. The patent document may consist of a patent claim. The patent document may consist of a patent claim element.

Operations (A) and (B) may comprise receiving a text string that includes the patent descriptor and the product descriptor. Operation (C) may include providing the text string to a language model to generate language model output. Operation (C) may include providing the patent claim element as an input to a language model to generate language model output.

The patent document may consist of a patent claim limitation. Operation (C) may include providing the patent claim limitation as an input to a language model to generate language model output.

The patent descriptor may include the patent document. The patent descriptor may not comprise the patent document. The product descriptor may include unstructured text. The product descriptor may consist of unstructured text. The product descriptor may include structured text. The product descriptor may consist of structured text. The product descriptor may include computer-encoded data. The product descriptor may consist of computer-encoded data. The product descriptor may identify the product and at least one product other than the product. The product descriptor may unambiguously identify the product.

Receiving the product descriptor may include receiving the product descriptor from a human. Receiving the product descriptor may include receiving the product descriptor from the human via a keyboard. The product descriptor may include unstructured text. Receiving the product descriptor may include receiving the product descriptor from the human via a microphone. Receiving the product descriptor may include receiving the product descriptor from a computer program.

Receiving the product descriptor may include: receiving language model input; providing the language model input to a language model to generate language model output; and identifying the product descriptor based on the language model output. Identifying the product descriptor based on the language model output may include identifying the product descriptor as the language model output. Identifying the product descriptor based on the language model output may include generating the product descriptor based on the language model output. The method may further include receiving feedback input representing feedback on the language model output; and identifying the product descriptor based on the language model output may include identifying the product descriptor based on the language model output and the feedback input. Identifying the product descriptor based on the language model output and the feedback input may include: modifying the language model output, based on the feedback input, to generate modified language model output; and identifying the product descriptor based on the modified language model output. Receiving the feedback input may include receiving the feedback input from a human.

Operation (C) may include providing the patent descriptor and the product descriptor as inputs to a language model to generate language model output. Operation (C) may include providing a query, the patent descriptor, and the product descriptor as inputs to the language model to generate the language model output. The query may ask whether the product descriptor falls within a scope of a meaning of the patent descriptor.

Operation (C) may include providing the patent document and the product descriptor as inputs to a language model to generate language model output. Operation (C) may include providing a query, the patent document, and the product descriptor as inputs to the language model to generate the language model output. The query may ask whether the product descriptor falls within a scope of a meaning of the patent document.

Operation (C) may include providing the patent descriptor, the patent document, and the product descriptor as inputs to a language model to generate language model output. Operation (C) may include providing a query, the patent descriptor, the patent document, and the product descriptor as inputs to the language model to generate the language model output. The query may ask whether the product descriptor falls within a scope of a meaning of at least one of the patent descriptor and the patent document. Operation (C) may further include generating the prediction based on the language model output. The prediction may include the language model output. The prediction may consist of the language model output.

Operation (C) may include: generating language model input, the language model input comprising unstructured text, based on at least two of the patent descriptor, the patent document, and the product descriptor; and providing the language model input as an input to a language model to generate language model output. Providing the language model as an input to the language model to generate the language model output may include providing the language model input as an input to the language model, and providing no other input to the language model, to generate the language model output. The language model input may include at least two of the patent descriptor, the patent document, and the product descriptor. The language model input may include a query and at least two of the patent descriptor, the patent document, and the product descriptor. The language model input may consist of unstructured text. The query may ask whether the product falls within a scope of a meaning of the patent document. The query may ask whether the product invalidates the patent document. The query may ask whether the product renders the patent document unpatentable.

The language model may include an autoregressive language model. The language model may consist of an autoregressive language model. The language model may include a generative language model. The language model may consist of a generative language model. The language model may include a language model in the GPT-n series of language models. The language model may consist of a language model in the GPT-n series of language models.

The method may further include, before operation (C): identifying the patent document based on the patent descriptor. Identifying the patent document based on the patent descriptor may include: querying a database using the patent descriptor to generate a search result; and identifying the patent document based on the search result. Identifying the patent document based on the patent descriptor may include: generating a structured query based on the patent descriptor; querying a database using the structured query to generate a search result; and identifying the patent document based on the search result. Generating the structured query based on the patent descriptor may include: providing the patent descriptor as input to a language model to generate language model output; and generating the structured query based on the language model output. Identifying the patent document based on the patent descriptor may include: receiving language model input; providing the language model input to a language model to generate language model output; and identifying the patent document based on the language model output. Identifying the patent document based on the language model output may include identifying the patent document as the language model output. Identifying the patent document based on the language model output may include generating the patent document based on the language model output.

The method may further include: before operation (C), generating, based on the patent descriptor, patent descriptor meaning data representing a meaning of the patent descriptor; and wherein generating the prediction whether the patent document describes the product may include determining whether a meaning of the product descriptor falls within a scope of the meaning of the patent descriptor. Determining whether a meaning of the product descriptor falls within a scope of the meaning of the patent descriptor may include providing the patent descriptor and at least one of the product descriptor and the product descriptor meaning data as inputs to a language model to generate language model output.

Receiving the product descriptor may include: receiving product input; and providing the product input to a language model to generate the product descriptor.

The method may further include: before operation (C), generating, based on the patent document, patent document meaning data representing a meaning of the patent document; and wherein generating the prediction whether the patent document describes the product may include determining whether a meaning of the product descriptor falls within a scope of the meaning of the patent document. Determining whether a meaning of the product descriptor falls within a scope of the meaning of the patent document may include providing the product descriptor and at least one of the patent document and the patent document meaning data as inputs to a language model to generate language model output.

The method may further include: before (C), generating, based on the product descriptor, product descriptor meaning data representing a meaning of the product descriptor; and wherein generating a prediction whether the patent document describes the product may include determining whether the meaning of the product descriptor falls within a scope of a meaning of the patent document. Determining whether the meaning of the product descriptor falls within a scope of a meaning of the patent document may include providing the patent document and at least one of the product descriptor and the patent descriptor meaning data as inputs to a language model to generate language model output.

The method may further include: before operation (C), generating, based on the patent descriptor, patent descriptor meaning data representing a meaning of the patent descriptor; before operation (C), generating, based on the product descriptor, product descriptor meaning data representing a meaning of the product descriptor; and wherein generating the prediction whether the patent document describes the product may include determining whether the meaning of the product descriptor falls within a scope of the meaning of the patent descriptor.

The method may further include: before operation (C), generating, based on the patent descriptor, patent descriptor meaning data representing a meaning of the patent descriptor; before operation (C), generating, based on the product descriptor, product descriptor meaning data representing a meaning of the product descriptor; and wherein generating the prediction whether the patent document describes the product may include determining whether the meaning of the product descriptor does not fall within a scope of the meaning of the patent descriptor. Operation (C) may include providing, as inputs to a language model to generate language model output: (1) at least one of the patent document, the patent descriptor, and the patent descriptor meaning data; and (2) at least one of the product descriptor and the product descriptor meaning data.

The method may further include: before operation (C), generating, based on the patent document, patent document meaning data representing a meaning of the patent document; before operation (C), generating, based on the product descriptor, product descriptor meaning data representing a meaning of the product descriptor; and wherein generating the prediction whether the patent document describes the product may include determining whether the meaning of the product descriptor falls within a scope of the meaning of the patent document.

The method may further include: before operation (C), generating, based on the patent document, patent document meaning data representing a meaning of the patent document; before operation (C), generating, based on the product descriptor, product descriptor meaning data representing a meaning of the product descriptor; and wherein generating the prediction whether the patent document describes the product may include determining whether the meaning of the product descriptor does not fall within a scope of the meaning of the patent document.

Operation (C) may include providing, as inputs to a language model to generate language model output: (1) at least one of the patent document, the patent descriptor, and the patent document meaning data; and (2) at least one of the product descriptor and the product descriptor meaning data.

The method may further include: before operation (C), identifying, based on the product descriptor, a plurality of product feature descriptors that identify a plurality of features of the product; and wherein operation (C) may include determining whether the patent document describes each of the plurality of features of the product. Determining whether the patent document describes each of the plurality of features of the product may include providing the patent document and the plurality of product feature descriptors as inputs to a language model to generate language model output. Providing the patent document and the plurality of product feature descriptors as inputs to the language model to generate the language model output may include: for each product feature descriptor D in the plurality of product feature descriptors, providing the patent document and the product feature descriptor D to the language model to generate language model output corresponding to the product feature descriptor D, thereby generating a plurality of language model outputs corresponding to the patent document and the plurality of product feature descriptors.

The method may further include: before operation (C), identifying, based on the patent document, a plurality of patent claim elements of a patent claim in the patent document; and wherein operation (C) may include generating, for each patent claim element E in the plurality of patent claim elements of the patent claim in the patent document, a prediction whether the patent claim element E describes the product. Generating, for each patent claim element E in the plurality of patent claim elements of the patent claim in the patent document, the prediction whether the patent claim element E describes the product may include providing, as inputs to a language model to generate language model output: (1) the product descriptor, (2) the patent claim element E, and (3) a query whether the patent claim element E describes the product, thereby generating a plurality of language model outputs corresponding to the plurality of patent claim elements. Generating, for each patent claim element E in the plurality of patent claim elements of the patent claim in the patent document, the prediction whether the patent claim element E describes the product may include: generating a language model input corresponding to the patent claim element E, wherein the language model input corresponding to the patent claim element represents the query whether the patent claim element E describes the product; and providing the language model input corresponding to the patent claim element E as an input to the language model to generate the language model output corresponding to the patent claim element E. The method may further include: determining whether all of the plurality of patent claim elements of the patent claim in the patent document have been predicted to describe the product; in response to determining that all of the plurality of patent claim elements of the patent claim in the patent document have been predicted to describe the product, generating output indicating that all of the plurality of patent claim elements of the patent claim in the patent document have been determined to describe the product; and in response to determining that not all of the plurality of patent claim elements of the patent claim in the patent document have been predicted to describe the product, generating output indicating that not all of the plurality of patent claim elements of the patent claim in the patent document have been predicted to describe the product.

The method may further include: identifying, based on the patent document, a plurality of patent claim elements of a patent claim in the patent document; and wherein operation (C) may include, for each claim element Ei in the plurality of patent claim elements of the patent claim in the patent document, generating a corresponding prediction Pi indicating whether the product has a feature that is described by claim element Ei, thereby generating a plurality of predictions corresponding to the plurality of patent claim elements of the patent claim in the patent document. Operation (C) may include, for each claim element Ei in the plurality of patent claim elements of the patent claim in the patent document, providing the claim element Ei and the product descriptor to a language model to generate language model output corresponding to the claim element Ei, thereby generating a plurality of corresponding language model outputs corresponding to the plurality of patent claim elements of the patent claim in the patent document. Operation (C) may include, for each claim element Ei in the plurality of patent claim elements of the patent claim in the patent document, providing the claim element Ei, the product descriptor, and a query whether the product descriptor falls within a scope of a meaning of the claim element Ei as inputs to a language model to generate language model output corresponding to the claim element Ei, thereby generating a plurality of corresponding language model outputs corresponding to the plurality of patent claim elements of the patent claim in the patent document. The method may further include: determining whether, for each claim element Ei in the plurality of patent claim elements of the patent claim in the patent document, the corresponding prediction Pi indicates that the product has a feature that is described by claim element Ei; in response to determining that, for each claim element Ei in the plurality of patent claim elements of the patent claim in the patent document, a corresponding prediction Pi indicates that the product has a feature that is described by claim element Ei, generating output indicating that the product has been predicted to be described by all of the plurality of patent claim elements of the patent claim in the patent document; and in response to determining that, for at least one claim element Ej in the plurality of patent claim elements of the patent claim in the patent document, the corresponding prediction Pj does not indicate that the product has a feature that is described by claim element Ej, generating output indicating that the product has been predicted not to be described by all of the plurality of patent claim elements of the patent claim in the patent document.

The method may further include: identifying, based on the patent document, a plurality of patent claims in the patent document; and wherein operation (C) may include determining, for each patent claim C in the plurality of patent claims in the patent document, whether the patent claim C describes the product. Determining, for each patent claim C in the plurality of patent claims in the patent document, whether the patent claim C describes the product may include, for each patent claim C in the plurality of patent claims in the patent document, providing the patent claim C and the product descriptor to a language model to generate a corresponding language model output, thereby generating a plurality of language model outputs corresponding to the product descriptor and the plurality of patent claims. The method may further include: for at least one patent claim C of the plurality of patent claims in the patent document, generating output indicating whether the patent claim C describes the product. The method may further include: for each patent claim C in the plurality of patent claims in the patent document, generating output indicating whether the patent claim C describes the product.

The method may further include: identifying, based on the patent document, a plurality of patent claims in the patent document; and determining whether at least one of the plurality of patent claims in the patent document describes the product; in response to determining that at least one of the plurality of patent claims in the patent document describes the product, generating output indicating that at least one of the plurality of patent claims in the patent document describes the product. Determining whether at least one of the plurality of patent claims in the patent document describes the product may include providing the product descriptor and the plurality of patent claims as inputs to a language model to generate language model output. The method may further include: in response to not determining that at least one of the plurality of patent claims in the patent document describes the product, generating output indicating that not at least one of the plurality of patent claims in the patent document describes the product.

The method may further include: (D) generating evidence output representing evidence supporting the prediction whether the patent document describes the product. The method may further include: (E) generating, based on the prediction, prediction output indicating whether the prediction predicts that the patent document describes the product. The method may further include generating output based on the patent descriptor. The method may further include generating output based on the product descriptor. Operation (C) may include providing, to a language model, a query relating to the patent document and the product to generate language model output, wherein the query includes a request to generate the prediction output. The method may further include: before operation (C), identifying, based on the patent document, a plurality of patent claim elements of a patent claim in the patent document; and wherein operation (C) may include generating, for each patent claim element E in the plurality of patent claim elements of the patent claim in the patent document: a prediction whether the product includes patent claim element E; and evidence output representing evidence supporting the prediction whether the product includes patent claim element E.

Another embodiment is directed to a method performed by at least one computer processor executing computer program instructions stored on at least one non-transitory computer-readable medium. The method includes: (A) receiving a patent descriptor, consisting of first text, that identifies a patent document; (B) receiving a product descriptor, consisting of second text, that identifies a product; (C) receiving a query, consisting of third text, relating to the patent document and the product; and (D) generating a prediction whether the patent document describes the product, comprising providing the query as input to a language model to generate language model output, wherein the prediction may include the language model output; wherein a single text string may include the query, the patent descriptor, and the product descriptor.

The patent descriptor may include the patent document. The patent descriptor may not comprise the patent document.

Another embodiment is directed to a method performed by at least one computer processor executing computer program instructions stored on at least one non-transitory computer-readable medium. The method includes: (A) receiving a patent descriptor that identifies a patent document; (B) identifying, based on the patent descriptor, a product descriptor set that includes at least one product descriptor, wherein each product descriptor in the product descriptor set describes a corresponding product; and (C) for each product descriptor in the product descriptor set, generating a prediction whether the patent document describes the product described by the product descriptor.

Operation (B) may include: providing the patent descriptor as input to a language model to generate language model output; and identifying the product descriptor set based on the language model output. The at least one product descriptor may include a plurality of product descriptors, and identifying the product descriptor set based on the language model output may include identifying the plurality of product descriptors based on the language model output. The language model output may include the plurality of product descriptors. Identifying the product descriptor set may include: providing the language model output to the language model to produce subsequent language model output; and identifying the product descriptor set based on the subsequent language model output.

Operation (B) may include: providing the patent descriptor and a query as inputs to the language model to generate the language model output; and identifying the product descriptor set based on the language model output. The query may ask for at least one industry which sells products described by the patent descriptor. The query may ask for at least one company which sells products described by the patent descriptor. The query may ask for at least one product category containing products described by the patent descriptor. The query may ask for at least one product described by the patent descriptor.

The patent descriptor may include text that is not included in the patent document. The patent document may include an issued patent, and operation (B) may include identifying, based on at least part of the issued patent, the product descriptor set. The patent document may include an issued patent, and operation (C) may include, for each product descriptor in the product descriptor set, generating, based on at least part of the issued patent, a prediction whether the patent document describes the product described by the product descriptor. Identifying, based on at least part of the issued patent, the product descriptor set, may include: providing the at least part of the issued patent to a language model to generate language model output; and identifying the product descriptor set based on the language model output. The at least part of the issued patent may include a title of the issued patent. The at least part of the issued patent may include a Summary section of the issued patent. The at least part of the issued patent may include an Abstract section of the issued patent. The at least part of the issued patent may include a specification of the issued patent. The at least part of the issued patent may include at least one claim of the issued patent. The at least part of the issued patent may consist of a claim of the issued patent.

Another embodiment is directed to a method performed by at least one computer processor executing computer program instructions stored on at least one non-transitory computer-readable medium. The method includes: (A) receiving product data identifying a product; (B) receiving patent data identifying a patent claim; (C) receiving prior art data identifying a set of prior art; (D) executing an optimization process to minimize an objective function, the objective function including: a first sub-objective function for evaluating infringement of the patent claim by the product, and a second sub-objective function for evaluating validity of the patent claim over the set of prior art, the executing the optimization process comprising: (D)(1) generating a plurality of interpretations of the patent claim; (D)(2) for each particular interpretation in the plurality of interpretations of the patent claim: (D)(2)(a) using a first language model to evaluate the first sub-objective function with the product data and the particular interpretation as inputs to the first sub-objective function, thereby producing an output of the first sub-objective function; (D)(2)(b) using a second language model to evaluate the second sub-objective function with the prior art data and the particular interpretation as inputs to the second sub-objective function, thereby producing an output of the second sub-objective function; thereby producing a plurality of outputs of the first sub-objective function and a plurality of outputs of the second sub-objective function corresponding to the plurality of interpretations of the patent claim.

Using the first language model to evaluate the first sub-objective function with the product data and the particular interpretation as inputs to the first sub-objective function may include providing the product data and the particular interpretation, and/or data derived therefrom, as inputs to the first language model. Using the second language model to evaluate the second sub-objective function with the prior art data and the particular interpretation as inputs to the second sub-objective function may include providing the prior art data and the particular interpretation as inputs, and/or data derived therefrom, as inputs to the second language model.

The first language model and the second language model may be the same language model. More specifically, the terms "first language model" and "second language model" in the context of the method described immediately above may both refer to a single instance of a language model, rather than to distinct language model instances. Alternatively, the first language model and the second language model may be different language models. For example, the first language model and the second language model may be different instances of the same class of language model (e.g., GPT-4). As another example, the first language model and the second language model may be different instances of different classes of language model; e.g., the first language model may be an instance of GPT-4 and the second language model may be an instance of LLaMA 2.

Generating the plurality of interpretations of the patent claim may include using a third language model to generate the plurality of interpretations of the patent claim. The first language model, the second language model, and the third language model may be the same language model, in the sense described above.

Executing the optimization process further may include: (D)(3) filtering the plurality of interpretations, including removing at least one interpretation from the plurality of interpretations, thereby producing a filtered plurality of interpretations. Filtering the plurality of interpretations may include filtering the plurality of interpretations based on the plurality of outputs of the first sub-objective function and the plurality of outputs of the second sub-objective function corresponding to the plurality of interpretations of the patent claim.

Executing the optimization process further may include: (D)(4) adding the filtered plurality of interpretations to a set of candidate interpretations; and (D)(5) generating a new plurality of interpretations of the patent claim in the set of candidate interpretations; and (D)(6) repeating (D)(2) on the new plurality of interpretations.

The method may include repeating (D)(2), (D)(3), (D)(4), (D)(5), and (D)(6) until a termination criterion has been satisfied. At least one of the first language model and the second language model may be used to determine whether the termination criterion has been satisfied.

Operation (D)(5) may include using at least one of the first language model and the second language model to generate the new plurality of interpretations of the patent claim in the set of candidate interpretations.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may be used to apply an autoregressive language model, such as GPT-3, to input, to generate output. Such a function is inherently rooted in computer technology and cannot be performed manually or mentally by a human.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

What is claimed is:

1. A method performed by at least one computer processor executing computer program instructions stored on at least one non-transitory computer-readable medium, the method comprising:
    (A) receiving product data identifying a product;
    (B) receiving patent data identifying a patent claim;
    (C) receiving prior art data identifying a set of prior art;
    (D) executing an optimization process to minimize an objective function, the objective function including: a first sub-objective function for evaluating infringement of the patent claim by the product, and a second sub-objective function for evaluating validity of the patent claim over the set of prior art, the executing the optimization process comprising:
        (D)(1) generating a plurality of interpretations of the patent claim;
        (D)(2) for each particular interpretation in the plurality of interpretations of the patent claim:
            (D)(2)(a) using a first autoregressive language model to evaluate the first sub-objective function by:
                (D)(2)(a)(i) generating a first query text comprising the product data and the particular interpretation;
                (D)(2)(a)(ii) providing the first query text as input to the first language model to generate first autoregressive language model output text; and
                (D)(2)(a)(iii) processing the first language model output text to produce an output of the first sub-objective function;
            (D)(2) (b) using a second autoregressive language model to evaluate the second sub-objective function by:
                (D)(2) (b) (i) generating a second query text comprising the prior art data and the particular interpretation;
                (D)(2)(b)(ii) providing the second query text as input to the second autoregressive language model to generate second language model output text; and
                (D)(2)(b)(iii) processing the second language model output text to produce an output of the second sub-objective function;
        thereby producing a plurality of outputs of the first sub-objective function and a plurality of outputs of the second sub-objective function corresponding to the plurality of interpretations of the patent claim; and
    (E) generating, based on the objective function and the plurality of outputs of the first sub-objective function and the plurality of outputs of the second sub-objective function, optimization output representing at least one interpretation of the patent claim selected by the optimization process.

2. The method of claim 1, wherein the first autoregressive language model and the second autoregressive language model are the same language model.

3. The method of claim 1, wherein generating the plurality of interpretations of the patent claim comprises using a third autoregressive language model to generate the plurality of interpretations of the patent claim.

4. The method of claim 3, wherein the first autoregressive language model, the second autoregressive language model, and the third autoregressive language model are the same language model.

5. The method of claim 1, wherein executing the optimization process further comprises:
    (D)(3) filtering the plurality of interpretations, comprising removing at least one interpretation from the plurality of interpretations, thereby producing a filtered plurality of interpretations.

6. The method of claim 5, wherein filtering the plurality of interpretations comprises filtering the plurality of interpretations based on the plurality of outputs of the first sub-objective function and the plurality of outputs of the second sub-objective function corresponding to the plurality of interpretations of the patent claim.

7. The method of claim 5, wherein executing the optimization process further comprises:
    (D)(4) adding the filtered plurality of interpretations to a set of candidate interpretations; and
    (D)(5) generating a new plurality of interpretations of the patent claim in the set of candidate interpretations; and
    (D)(6) repeating (D)(2) on the new plurality of interpretations.

8. The method of claim 7, further comprising repeating (D)(2), (D)(3), (D)(4), (D)(5), and (D)(6) until a termination criterion has been satisfied.

9. The method of claim 8, comprising using at least one of the first autoregressive language model and the second autoregressive language model to determine whether the termination criterion has been satisfied.

10. The method of claim 7, wherein (D)(5) comprises using at least one of the first autoregressive language model and the second autoregressive language model to generate the new plurality of interpretations of the patent claim in the set of candidate interpretations.

11. A system comprising at least one non-transitory computer-readable medium having computer program instructions stored thereon, the computer program instructions being executable by at least one computer processor to perform a method, the method comprising:

(A) receiving product data identifying a product;
(B) receiving patent data identifying a patent claim;
(C) receiving prior art data identifying a set of prior art;
(D) executing an optimization process to minimize an objective function, the objective function including: a first sub-objective function for evaluating infringement of the patent claim by the product, and a second sub-objective function for evaluating validity of the patent claim over the set of prior art, the executing the optimization process comprising:
  (D)(1) generating a plurality of interpretations of the patent claim;
  (D)(2) for each particular interpretation in the plurality of interpretations of the patent claim:
    (D)(2)(a) using a first autoregressive language model to evaluate the first sub-objective function by:
      (D)(2)(a)(i) generating a first query text comprising the product data and the particular interpretation;
      (D)(2)(a)(ii) providing the first query text as input to the first language model to generate first autoregressive language model output text; and
      (D)(2)(a)(iii) processing the first language model output text to produce an output of the first sub-objective function;
    (D)(2)(b) using a second autoregressive language model to evaluate the second sub-objective function by:
      (D)(2)(b)(i) generating a second query text comprising the prior art data and the particular interpretation;
      (D)(2)(b)(ii) providing the second query text as input to the second autoregressive language model to generate second language model output text; and
      (D)(2)(b)(iii) processing the second language model output text to produce an output of the second sub-objective function;
  thereby producing a plurality of outputs of the first sub-objective function and a plurality of outputs of the second sub-objective function corresponding to the plurality of interpretations of the patent claim; and
(E) generating, based on the objective function and the plurality of outputs of the first sub-objective function and the plurality of outputs of the second sub-objective function, optimization output representing at least one interpretation of the patent claim selected by the optimization process.

12. The system of claim 11, wherein the first autoregressive language model and the second autoregressive language model are the same language model.

13. The system of claim 11, wherein generating the plurality of interpretations of the patent claim comprises using a third autoregressive language model to generate the plurality of interpretations of the patent claim.

14. The system of claim 13, wherein the first autoregressive language model, the second autoregressive language model, and the third autoregressive language model are the same language model.

15. The system of claim 11, wherein executing the optimization process further comprises:
  (D)(3) filtering the plurality of interpretations, comprising removing at least one interpretation from the plurality of interpretations, thereby producing a filtered plurality of interpretations.

16. The system of claim 15, wherein filtering the plurality of interpretations comprises filtering the plurality of interpretations based on the plurality of outputs of the first sub-objective function and the plurality of outputs of the second sub-objective function corresponding to the plurality of interpretations of the patent claim.

17. The system of claim 15, wherein executing the optimization process further comprises:
  (D)(4) adding the filtered plurality of interpretations to a set of candidate interpretations; and
  (D)(5) generating a new plurality of interpretations of the patent claim in the set of candidate interpretations; and
  (D)(6) repeating (D)(2) on the new plurality of interpretations.

18. The system of claim 17, wherein the method further comprises repeating (D)(2), (D)(3), (D)(4), (D)(5), and (D)(6) until a termination criterion has been satisfied.

19. The system of claim 18, comprising using at least one of the first autoregressive language model and the second autoregressive language model to determine whether the termination criterion has been satisfied.

20. The system of claim 17, wherein (D)(5) comprises using at least one of the first autoregressive language model and the second autoregressive language model to generate the new plurality of interpretations of the patent claim in the set of candidate interpretations.

* * * * *